W. RECKE.
ELECTRIC SIGN.
APPLICATION FILED OCT. 30, 1916.

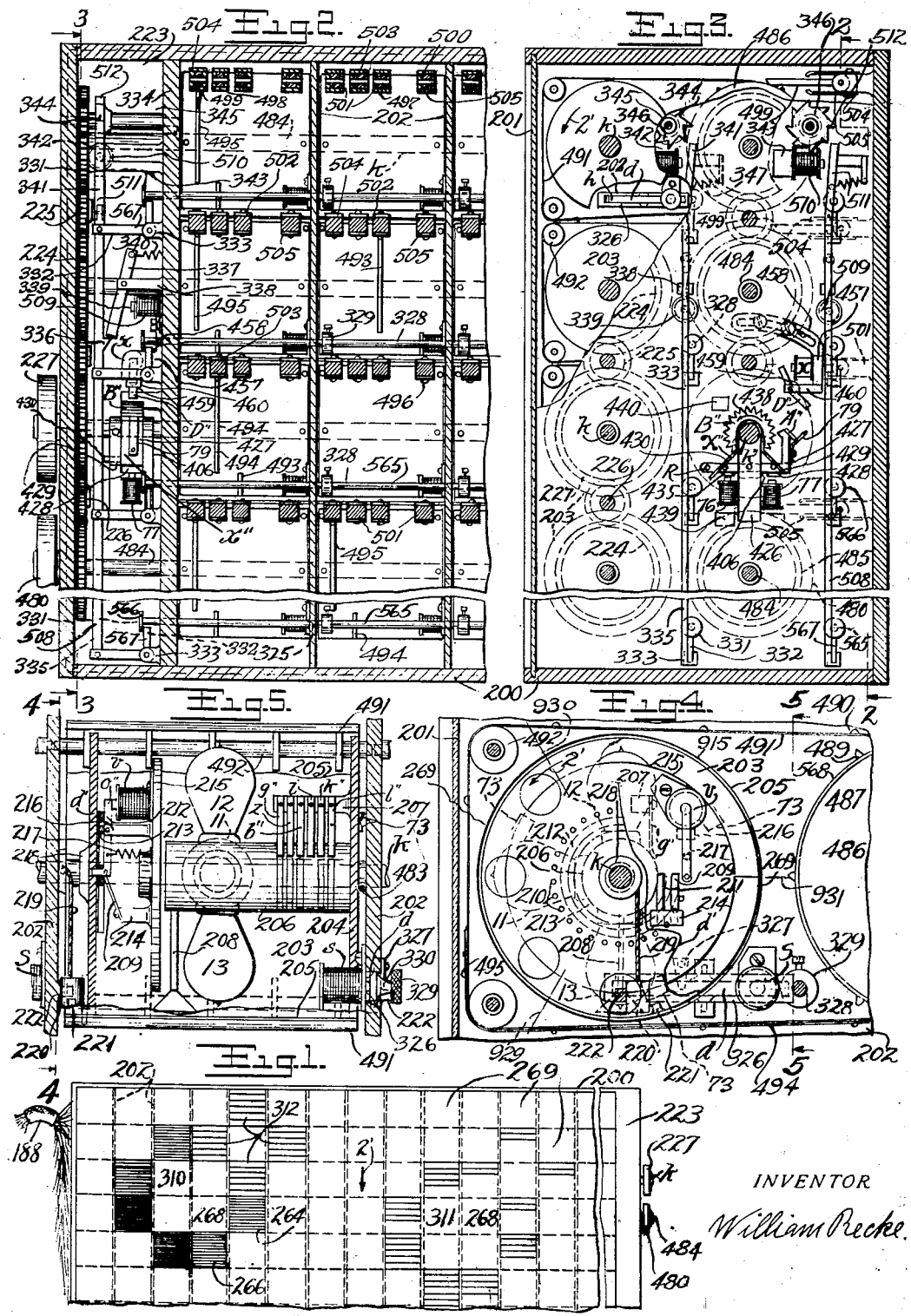

1,359,274.

Patented Nov. 16, 1920.
12 SHEETS—SHEET 2.

Fig. 6.

Inventor:
William Recke.

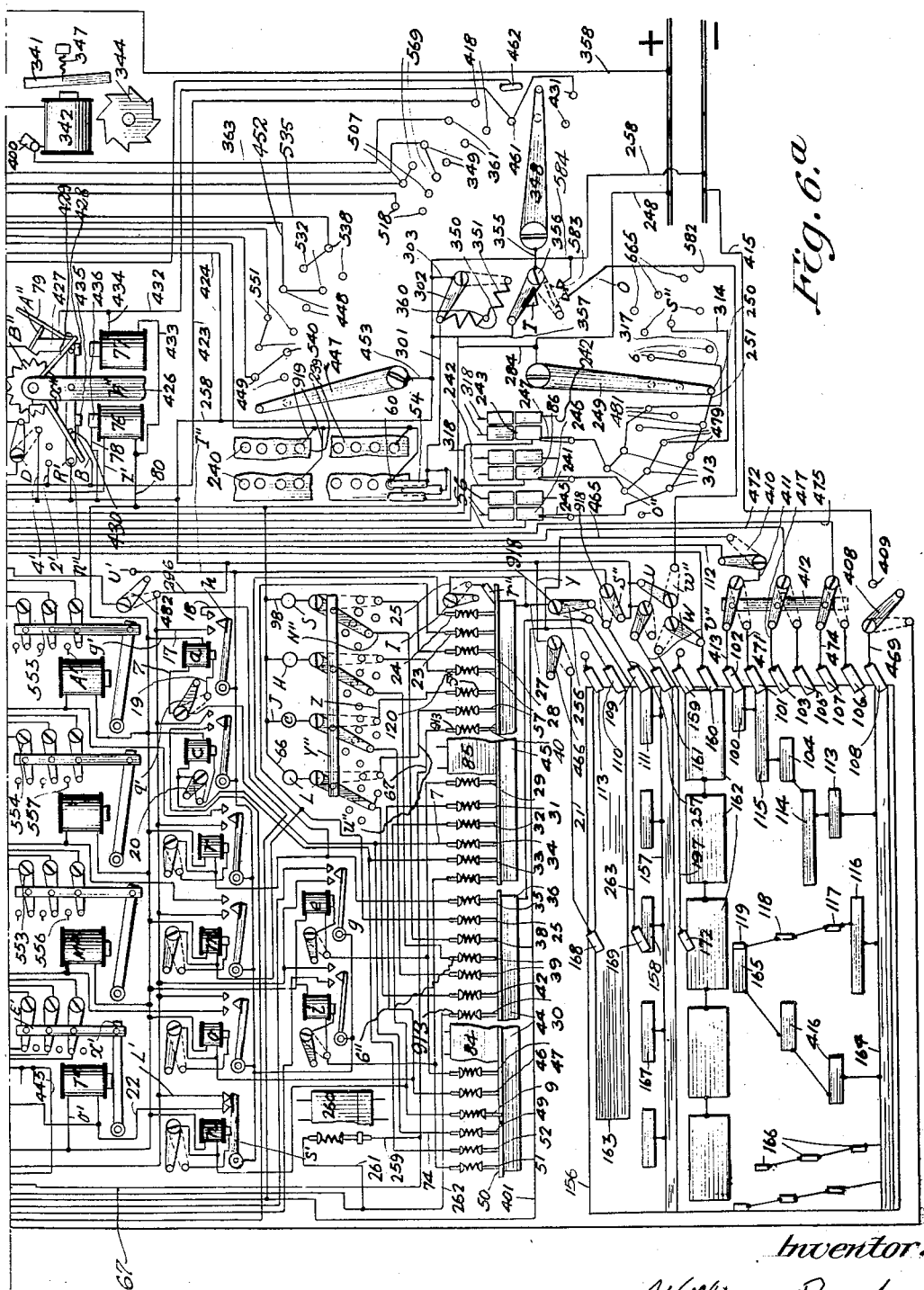

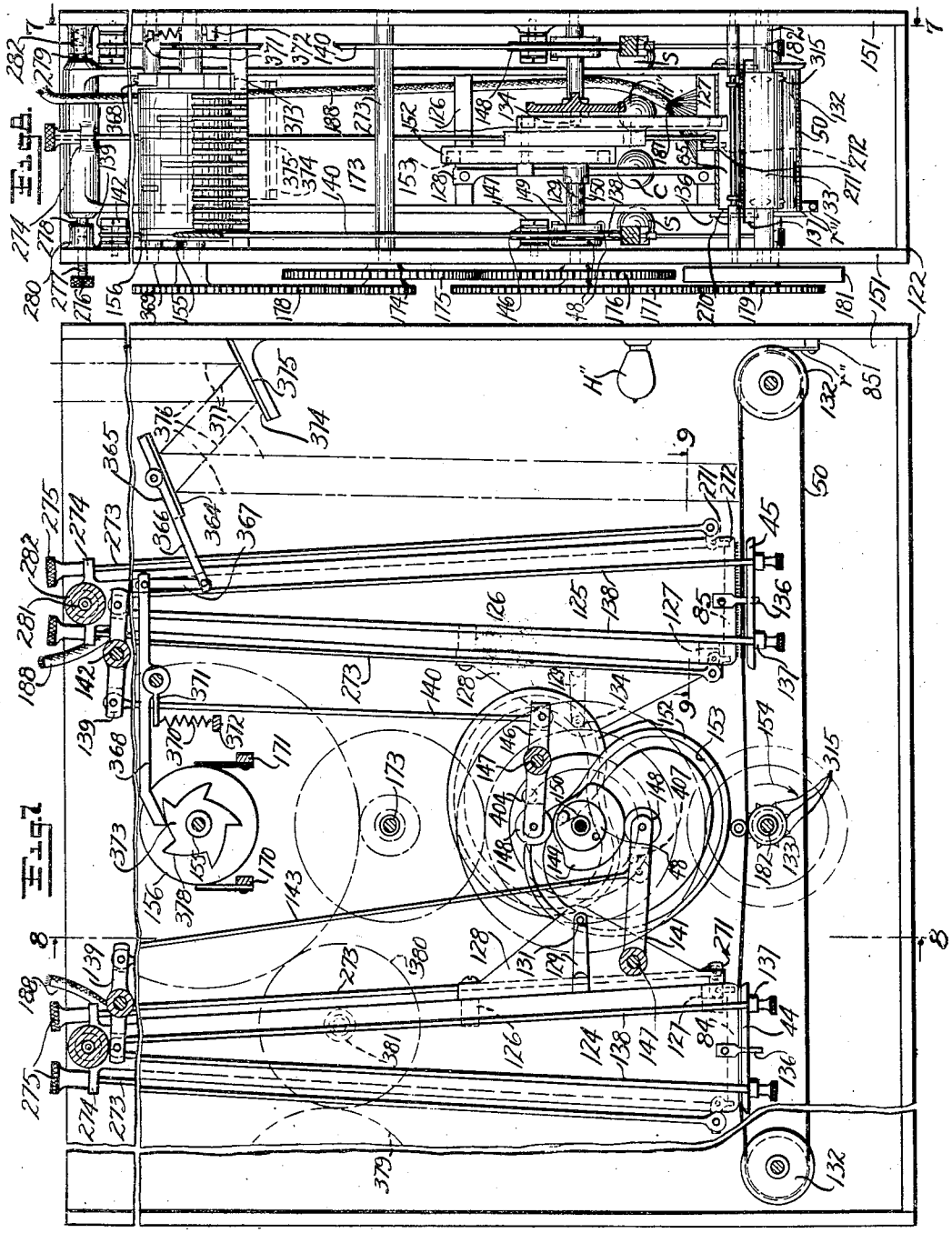

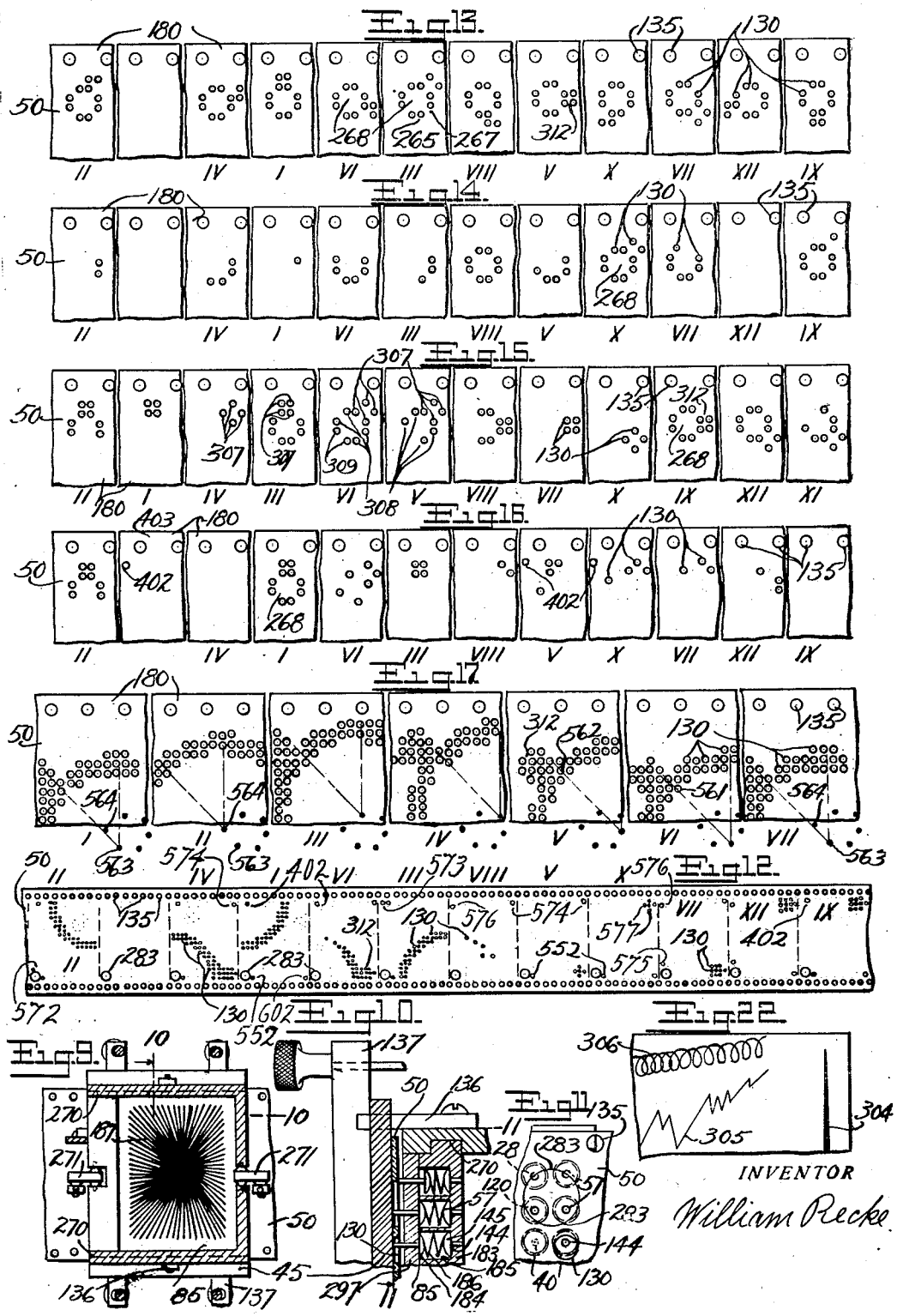

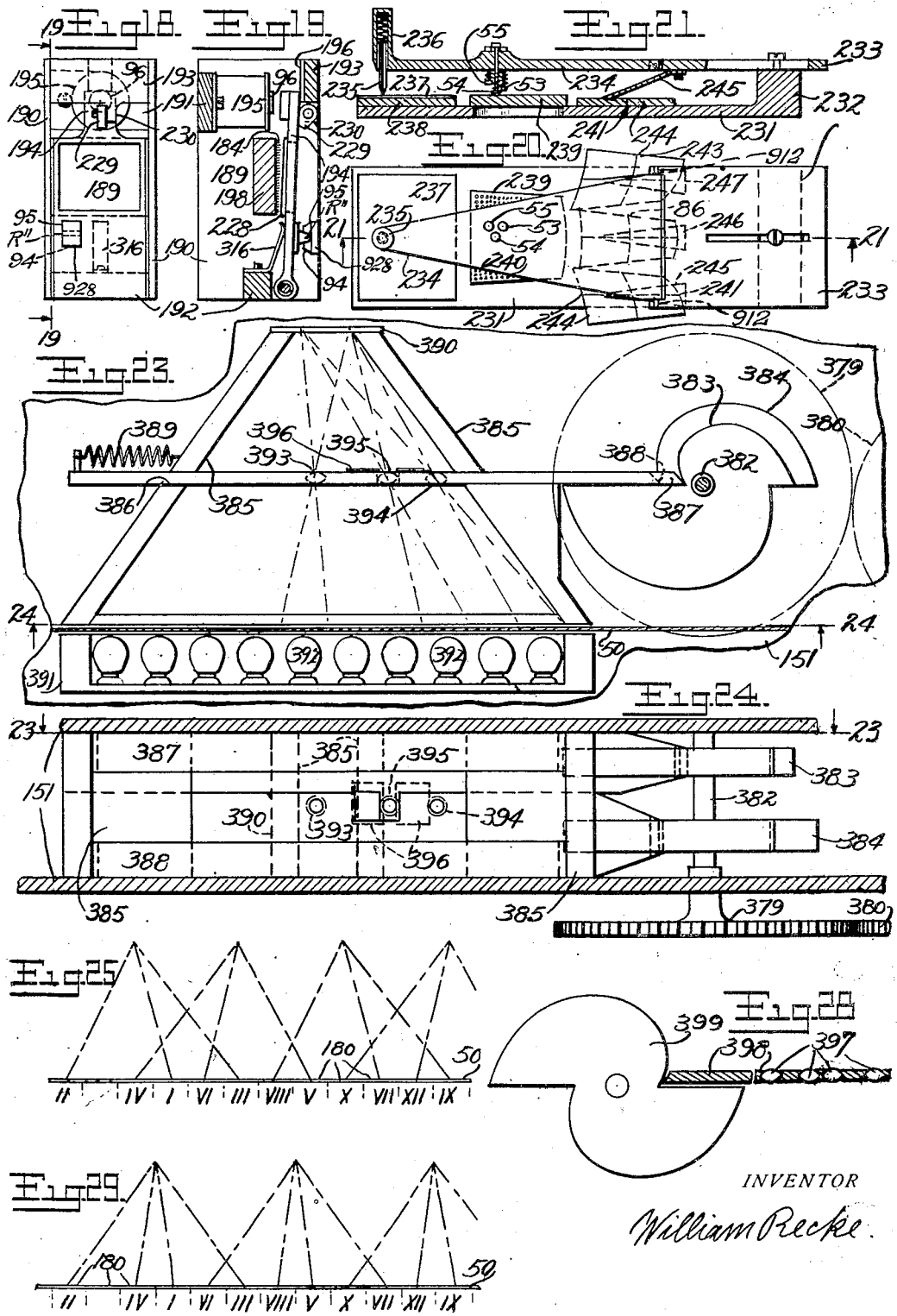

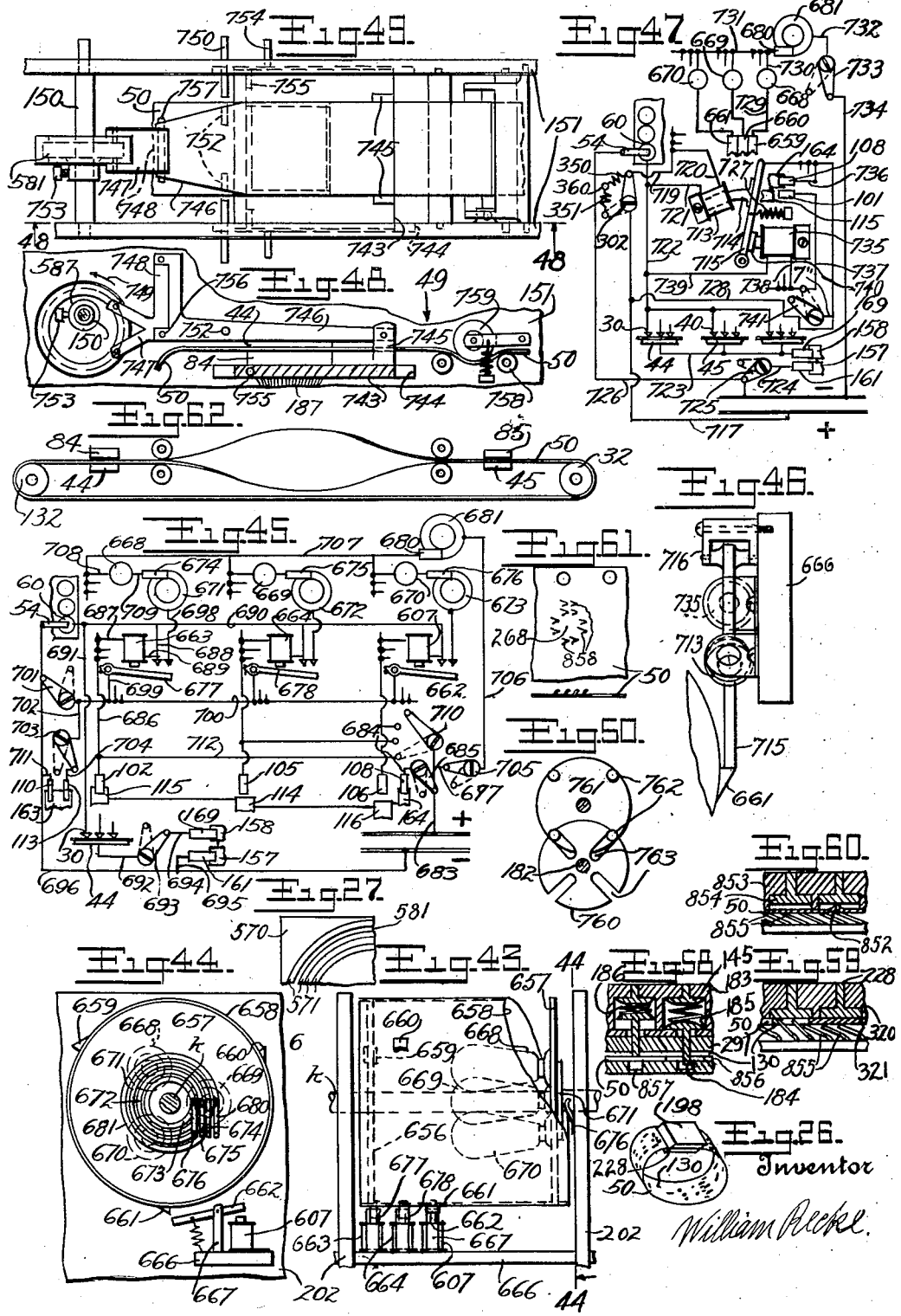

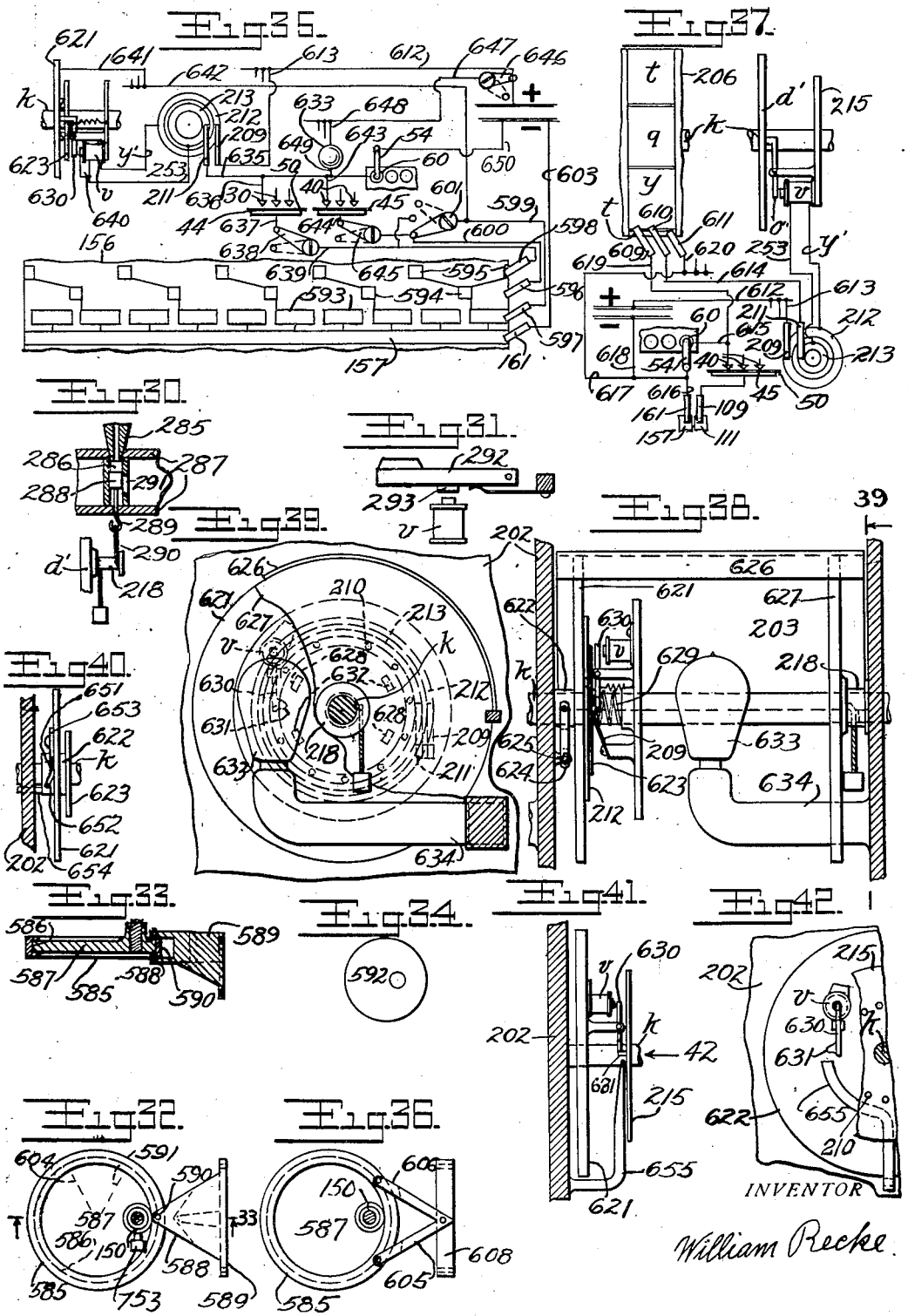

W. RECKE.
ELECTRIC SIGN.
APPLICATION FILED OCT. 30, 1916.
1,359,274.
Patented Nov. 16, 1920.
12 SHEETS—SHEET 9.
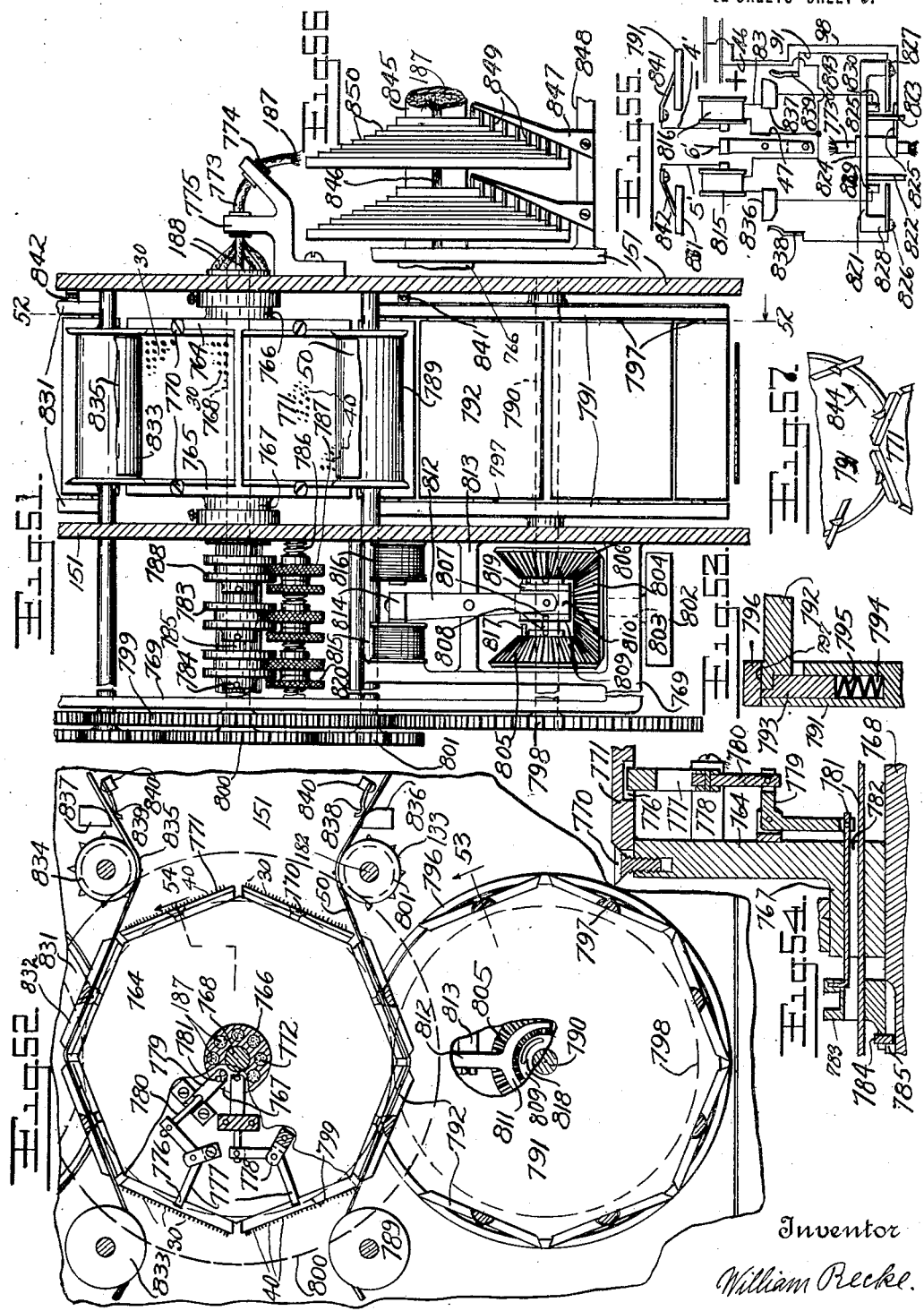
Inventor
William Recke.

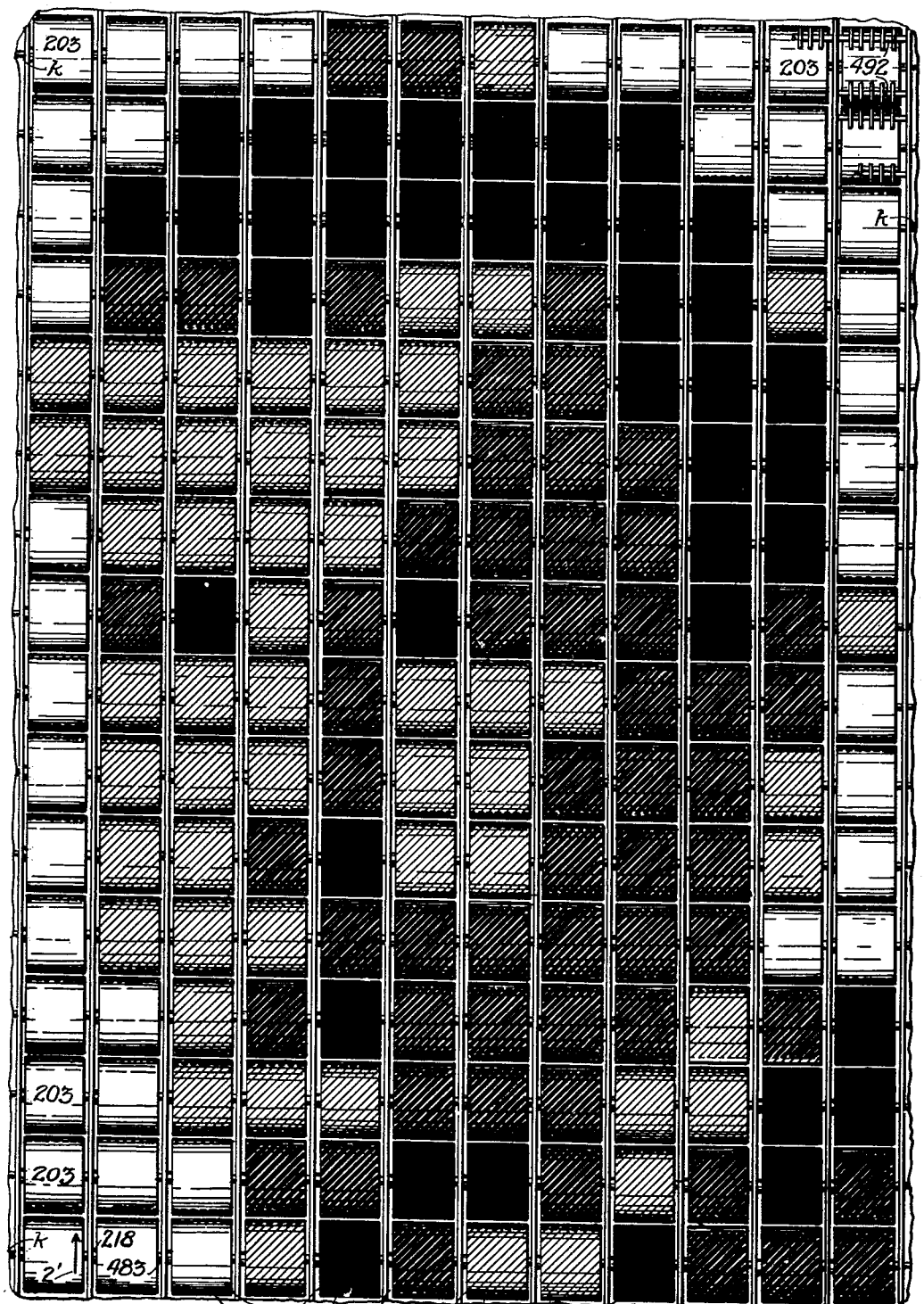

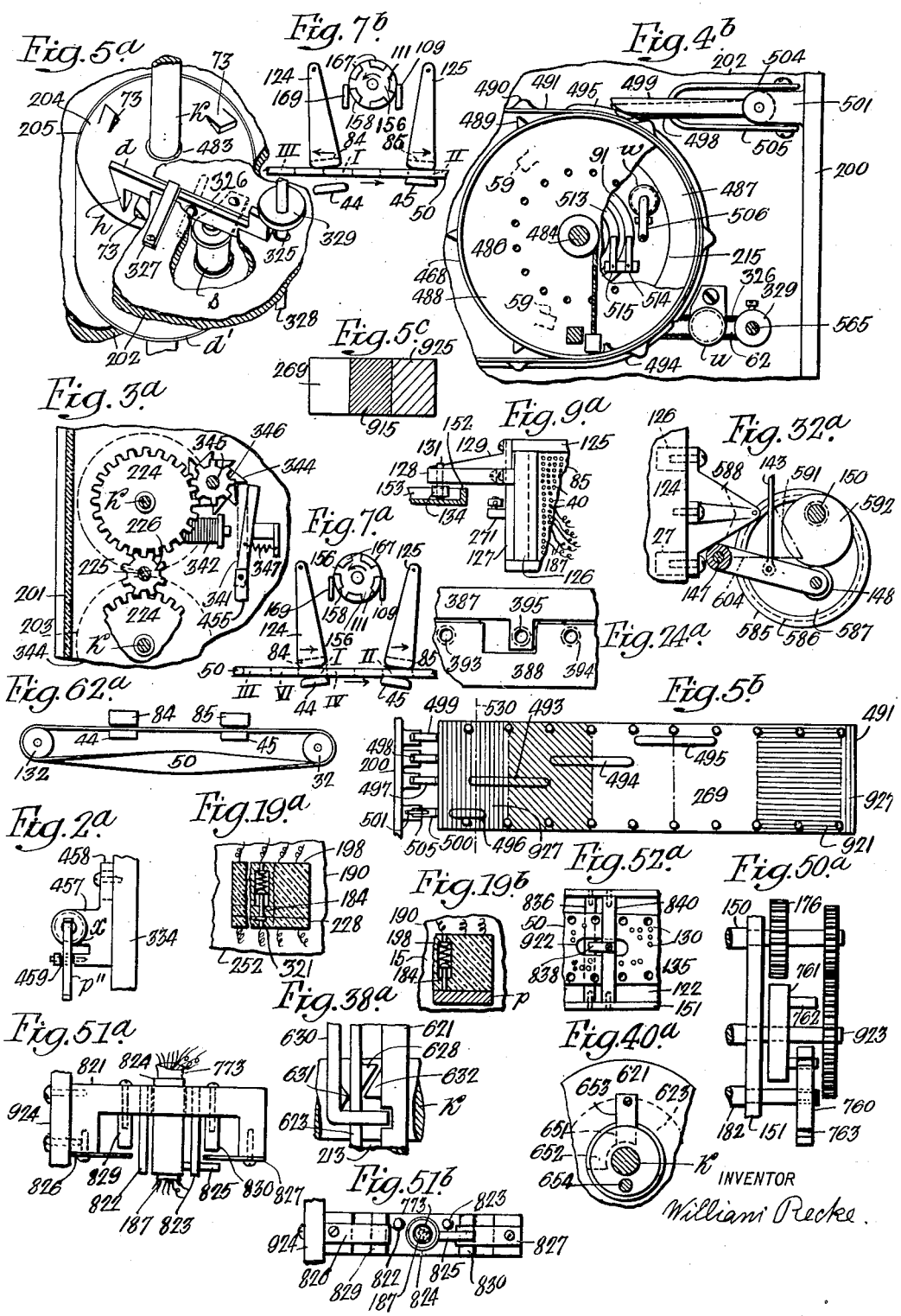

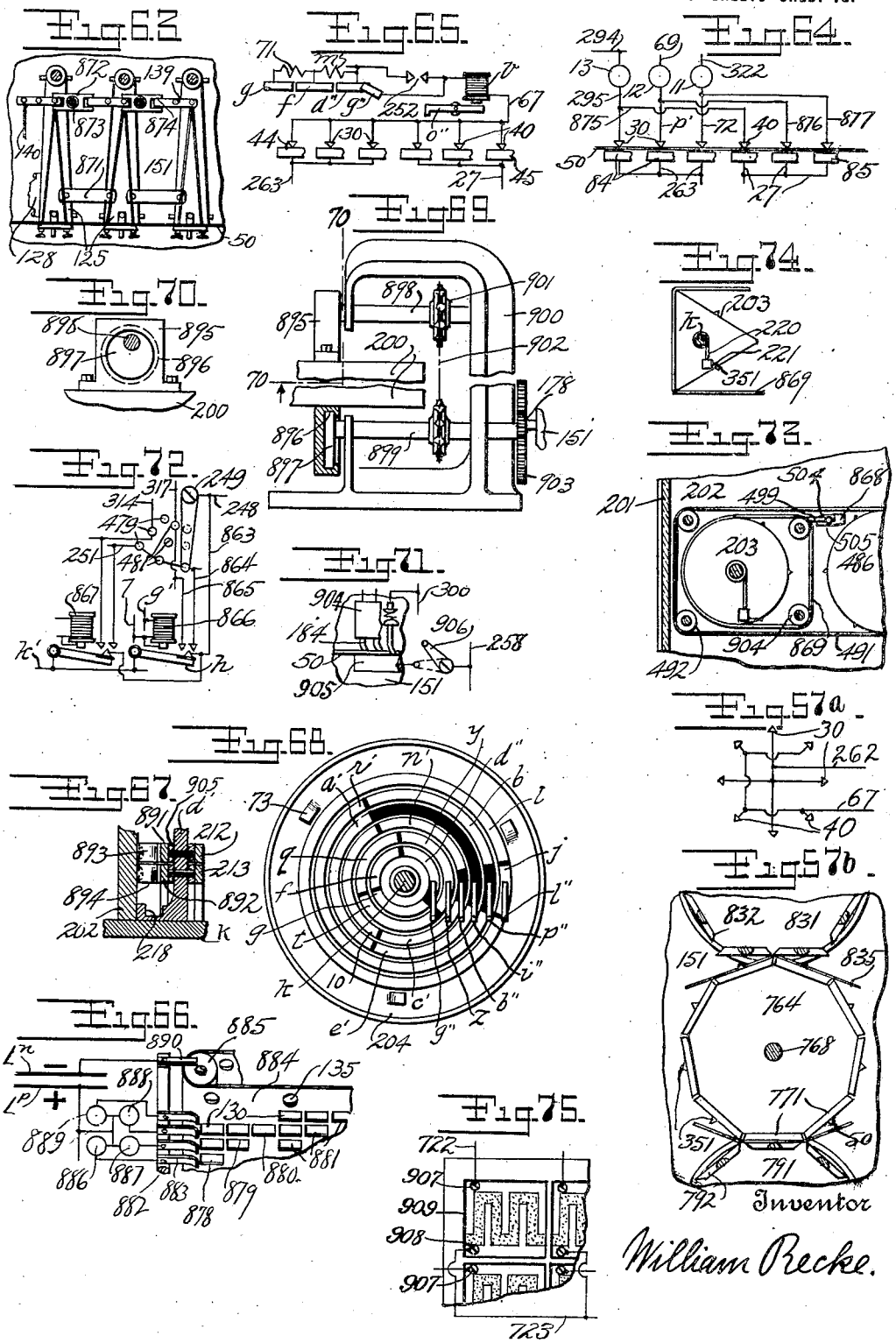

UNITED STATES PATENT OFFICE.

WILLIAM RECKE, OF NEW YORK, N. Y.

ELECTRIC SIGN.

1,359,274. Specification of Letters Patent. Patented Nov. 16, 1920.

Application filed October 30, 1916. Serial No. 128,549.

*To all whom it may concern:*

Be it known that I, WILLIAM RECKE, of New York city, in the State of New York, have invented new and useful Improvements in Electric Signs, of which the following is a specification.

This invention relates to electric signs, and particularly to signs the display surface of which is composed of a multitude of indicators or elements adapted to change their appearance, the appearance being changed only of selections or selectively obtained groups from among the indicators, the selections being such that pictures are formed on the sign by means of the contrast produced between the changed and the unchanged indicators. Electric current is preferably employed for selecting and operating the indicators each of which is ordinarily placed in a separate circuit which leads to a switching mechanism or transmitter, common to all the circuits. By means of the transmitter, successive selections from among the circuits are completed and current is transmitted therethrough for the production, by means of the contrast aforesaid, of a series of pictures such as photographs, sketches, script, etc., and when the photographs are depicted on the sign, the indicator elements each represent one of the points forming a photograph of the class commonly found in the newspapers, for instance, the necessary difference of conspicuousness among the different elements being effected by means described in my application S. No. 843,267, filed June 5, 1914, and by analogous means to be hereinafter described.

It is an object of the invention to provide an apparatus for producing a series of pictures without producing blank intervals during the changing from one picture to another.

Another object is to provide an apparatus of the class specified, whereby a large number of pictures may be serially displayed in a brief period in order to produce the illusion of an animated or otherwise moving picture.

A further object is to provide a combination of mechanisms by means of which pictures may be displayed during the day as well as at night.

A further object is to provide a mechanism of this class, by means of which pictures in colors, or shades, or both, may be displayed, whereby the shades or colors or both of a part or of the whole of the picture may be changed.

A still further object is to provide apparatus whereby automatic means and manually operable means may coöperate to produce a picture.

An object of the invention is also to provide means whereby the act of drawing or tracing a line, which may vary in thickness, will actuate means for reproducing on a sign of the class specified, a similar line and corresponding in thickness.

Another object is to provide means for imparting a slight movement to the picture as a whole, on the sign in order to render it more distinguishable.

Another object is to provide mechanism by means of which a great variety in the mode of display may be attained in order to rivet the gaze of spectators to the sign.

A still further object is to provide means for changing the background either simultaneously with or independently of the changing of the contrast of the picture.

A broad object is to provide a tape-controller both sides of which are provided with means for selecting the circuits.

Another object is to provide novel means for adjusting the relations between the tape and the terminals of the circuits during the movement of both.

Another object is to provide means for obtaining an image of a moving picture during or before its production on the sign in order to guide the operator during the production of sketch or script work in connection with said moving picture.

It is an object to provide means whereby the illusion of a thunderstorm, and its effect, may be produced on a display sign.

Another object is to provide a switching system whereby a picture requiring a large field of indicators may be produced by means of a transmitter having terminals inferior in number.

A further object is to economize in the number of wires connecting the transmitter with the sign, and of those connecting the various parts together.

A still further object is to avoid large, bulky terminal plates by admitting only a feeble current to the terminals, and providing relays for switching in a stronger current.

With these and other objects in view the invention consists in an apparatus of the class specified and hereinafter described, reference being had to the accompanying drawings, in which:—

Figure 1 is a front elevation of portions of a sign involving my invention;

Fig. 1ª, a view similar to Fig. 1 but with the outer display surface involving colors removed;

Fig. 2 a back elevation of the same and a section on the line 2—2 of Fig. 3;

Fig. 2ª, a view similar to Fig. 2 but showing only a portion of the construction there shown;

Fig. 3 a section on the line 3—3 of Fig. 2;

Fig. 3ª, a view similar to Fig. 3 but showing only a portion of the construction there shown;

Fig. 4 an enlarged view of one of the indicators shown in Fig. 3 and a section on the line 4—4 of Fig. 5;

Fig. 4ª, a view similar to Fig. 4 but showing only a portion of the indicator and showing the same in a displaced position;

Fig. 4ᵇ, a view similar to Fig. 4;

Fig. 5 a section on the line 5—5 of Fig. 4;

Fig. 5ª, a perspective view of a portion of the indicator;

Figs. 5ᵇ and 5ᶜ are views showing the shading and coloring of the display surfaces of the indicator;

Figs. 6 and 6ª a diagram pertaining to the circuits of the complete apparatus;

Fig. 7 a sectional side elevation, of the automatic portion of the transmitter and on the line 7—7 of Fig. 8;

Figs. 7ª and 7ᵇ are diagrams illustrating coöperation of different parts of the transmitter;

Fig. 8 is a section on the line 8—8 of Fig. 7;

Fig. 8ª, a view similar to Fig. 8 but showing only a portion of the construction there shown and showing the same enlarged;

Fig. 9 an enlarged section on the line 9—9 of Fig. 7;

Fig. 9ª, a view similar to Fig. 9;

Fig. 10 an enlarged section on the line 10—10 of Fig. 9;

Fig. 11 a section on the line 11—11 of Fig. 10;

Figs. 12 to 17, inclusive, are views of portions of the tape-controller, showing different arrangements of the circuit selectors;

Fig. 18 is a plan of a switch which I employ to be described;

Fig. 19 a section on the line 19—19 of Fig. 18;

Figs. 19ª and 19ᵇ are views similar to Fig. 19, but each showing a portion only of the form there shown and showing a modification;

Fig. 20 is a plan of the manually operable portion of the transmitter;

Fig. 21 a section on the line 21—21 of Fig. 20;

Fig. 22 a portion of a sheet of paper forming a part of the construction shown in Fig. 20;

Fig. 23 a view similar to Fig. 7 and a section on the line 23—23 of Fig. 24;

Fig. 24 a section on the line 24—24 of Fig. 23;

Fig. 24ª, a view similar to Fig. 24 but showing only a portion there shown;

Fig. 25 a view diagrammatically illustrating the operation of the construction shown in Figs. 23 and 24;

Fig. 26 a view similar to Fig. 19 but showing only a portion of the construction there shown;

Fig. 27 a view showing a portion of the construction shown in Fig. 26 and showing a modification;

Figs. 28 and 29 are views similar to Figs. 23 and 25, respectively, but each showing a modification;

Figs. 30 and 31, views showing means for employing portions of the apparatus of my construction in connection with the production of music;

Figs. 32, 32ª and 34, views similar to Fig. 7 but showing only a portion of the construction there shown and showing a modification;

Fig. 33 is a section on the line 33—33 of Fig. 32;

Figs. 35 and 37 are views similar to Figs. 6 and 6ª, Fig. 36, to Fig. 32 and Figs. 38 and 38ª, to Fig. 5, but each showing a modification;

Fig. 39 is a section on the line 39—39 of Fig. 38;

Figs. 40 and 41 are views similar to Fig. 38 but each showing only a portion of the construction shown in that figure and showing a modification;

Fig. 40ª is a different view of the construction shown in Fig. 40;

Fig. 42 a view looking in the direction of the arrow 42 of Fig. 41;

Fig. 43 a view similar to Fig. 5 but showing a modification;

Figs. 44 and 46 are sections on the line 44—44 of Fig. 43, Fig. 46 showing a modification;

Fig. 45 a diagram of the circuits employed in connection with the construction shown in Figs. 43 and 44;

Fig. 46 a view similar to Fig. 44 but showing only a portion of the construction shown in that figure and showing a modification;

Fig. 47 a diagram of the circuits employed in connection with the construction shown in Fig. 46;

Fig. 48 a section on the line 48—48 of Fig. 49 and a view similar to Fig. 7 but showing a modification;

Fig. 49 a view looking in the direction of the arrow 49 of Fig. 48;

Figs. 50, 50ª, 51, 51ª, 51ᵇ and 56 are views similar to Fig. 7 but showing only portions of the construction shown in that figure and each showing a modification;

Fig. 52 is a section on the line 52—52 of Fig. 51;

Fig. 52ª, a view showing portions of the construction shown in Fig. 52;

Fig. 53 an enlarged section on the line 53—53 of Fig. 52;

Fig. 54 an enlarged section on the line 54—54 of Fig. 52;

Fig. 55 a diagram of the circuits employed in connection with the construction shown in Figs. 51 to 54;

Fig. 56 a view similar to Fig. 51 but showing only a portion of the construction shown in that figure and showing a modification;

Figs. 57 and 57ᵇ are views similar to Fig. 52 but each showing only a portion of the construction there shown and showing a modification;

Fig. 57ª is a diagram of a modified portion of the circuits pertaining to Figs. 51 to 57;

Figs. 58, 59 and 60 are views similar to Fig. 10 but each showing a different modification;

Figs. 61 and 61ª illustrate details of the tape-controller showing modified circuit selectors;

Figs. 62 and 62ª are views, partly diagrammatic, similar to Fig. 7, showing the tape-controller differently mounted;

Fig. 63, a view similar to Fig. 7 but partly diagrammatic and showing a modification;

Figs. 64 and 65 are diagrams showing electric connections between the construction shown in Fig. 63 and that shown in Figs. 6 and 6ª;

Fig. 66 is a perspective view and a diagram, showing construction similar to that shown in Fig. 7 but showing a modification;

Fig. 67, a view showing a part of the construction shown in Fig. 5 and showing a modification;

Fig. 68, a reversed view of a part of Fig. 4 and showing a modification;

Fig. 69, a view showing means for moving the sign;

Fig. 70, a section on the line 70—70 of Fig. 69;

Fig. 71, a view showing connections between the construction shown in Fig. 7 and that similar to the one shown in Fig. 19;

Figs. 72 and 73 are views showing part of the construction shown in Figs. 6 and 5, respectively, and each showing a modification;

Fig. 74 is a view showing a portion of the construction shown in Fig. 73 and showing a modification; and, Fig. 75, a view, partly diagrammatic, showing photo-electric means for actuating the indicators.

In Figs. 1 to 27, inclusive, I have shown a complete display apparatus of my construction. Reference being had to Figs. 1 to 6, the sign comprises a case 200 having a glass front 201 and being provided with partitions 202 arranged vertically and forming bearings for a vertical series of horizontally mounted shafts $k$.

On each of the shafts $k$ is loosely mounted a series of display members 203 each comprising a pair of disks $d'$ and 204 connected together by means of a sheet of suitable material 205 which may be placed completely around said disks.

Between the disks $d'$ and 204, preferably provided with an extension 483 passing through said disk 204, and loosely mounted on the shaft $k$, is a non-rotary commutator-switch 206 the segments $y$, $q$, $t$, $b$, 10, $n'$, $a'$, $e'$, $r'$, $c'$, $j$, $l$, $d''$, $f$, and $g$ of which are better seen and enumerated in Fig. 6 and are of various lengths, and variously arranged, and brushes $z$, $b''$, $i''$, $p''$, $l''$, and $g''$ therefor are affixed to a projection 207 of the disk 204. Rotation of the commutator 206 with the shaft $k$ is prevented by means of a weighted rod 208, (Fig. 5) the brushes being adapted to move around said commutator. Brushes 209 and 211, exactly like those affixed to the projection 207 are affixed to a projection 214 of a disk 215 affixed to the shaft $k$, and engage collector-rings 212 and 213, respectively, which rings are affixed to but insulated from, the disk $d'$ as is shown at 905 in Fig. 67, for instance, where a modified form, to be hereinafter described, is shown.

The disk $d'$ is provided with perforations 210 arranged in a circle and adapted to be engaged by a hooked lever $o''$ (Fig. 5) pivotally secured to a projection 216 of the disk 215, and forming the armature of an electromagnet $v$ also affixed to said disk, said disk forming a support for said magnet. A spring 217 tends to hold the lever $o''$ away from the disk $d'$. A collar 218 is affixed to the outer side of the disk $d'$, and a flexible cord 219, carrying a weight 220, is affixed to and adapted to be wound on, said collar, and tends to normally hold a projection 221, provided on the inside of the sheet 205, against the weight 220 which normally rests adjacent to a projection 222 of the partition 202 but when the member 203 is displaced by means to be described, the weight 220 will be lifted and the projection 221 moved sidewise as is shown in Fig. 43.

One end of each of the shafts *k* reaches into a compartment 223 which embraces the whole length and width, of the case 200, and in which rotatable relations between all the shafts *k* are established, by means of gears 224 affixed to said shafts, and connecting gears 225 rotatably mounted on pins 226 affixed to the inner wall of the case 200. One of the shafts *k* projects through said wall, and is provided with a pulley 227 which may be belted to a suitable motor.

Referring now to the automatically operated portion of the transmitter, shown in Figs. 7, 8 and 8ª, within an open case 122 are pivotally mounted, at 278 and 279, two similar tapering arms 124 and 125.

One side of each arm is provided with bars 126 and 127 (Fig. 7ª) which form supports for a block 128 having a rib 129 which is secured to one edge of said arm to render the block 128 absolutely rigid, and a roller 134 is rotatably mounted on a pin 131 affixed to the outer end of the block 128.

Rotatably mounted within and near each lower corner of the case 122 is a guide roller 132 and a toothed roller 133 is rotatably mounted midway between the rollers 132, and an endless tape 50 is passed around the rollers 132 and over the roller 133 the teeth 315 of which register with apertures 135 provided near each edge of the tape 50.

Affixed to each side of the arms 124 and 125 are pins 136 (Figs. 9 and 10) between which the tape 50 is located, and upon the pins, but beneath the tape, are loosely mounted metallic plates 44 and 45 respectively having cross bars 137 in the ends of which are adjustably mounted both ends of rods 138 each of which is so bent as to form a loop by means of which said rod is attached to a rocker 139 loosely mounted on a screw 142 affixed to the inner side of the case 122, and with the other end of said rockers 139 are connected rods 143 and 140 which are also connected with levers 141 and 146, respectively, which levers are loosely mounted on screws 147 affixed to the case 122, the outer ends of said levers being provided with rollers 148 which engage the periphery of cams 149 adapted to rotate with a shaft 150 rotatably mounted in the sides 151 of the case 122. The rollers of the levers 141 engage the lower portion of said cams, while those of the levers 146 rest against the top of the same, and the construction of the cams is such that, when the shaft 150 is rotated, the plate 44 will be lowered while the plate 45 is raised, and vice versa, in such manner that the plate which is raised, will reach its raised position before the other begins to lower.

Adapted to rotate with the shaft 150 are also two grooved cams 152 the plain sides 911 of which face each other, and the grooves 153 of which are engaged by the rollers 134, and the construction of the grooves 153 is such that, when the shaft 182 is rotated in the direction of the arrow 154, more time will be consumed by the arms 124 and 125 for moving to the right, than when moving to the left, and the cams 152 are so placed with respect to each other, that said arms will move in opposite directions, except that before one arm ceases to move to the right, the other will begin to move that way. The cams 149 are so placed with respect to the cams 152, that the plates 44 and 45 will be in a raised position during most of the time their respective arms move to the right, and in a lowered position while said arms move to the left. The action of the arms and their respective plates will be further explained hereinafter in connection with the operation of the entire apparatus.

Affixed on a shaft 155 rotatably mounted in the sides 151 is a commutator-switch 156 also seen in Fig. 6ª provided with segments 111, 157, 158, 162, 163, 113, 114, 104, 115, 100, 164, 119, 165, 166, 167, 116, 416, 118, and 117 shown developed in Fig. 6ª and of various lengths, and engaged by brushes 109, 161, 160, 159, 110, 107, 102, 108, 101, 103, 105, 861, and 160 affixed to a cross bar 170 affixed to the sides 151, and to a similar bar 171 are affixed brushes 169, 168, and 172 which engage the commutator 156 on the side exactly opposite to that engaged by the brushes of the bar 170 (Figs. 7 and 8).

Midway between the shafts 150 and 155 is rotatably mounted a shaft 173 to which are affixed gears 174 and 175, and gears 176 and 177 are affixed to the shaft 150, while a gear 178 is affixed to the shaft 155, and a gear 179, to a shaft 182 which supports the roller 133 and to which is also affixed a pulley 181 which may be belted to a suitable motor, and the sizes and the meshing of the several gears, are such that during each revolution of the shaft 155, the shaft 150 will complete five, and the shaft 182 ten revolutions.

The tape 50 is measured off into blocks 180 (Figs. 13 to 17) each of which are adapted to engage the widest end of the arms 124 and 125, and the size of the roller 133 is such that the tape will have advanced by two blocks with each revolution of the shaft 150. Owing to the peculiar construction of the grooves 153 of the cams 152, the movement of the arms to the right has the same speed, as has that of the tape. The tape is so placed over the teeth 315 of the roller 133, that the order of engagement of the blocks 180 with the arms 124 and 125 by reason of the action of the plates 44 and 45, respectively, will be as is indicated by the numbers (Fig. 12), the odd numbered blocks being adapted to engage the arm 124, while the even numbered blocks pertain to the arm 125. It is evident that, by varying the space between the arms, the numbering of the blocks will vary.

The arms 124 and 125 are provided with terminal or contact plates 84 and 85 respectively, having yielding contacting surfaces comprising terminals or contacts 30 and 40, respectively, all being alike and shown in detail in Figs. 10 and 11. The plates 84 and 85 consist each of sheets 183 and 297 of insulating material suitably joined together and each having a multitude of holes 144 into which pins 145 and 184 respectively, are placed, the sheet 183 having also cavities 185 (Fig. 10) accommodating the heads of the pins 145 and 184, and springs 186, which tend to force the pins 184, which are loosely mounted, outward, and which also provide electric connection between the pins 145 and 184. A wire shown at 187, leads from each pin 145 into a cable 188 (Fig. 8), and toward the sign connections between each of said wires and one of the indicators, as will be hereinafter described, the arrangement of the indicators being preferably similar to that of the contacts 30 and 40.

The tape 50 may be of paper, and provided with holes 130 each registering with one of the pins 184, and adapted to permit contact between said pin and one of the plates 44 and 45, as will be hereinafter explained.

The mode of display of an advertising sign, in addition to the display itself, must be frequently changed in order to continuously attract the attention of the public. This often necessitates rearrangement of wiring. I provide a group-switch 189 (Figs. 18 and 19) by means of which a great number of circuits may be either interrupted or completed, in an instant. The switch which is located at a convenient place near the display apparatus, comprises a frame consisting of sides 190 connected by means of bars 191, 192 and 193. Between the sides 190 is pivotally mounted an arm 194, which serves as an armature for an electromagnet 195 affixed to the bar 191, and a spring 316 affixed to the bar 192 tends to hold said arm against a block of metal 196 affixed to the bar 193. A contact plate 198 provided with contacts which are exactly like the contacts 30 and 40 (Fig. 6ᵃ) is affixed to the sides 190, and a contact plate 228 a portion of which is shown in Fig. 59, and which consists of an insulating sheet 320 provided with pins 321 sunk flush with the face of said sheet, is so affixed to the arm 194 (Fig. 19) that the pins 321 will register with the pins 184 (Fig. 58) of the plate 198, and a turn-button 229 pivotally secured to a projection 230 of the bar 193, is adapted to hold the plate 228 against the plate 198.

In Figs. 20 and 21, I have shown the manually operable addition to the transmitter aforesaid, located in a convenient place within reach of the operator and comprising a base 231 provided with a projection 232 forming the pivotal point for an arm 233 slidably mounted and having a portion 234 pivoted at 912 the extreme free end of which is hollow, and contains an ordinary lead pencil 235 held by means of a spring 236 against a sheet of paper 237 placed on a tablet 238 affixed to the base 231. Adjacent to the tablet 238 is a tablet 239 provided with contacts 60 and 240 (Fig. 20) which is like the pins 321 of the switch 189 (Fig. 19ᵃ) while the tablet 239 is like the sheet 320 of said switch. The arm-portion 234 supports also spring operated styles or pins 53, 54 and 55 of different lengths (Fig. 21) adapted to engage the contacts 60 and 240, and tablets 241, 86 and 243 each consisting of four peculiarly shaped blocks of metal 244 suitably secured to the base 231 and insulated from each other, are adapted to be engaged by wedge-shaped spring contacts 245, 246, and 247, respectively, affixed to the arm 233. If the portion 234 is so held, that the pencil 235 will rest lightly on the sheet 237, the longest pin 54 will rest on the tablet 239, but if said portion is depressed until said pencil is pressed tightly against the sheet, all three of said pins will engage said tablet, and if the arm-portion 233 is either oscillated, or slid, or both, so that the pencil will mark the sheet, one or more of said pins will ride over the contacts 60 and 240, and the contacts 245, 246, and 247 will slide over the tablets 241, 86 and 243, respectively.

In Figs. 6 and 6ᵃ, I have shown the electric circuits, and have indicated the coöperation of the transmitter with the sign, and although I have shown one of the indicators only, in said figures, and only that contact pertaining to said indicator, connected up in each of the contact plates therein shown, I have indicated, by means of two short wire ends, the proper place for making connections with either the wires or other parts pertaining to two others of the indicators employed, as will be evident from the following description.

Current is supplied to a wire $Lp$ from, and returns through a wire $Ln$ to, a suitable source of energy, and, the various switches and other parts being in the position shown, if the contact 40 of the plate 85 is permitted to reach the plate 45, current will be free to pass from said wire $Lp$, through a wire 248, (Fig. 6ᵃ) a dial switch 249 and its contact 250, wire 251, contact 245 (Fig. 21), tablet 241, wires 56 and 106, segment y, brush z (Fig. 5), and wire 3, to a group-switch 252 (Fig. 19ª) which is exactly like the switch 189, except that no arm 194 is required, the plate 198 being simply placed over the plate 228; thence through the wire 37, brush 209 (Fig. 5), ring 212, wire y', magnet v, wire 253, ring 213, brush 211, wires 254, and 255, switch 189 (Fig. 19), wire 67, contact 40, plate 45 (Fig. 10), wire 27, switch 256, wire 257, brush 109 (Fig. 8), segment 111, segment 157, which is electrically connected with it, brush 161, wire v'', switch U, which, together with the switch 249 and other similar switches shown in Figs. 6, 6ª and other diagrammatic figures, to be hereinafter referred to, are preferably mounted on a common switch board (not shown) within reach of the operator, and wire 258, to the wire L$n$. This energizes the magnet v, and draws the lever o'' against the disk d'. If the contact 30 of the plate 84 is caused to engage the plate 44, a branch circuit will be formed, and current will be free to pass between the wire 67 and the brush 161 also through a wire 259, to a group-switch 260 which is exactly like the switch 252, thence through wires 261 and 262, contact 30, plate 44, wire 263, brush 169, and segments 158 and 157, and the magnet v will be energized independently of the relations between the contact 40 and the plate 45.

The operation is as follows:

The shafts k, 150, 155, 173 and 182 are continuously revolving, and the tape 50 steadily traveling, and by means of the cams 152, the arms 124 and 125 are one after another given a movement in the direction and at the speed of the movement of the tape, in such order that before one of the arms ceases to travel with the tape, the other arm will have begun to do so and will continue to so travel until the first mentioned arm has returned in position to resume its movement with the tape, and it is evident that the tape will continuously be followed either by one or by the other of said arms. During the movements of the arm 125 with the tape, the plate 45 will press the tape against the plate 85 by means of the cams 149, and the brush 109, connected with said plate by means of the wire 27, switch 256 and wire 257, will rest on one of the segments in the path of which it is placed (segment 111, in the present instance), and the plate 44 will cause engagement between the tape and the plate 84 during similar movements of the arm 124, when the brush 169, pertaining to said arm, will engage one of said segments (segment 158, at present,) and if blocks 180 provided with holes 130 registering with the contacts 30 and 40, are successively and persistently presented for engagement, current will pass through the magnet v, and the lever o'', which is constantly encircling the disk d', will fall into one of the perforations 210, and cause the rotation of the display member 203 in the direction of the arrow 2'. This will continue until the segment y of the commutator 206 has passed from under the brush z, when the circuit will be interrupted at that point, the magnet deënergized, the display member freed, and a backward movement imparted to it by means of the weight 220. But the slightest backing of the display member will again place the segment y under the brush z, close the circuit, and cause said member to again move forward until said brush is again free of said segment, and the member will therefore be practically at a standstill in its actuated position, so long as blocks 180 having holes which register with the contacts 30 and 40, are presented. If a block engaging the plate 85, for instance, contains no hole for the contact 40, the member 203 will retain its operative position (providing the block engaging the plate 84 has such hole) until the segment 158 has passed from under the brush 169, which will be before contact between the plate 44 and the contact 30 is broken, and sparking will consequently be prevented at said contact. Sparking at the contacts 30 and 40 is also prevented at the moment the plates 44 and 45 touch them, since the brushes 109 and 169 engage their segments and thereby close the circuits, after said touch.

In Fig. 6ª, a portion of the plates 84 and 85, and in Fig. 6 of the various group-switches, accommodating only two contacts side by side, is shown, a third contact, shown at 913 in said figures, which only is connected up, being dislodged. From said two contacts, short wire-ends are protruding, indicating further connections akin to the one shown; for instance, the wire-end next to the connected up wire 261, of the group-switch 260, is to be connected with that wire-end of the plate 84, which is next to the wire 262, and that wire-end of said switch, next to the wire 259, to that wire-end of the plate 85, next to the wire 67; the wire-end next to the wire 106 leading to the segment y of the display member 203 shown in this figure, to the segment y of the member 203 next to the first named member, etc.

As aforesaid, the indicators, and the contacts of the various plates, are preferably arranged and connected up correspondingly; that is to say, if the contact 40 registering with the hole shown at 267 in Fig. 13, for instance, is in circuit with the magnet v of the indicator shown at 264 in Fig. 1, the contact 40 registering with the hole shown at 265 in the first said figure will be in circuit with the magnet v of the indicator shown in the last said figure at 266, and so on.

In Fig. 13, I have tried to show, on blocks 180 of the tape 50, a finger ring 268 formed by perforations requiring a field of but a few contacts; but although this number is sufficient for demonstration, a far greater number of contacts will be required for practical results. If the block I of said figure, for instance, is placed between the plates 84 and 44, and the shaft 182 rotated until the plate 44 is raised and until the brush 169 engages a segment pertaining to it (presupposing that the shafts $k$ are continuously rotating), the portion 269 (Fig. 1) of the sheets 205 normally displayed, of the corresponding display members, will be caused to disappear from view by reason of the fact that said display members will have completed nearly one third of a revolution, the segment $y$ embracing one third of the circumference of the commutator 206, as is diagrammatically shown in Fig. 6 said commutator, together with the commutator 156 shown in Fig. 6ª being shown developed in Fig. 5ᶜ and located between dotted lines 929 and 930 shown in Fig. 4. The normally displayed one third 269 of each sheet 205 shown developed is white, while the first actuated third 915, shown between the dotted line 930 and a dotted line 931, is dark brown; and it is evident that the contrast produced between the actuated and the idle display members by means of the block of the tape, just described, will cause the representation on the sign of the ring designed on said block. If now a block of the tape, having a different design, is placed between the plates 45 and 85, and the shaft 182 rotated until the new block is clamped between said plates, and until contact between the brush 109 and one of the segments pertaining to said brush is secured, which will occur when the arms have assumed the position shown in Fig. 7ª, the new design will appear on the sign while the ring is still visible. By causing the shaft 182 to rotate a little longer, the parts shown in this figure will be brought into the position shown in Fig. 7ᵇ; the ring will be erased, and the new design will remain on the sign. But supposing the new design to be the same ring, but only slightly changed, as on the block II shown in Fig. 13, for instance; then the ring previously displayed on the sign will appear to have slightly changed as examination of the holes 130 of said block will show. By causing the blocks 180 to engage their respective plates in the order indicated by the numbering shown in this figure, the ring on the sign will appear to have turned half way around, the stud 312 of the block IX, now involved, pointing downward, while said stud points upward in block I, first engaged. If the design shown in Fig. 14 is employed, it will appear as though the ring was sketched directly on the sign, one element after another being caused to come into view. It is to be noted that throughout the description, the odd numbered blocks pertain to the plate 84, and the even numbered, to the plate 85.

Since a feeble current will energize the magnets $v$ to a degree sufficient for actuating the levers $o''$, extremely thin wires may be safely employed in the arms 124 and 125, and the resulting lightness of said arms will permit oscillations of a speed sufficient for causing the production of moving pictures of the type produced by the cinametograph, which machine also employs a tape the design of which is divided into blocks, as will be known to those versed in the art.

It is all-important that the blocks of the tape register minutely with the plates 84 and 85 in order to prevent the pins 184 from striking an edge of the holes 130, and although said holes may be many times the size of said pins, which may be extremely thin, deficiency of register, caused by a swelling, or shrinking, of the tape, for instance, and not noticeable before the "run" of the picture, may occur. I provide means for detecting such defects, and means for correcting them, during operation. To that end, each of the plates 84 and 85 is slidably mounted in grooves 270 (Figs. 7 and 8) provided on the opposite sides of the arms 124 and 125, and each free side of said plate is provided with a bell-crank 271 one end of which rests in a cavity 272 of the same, the opposite end being connected with a rod 273 which is loosely mounted in a projection 274 of each arm, and above said projection is an adjusting-screw 275 which is screwed on the upper end of said rod. One of the bell-cranks 271 is pivotally mounted in the bar 127, the other being similarly secured to the wall of the arm, opposite said bar, and it is evident that, by means of loosening one of the screws 275, and tightening the other, of either of said arms, the respective plate will be shifted longitudinally of the tape. As the screws 275 are near the pivotal point of the arms, the oscillations of said arms will not interfere with the adjusting process. Transverse adjustment is secured by means of a screw 276 (Fig. 8) the threaded shank 277 of which is screwed through one of the sides 151, and abuts the pivot 278 of the arm, which, and the opposite pivot 279, are loosely mounted in cylindrical projections 280 and 282, respectively, provided at the top of the case. The pivot 279 abuts a spring 281 placed in the projection 282, and if the screw 276 is given a turn, the whole arm will be shifted, and by means of the spring 281, the pivot 278 will be held against the shank 277 of the screw 276.

In order to detect any inaccuracy of register, I provide a signal mechanism, comprising contacts 28, 120, 5 and 57 (Fig. 11) in the plate 85, and similar contacts 38, 6, 39 and 42 in the plate 84 (Fig. 6ª), and a hole 283, accommodating four of said contacts, as is shown in Figs. 11 and 12, may be provided on each of the blocks 180 of the tape, the hole 283 being just large enough to permit said four contacts to simultaneously pass through said hole when the register is perfect. Lamps S, H, L and C (Fig. 8) are provided in the case 122, and the various parts of the construction being in the position shown in Figs. 6 and 6ª, except a gang-switch Y″ which is placed in dotted position, if the contact 57 is permitted to reach the plate 45, for instance, current will be free to pass from the wire L$p$, through the wires 248, 284 and 66, lamp L, a gang-switch Y″, wire $u''$, contact 57, plate 45, wire 27, switch 256, wire 257, brush 109, segments 111 and 157, brush 161, wire $v''$, switch U, and wire 258, to the wire L$n$. This energizes the lamp L. If the arm 125 is adjusted so that the contact 28 is also free to enter the hole 283 (Fig. 11), a branch circuit will be completed, and current will be free to pass from the wire 66 to the plate 45 also through wire 98, lamp S, switch Y″, wire N″, and contact 28. If the gang switch Y″ is shifted to full position, and the contact 120 allowed to enter a hole 283, a new branch circuit will be formed, and current will be free to pass from the wire 66 to the segment 157 through wire J, lamp C, switch Y″, wire Z, contact 39, plate 44, wire 263, brush 169 and segment 158, and it is evident that, during operation, the adjustment may be continued until the glowing of all four lamps indicates that four contacts are passing through holes 283, and that the register, with respect to the arm subjected to the process of adjustment, is perfect.

Although the invention is adapted for display purposes, it is useful for any purpose requiring a multitude of selective circuits, too great to terminate in a single row, as for automatically operating the instruments of an orchestra, for instance. Each contact 30 and 40 in a longitudinal row may be associated with a different instrument, while each of said contacts of a transverse row may pertain to different notes of the scale. Each block of the tape may designate a demi-semiquaver, the change of tempo being effected by a change in the speed of the shaft 182. In Fig. 30, I have shown a portion of an organ pipe 285 which rests on an air chamber 286 of a compressed air tank 287. A stopper 288 is provided with a rod 289 which projects through the tank 287 and is provided with a flexible chord 290 attached to the spool 218 of the disk $d'$, and said stopper is normally held above a slit 291 by the pressure of air behind it, provided in a partition wall of said tank and leading into said chamber 286, but when the disk $d'$ is rotated as hereinbefore described, said stopper will be drawn downward, and air will be admitted to the pipe 285 through the slit 291, as is evident. In Fig. 31, the magnet $v$ is shown beneath a manual key 292 which is provided with a block of iron 293 forming the armature of said magnet, and it is evident that when the magnet $v$ is energized, the key 292 will be depressed, and will remain so, so long as blocks of the tape having holes pertaining to said magnet, are presented to the arms 124 and 125. It is to be understood that the magnet $v$ in this instance is to be affixed to some stationary support instead of to the rotatable disk 215 hereinbefore described.

To the commutator 206 of each display member 203 are affixed lamps 11, 12 and 13 (Figs. 4 and 5) by means of which display may be produced in connection with or independently of the rotation of the members 203. I provide a group-switch 15 which is exactly like the switch 252 (Fig. 19ª), and if said switch 15 (Fig. 6) is closed, the switch 189 (Fig. 19) opened by turning the button 229, a switch 63 placed in dotted position, and the contact 40 (Fig. 11) caused to engage the plate 45, current will pass from the wire L$p$, through the wires 248 and 284, switch 63, wire 294, lamp 13 (Fig. 5), wire 295, switch 15 wires 70 and 67, contact 40 and plate 45, and thence to the wire L$n$ through the path hereinbefore described. This will energize the lamp 13, instead of the magnet $v$. If contact is next made between the contact 30 and the plate 44 (Fig. 7) as aforesaid, the branch circuit between the wire 67 and the segment 157 will be completed as aforesaid, and the lamp 13 still energized, and if blocks 180 of the tape 50, successively presented to the plates 84 and 85, have holes 130 registering with the contacts 30 and 40, the energization of the lamp 13 will be uninterrupted. If the switches 189 and 15 are both closed, the lamp 13 will be energized simultaneously with the energization of the magnet $v$ and the resulting rotation of the member 203, and if the sheets 205 are composed of transparent material, such as celluloid, or waxed paper, and if the portion 269 (Fig. 5ᶜ) of said sheets is stained white, while the portion 915 displayed when the members 203 are rotated one-third revolution, is stained brown, for instance, a brown ring on a black background will be displayed if one of the perforated blocks of the tape shown in Fig. 13 is employed, and if the sign is operated at night, because although the background is white, it will not be illuminated, the lamps 13 becoming lighted only when the colors of the sheets 205 are changed. For the same reason a white ring on a black background will be shown when the lamps 13 alone are energized as aforesaid.

If the lamps 13 are all caused to be continuously lighted during the production on the sign of the ring 268 by means of the rotation of the members 203, a brown ring on a white surface will be displayed, as is evident. To effect this, I provide a plain metal plate $p$ (Fig. 19$^b$) similar to the plates 44 and 45, and place the plate 198 of the group switch 15 over said plate $p$, and current will now be free to pass from the wire L$p$, through the wires 248 and 284, switch 63, wires 294 lamps 13, wires 295, plate 198 of switch 15, plate $p$, and wires 296 and 258, to the wire L$n$.

I provide means whereby the energization of the lamps 13 will be controlled by the movements of the display members 203. If said members are rotated as aforesaid (see Fig. 6), each respective segment $b$ is caused to engage its brush $p''$, and if a switch $a''$, is placed in dotted position, the switch 15 being open, current will pass from the wire L$p$ also through the wires 248 and 284, switch 63, wire 294, lamps 13, wires 295 and 65, brushes $p''$, segments $b$, wires 2, and $b'$, switch $a''$, wire A, switches W and U and wire 258, to the wire L$n$, and the lamps 13 will be energized when the members 203 begin to rotate, and deënergized when said members have returned to normal position.

If the switch W is placed in dotted position, the brushes 160 and 172, and the segments 162, will be interposed in the circuit last described, and current, before reaching the switch W, will be compelled to pass from the wire A, through the brush 160, three of the segments 162, brush 172, and wire 197, and the segments 162 are each of such a length, that the circuits through the lamps 13 will be interrupted before the circuits through the magnets $v$ are interrupted by means of the brushes 109 and 169, and closed after said last named circuits are closed, and by this means, sparking is prevented between the segments $b$ and the brushes $p''$, and a slight flickering effect, which may be desirable for certain modes of display, is produced.

Presupposing the display member 203, and the various switches, to be in the position shown in Figs. 6 and 6$^a$, if the pencil 235 (Figs. 20 and 21) is placed on the sheet 237 so that the pin 54 rests on the contact 60, as is indicated in Fig. 6$^a$, a circuit will be completed through the magnet $v$, since current will be free to pass from wire L$p$, through wire 248, switch 249, contact 250, wire 251, contact 245, tablet 241, wires 56 and 106, segment $y$, brush $z$, wire 3, switch 252, wire 37, brush 209, ring 212, wire $y'$, magnet $v$, wire 253, ring 213, brush 211, wires 254, 255 and 298, a group-switch 299 which is similar to the switch 189, wire 300, contact 60, pin 54, wire 301, a switch 302, and wires 303 and 258, to wire L$n$, and current will be free to pass through the magnet $v$ independent of the movable transmitter parts just described. If the pencil 235 is slid over the sheet 237 until the pin 54 rests on one of the contacts 240, the magnet $v$ of the corresponding display member 203 will be energized, as is evident, and if the arm portion 234 is depressed until one or both of the pins 53 and 55 each come in contact with one or more of the contacts 240, in addition to the pin 54, it is evident that additional magnets $v$ and members 203 will be actuated. If a line is drawn on the sheet 237, the illusion will be produced on the sign as though an object were crossing it, and if said line is caused to increase in thickness, as is shown at 304 in Fig. 22 and which is accomplished by gradually increasing pressure on the member 234 during this operation, said object will appear to grow as it moves across said sign, because while said member is but lightly depressed, the pin 54 alone will ride over the contacts 240, but when the pins 53 and 55 will also have reached the tablet 239, three or more display members abreast will be actuated simultaneously. The zig-zag movements 305 of the pencil 235, shown in said figure, will produce several effects, varying with the speed of said movements and with the thickness of the lines, as will also those produced by means of the spiral movements 306, therein shown. For instance, when the spiral 306 is drawn slowly, a circling dot will be shown, while a traveling ring will be produced if said spiral is swiftly sketched, since the drawing of each coil of the spiral 306 will take less time than is required for the display members involved to fall back to inoperative position, and since each coil of said spiral is more advanced than the preceding one.

I have discovered that during the rapidly repeated display of the indicators, as when a moving picture is produced, those indicators which are intermittently displayed, that is to say, the contrast producing portions of which are shown at brief intervals, will appear to be continuously displayed, although the display produced by this means will not be so sharp as that produced by means of the indicators continuously displayed. This phenomenon is noticeable during the production of the ordinary "movies", where, though the rays of light are necessarily shut off during each change from one picture to another of the series contained by the film, as is known to those versed in the art, the illusion of continuous display is produced.

The above discovery enables me to provide two simple ways for producing half-tone moving pictures on a display surface. To produce three shades, or tones, for instance, three blocks of the tape are reserved for each picture, that is to say, for each change or step of movement in a moving picture, as is shown in Fig. 15. The high-lights may be produced by means of the holes 130 shown at 307, perforated at the same relative position in three successively engaged blocks 180 and adapted to cause actuation of the same display members three times in succession, while the light shadows are indicated at 308 and involve two of said blocks—preferably the second and last involved—the deep shadows being produced by means of holes shown at 309 at which relative position holes 130 are provided in the block last involved only, it being evident that the members 203 pertaining to said last named holes will be actuated or displaced only during the presentation of said last named block, the result being a half tone finger ring 268, as is illustrated in Fig. 1, where the different effects of said two means, or modes of operation, are shown at 310 and 311. This figure shows a portion of the display surface of the sign, composed of the indicators each of which appears to be square when viewed from a distance. The difference in said modes consists solely in a difference in the speed of the shafts $k$ of the sign. If said shafts are rotated with sufficient speed to rotate the display members 203 until the segment $y$ has passed from under the brush $z$, during the engagement of each block 180 with one of the arms 124 and 125, the setting or stud 312 of the ring 268, which is provided on all three of said blocks, will be presented to view three times as long as will be the opposite side of said ring, which is provided on one block only, and said stud will therefore appear to be the brightest portion of said ring, as is illustrated at 310 in Fig. 1. To produce the effect indicated at 311 in Fig. 1, the shafts $k$ are rotated with sufficient speed for moving the members 203 one third of the distance just described, during said time, and it is evident that during the time the three blocks will successively have engaged their respective arms, the display members forming the stud will have moved three times as far as those pertaining to the side of the ring opposite to said stud. As hereinbefore mentioned, to exhibit such ring or the like distinctly a far greater field of indicators is required, and the sign a portion only of which is shown, may have many hundreds or thousands of indicators, and when viewed from a distance, as from the top of a tall building, will have the same appearance as that of a square block of printed half-tone matter, aforesaid, with the exception that the indicator elements are arranged transversely, at the present instance, whereas the elements of printed photographs are usually arranged diagonally, across such block, and with the exception that the latter are substantially round, while those shown in Fig. 1 are square.

If the lamps 13 are energized without the rotation of the members 203, for the production of said shade effects, the lamps pertaining to the stud 312 will be energized over a period of time three times as great as that involving the lamps pertaining to that side opposite said stud, and the effect will be as aforesaid. In this instance the elements constituting the ring will appear round just as are those of a printed picture, aforesaid.

I provide means whereby not only shades but also colors, may be produced, and whereby shades and colors may be produced in fixed pictures; that is to say, in pictures not moving. This consists in causing the display members to complete one third of one revolution, or nearly so, for each shade, or color. If the switch 249 is moved around its pivot shown at 870 until it contacts with contacts 313; if the shaft 182 is rotated at the first of the two speeds mentioned; and if blocks of the tape shown in Fig. 15 are employed in the order described; the members 203 pertaining to the holes 130 of the first involved of the three blocks (block I), will be caused to complete one third of one revolution as before, but the segments $q$, on which the brushes $z$ now rest, will now be in closed circuits, and current will now be free to pass from the switch 249 to the brushes $z$ through the wire 314, contact 246, tablet 86, wires 242 and 112, and segments $q$, and the members 203 actuated by means of the second involved of said blocks will be rotated another third of a revolution at the end of which the brushes $z$ of the last said members will rest on the segments $t$ which will now be electrically connected with the switch 249, by means of wire 317, contact 247, tablet 243, and wires 318 and 121, and the rotation of the display members associated with the holes 130 of the third block involved will not be stopped before said members will have made a complete revolution, or nearly so, as is evident. If the first or normally displayed third of the sheet 205 is white, and the second third brown, as aforesaid, and if the third third is of a lighter brown color, the portion of the ring 268 produced by means of a single block 180 will be displayed in dark brown, the portion produced by means of two blocks will appear in a lighter brown shade, and the stud will be displayed in a brownish white tint, this being the sum of the three shades successively displayed, provided the display is produced at night, and the switch $a''$ and a switch $c''$ are placed in dotted positions. By means of the switch $c''$, the segments $r'$, connected with said switch by means of wires $i'$ and 16, are each placed in a branch circuit through one of the lamps 13 which will now be energized during and after all three last described moves of the members 203 forming the stud of the ring, for although the brush $p''$ engages neither of the segments $b$ and $r'$ of the members in normal position, by reason of the projection 221 of the sheet 205, the segment $t$ is so located with respect to the brush $z$, that when said segment $t$ leaves said brush $z$, the brush $p''$ will be still on the segment $r'$, and current will be free to pass from wire L$p$, through wires 248 and 284, switch 63, wire 294, lamp 13, wires 295 and 65, brush $p''$, segment $r'$, wires $i'$ and 16, switch $c''$, wire A, switches W and U, and wire 258, to wire L$n$.

The aforesaid shades will be more pronounced if more illumination is given for the production of the high-lights than is given to produce the shadows. One way to accomplish this is to energize the lamps to various degrees by interposing a resistance in the lamp circuit for every shade. Switches 58 and 319 and the switch $a''$ are placed in dotted position, the rest of the various lamp switches being placed in the position shown in Fig. 6, and as the members 203 are rotated, the brushes $b''$ will first engage the segments $n'$, and current will be free to pass from the wire L$p$, through wires 248, 284 and E, switch 58, wires 323 and 322, lamps 11, wires 72, brushes $b''$, segments $n'$, resistances 4 and 5, wire $e''$, switch 319, wire A, switches W and W$''$, and wire 258, to the wire L$n$. This will energize the lamps 11, but said lamps will emit a very dim light owing to the resistances 4 and 5. As the members pertaining to the second shade begin their second step, the segments 10 come into contact with the brushes $b''$, and current will now pass through the paths just described, except that the segments 10 will be substituted for the segments $n'$, with the consequence that the resistance 4, connected with said segments $n'$, will not be encountered by the current, and the lamps 11 will glow more brightly. As the third step is begun by the display members selected to produce the last shade or high-lights of the ring 268, the brushes $b''$ will be engaged by the segments $c'$ which are electrically connected with the segments $a'$ and $b$, and a branch circuit will be formed between the brushes $b''$ and the wire A, through the segments $c'$, $a'$ and $b$, wires 2 and $b'$, and switch $a''$, current will be free to pass through the lamps 11 without passing through the resistances 4 and 5, and said lamps will be energized to their full extent.

The result just described may be produced by means of three lamps. If the switch 319 is placed in the position shown, and the switches 58, 61, 63, $c''$ and $a''$ are placed in dotted position, the brushes $p''$ of the members 203 rotated one step will be caused to engage the segments $b$, and the lamps 13 will be energized as aforesaid, and will remain so when said members are moved another step, said brushes now being in engagement with the segments $r'$. But now the brushes $i''$ of said members will engage their respective segments $a'$, branch circuits will be completed, and current will pass from the wire 284 to the segments $b$ also through the wire 68, switch 61, wires 64, and 69, lamps 12, wires 324, brushes $i''$, and segments $a'$, and both lamps 13 and 12 of each of said members will be energized. During the third step, aforesaid, the brushes $i''$ will rest on the segments $e'$ which are connected with the segments $r'$ on which the brushes $p''$ now rest, while the brushes $b''$ will now rest on the segments $c'$, and each lamp 11, 12 and 13 of the members 203 so moved will be lighted, and a maximum brilliancy of display will be attained. Thus an exact reproduction of an ordinary printed half-tone photograph may be made, the display members having three lamps actuated representing the broad elements of said photograph, or, if so desired, the broad spaces between said elements, well known to those versed in the art, while the narrow ones will be represented by a single lamp, as is evident.

The above result may be still further varied if the lamps 13 are of lower, and the lamps 11 of higher candle power, than the lamps 12. The lamp switches 58, 61, 63 and $a''$ are placed in dotted position, the other lamp switches, aforesaid, being in the position shown, and when during operation of the members 203 the brushes $p''$ rest on the segments $b$, the low c. p. lamps 13 will glow, while the medium c. p. lamps 12 will be lighted when the brushes $i''$ touch the segments $a'$, and the high c. p. lamps 11, when the brushes $b''$ reach the segments $c'$.

If the lamps 11, 12 and 13 are each of a different color, color effects produced by means of the sheets 205 of the members 203 may be varied by simply throwing the switch $a''$ from full to dotted position, and vice versa, as will be understood.

If the lamps are differently colored as aforesaid, colors may be produced, by means of lamps, independent of the rotation of the members 203. A group-switch 14 which is exactly like the switch 15, and said switch 15, are closed, the switches 189 and 260 are opened, the switches 61 and 63 are placed in dotted position, and the remainder of the switches, aforesaid, are placed in the position shown, and if contact is permitted between the contact 40 and the plate 45, current will be free to pass through the lamp 13 as hereinbefore described, provided the commutator 156 is in the position shown. If contact is made between the contact 30 and the plate 44, a branch circuit will be completed, and current will pass from the wire 284 to the segment 157 also through wire 68, switch 61, wires 64 and 69, lamp 12, wires 324 and $p'$, switch 14, wires F and 262, contact 30, plate 44, wire 263, brush 169, and segment 158. During operation, blocks of the tape pertaining to parts of a moving picture to be produced in a certain color, are presented to the plate 84, and blocks pertaining to another color, to the plate 85, and by means of the persistent changing of blocks, the illusion of the blending of the separate parts into a single, colored moving picture will be produced on the sign, although there will be blank spaces between, to eliminate which additional means will be hereinafter described. To produce additional colors by this means, the construction of the transmitter may be modified by adding a complete arm like the arms 124 and 125, and a commutator brush like the brush 169, for each additional color, as will be understood. Or three arms 125, for instance, may be provided as is shown in Fig. 63, and caused to follow the tape 50 at the same time, and three arms 124 may be similarly caused to do so at another time, as do the arms 124 and 125, aforesaid. In this figure, an arm 917 similar to the arm 125, having the block 128 as aforesaid, is shown connected, by means of links 871, with two additional arms 917 which are exactly like said first named arm, and similarly secured to the sides 151, but the rods 140 are omitted in said additional arms, links 872 which are pivotally secured to the sides at 873 in the same way as are the rockers 139 so secured, being provided with slots 874 engaging the ends of said rockers and thereby compelling synchronous movement of all of the rockers 139. The wires 263 pertaining to said three arms 124, so arranged, are then connected together as shown in Fig. 64, and the wires 27 of the arms 125 are similarly connected; the wire 295 of each lamp 13 is then connected with a contact 30 of one of the three plates 84 and also with a contact 40 of one of the plates 85 by means of a wire 875; the wire $p'$ of each lamp 12, with a contact 30 of another of said plates 44 and with a contact 40 of another of said plates 45 by means of a wire 876; and, the wire 72 of each lamp 11, with a contact 30 of the third plate 84 and a contact 40 of the third plate 85 by means of a wire 877. If now blocks of the tape adapted to simultaneously engage the three arms 124, are then provided with the essential holes 130 for producing a colored picture, aforesaid, said picture will be flashed on the sign in complete form by means of said lamps and will remain there until after a new picture is produced by means of the engagement of three new blocks with the three arms 125, and by this means fixed pictures as well as moving ones in three colors may be produced irrespective of the rotation of the display members 203.

I provide means including resistances similar to the resistances 4 and 5, whereby the magnets $v$ will be actuated to various degrees, and the members 203 may be rotated to their destination without stops, and will remain there as long as desired, provided a number of sets of arms are employed, as just described. Reference being had to Fig. 65 in view of Figs. 6 and 6$^a$, the wire leading from each of the contacts 40 provided in each additional plate 85, is connected with a wire 67. The wire leading from the corresponding contact 30 of the corresponding plates 84, is also connected with said wire 67, the six wires so connected together (in case of three sets of arms) being preferably of the same length. The switch 252 is opened, the switch 189 being in the position shown in Fig. 6$^a$, and if the contact 30 shown, for instance, is allowed to engage the plate 44, current will pass through the path hereinbefore described, except that said current will be broken at the switch 252, and will be compelled to pass from the wire 3 to the wire 37 through wire 41, segment $d''$, brush $g''$, and wire 906. When the member 203 has been rotated one step, the brush $g''$ will rest on the segment $f$, and a branch circuit will now be completed from the wire 41, through a resistance $m'$ and the segment $f$, to the brush $g''$. Since the wires shown at 187 (Fig. 8.) are preferably very thin, as hereinbefore explained, the combined resistances of the wire leading from the contact 30 and of the resistance $m'$, will prevent enough current to pass through the magnet $v$ for holding the lever $o''$ in engagement with the disk $d''$, and the rotation of the member 203 will cease when one step has been completed. But if a contact 30 of each of two of the plates 84, aforesaid, is involved, enough current will pass through the two wires of said contacts to overcome the resistance $m'$, and the member will be caused to complete another step at the end of which the brush $g''$ will rest on the segment $g$, and a new branch circuit will be formed between the wire 41 and the brush $g''$, through the resistance $m'$, a resistance 71, and the segment $g$. The combined resistances $m'$ and 71 are so proportioned with respect to said wires shown at 187, that when only two of said wires are simultaneously employed, the magnet v will not attract the lever o'' with force sufficient to hold it in a perforation 210 of the disk d' against the pull of the spring 217, and further rotation of the member will therefore be prevented, and it will require a wire of each of the three arms 124 to rotate said member to its limit or third step. The same holds true when the arms 125 are involved instead.

During operation, if it is desired to produce the ring 268 shown at 310 in Fig. 1, the blocks of the tape shown in Fig. 15 may be employed, and the blocks numbered I, II, III, VII, VIII and IX may be reserved for the three arms 124, aforesaid, while the blocks numbered IV, V, VI, X, XI and XII are suitably arranged to engage the arms 125. Blocks I, II and III are caused to engage the arms 124 simultaneously, and the holes 130 pertaining to the stud 312, being provided on all three blocks, cause current, which energizes each magnet v pertaining to said stud, to pass through three thin wires and cause the rotation of each respective member 203 to its limit, and only one thin wire being provided to carry current for actuating each of the members that reproduce that portion of the ring opposite the stud—said portion being provided on one of the three blocks only—it is evident that said last named members will cease to rotate when in first position. The ring will remain on the sign until the blocks IV, V and VI are engaged with the arms 125 and the ring is displayed in a somewhat displaced condition, as represented on said blocks shown in this figure. Or if exactly the same design is provided on blocks IV, V and VI, as was on blocks I, II and III, the display of the ring will be prolonged without the slightest interruption, as hereinbefore described.

By means of the construction just described, the musical instruments hereinbefore mentioned each may be caused to produce various volumes of sound, and an increase and a decrease in said volume, independent of others of said instruments. The stopper 288 (Fig. 30) will descend farther, and more air will be admitted to the pipe 285, when the disk d' is in third position, than when it has completed either first or second step, and the key 292 (Fig. 31) will be struck harder when current passes through three thin wires, than when said current is compelled to force its way through one thin wire only, as is evident.

I have also discovered that a small percentage of the indicators required for producing a design in relief line arrangement is sufficient for producing either a half-tone or colored picture, and that fairly good shade effects may be obtained if the contacts 30 or 40 are all placed in a single row along a fixed contact plate, such construction being shown in Fig. 66. The tape employed in connection with this construction is not measured off into blocks, but into rows 878, 879, 880 and 881, and although three such contact plates, and three tapes, may be required to produce the results obtained by the three sets of arms last described, a single contact plate 882, having one row of contacts or brushes 883 over which a tape 884 is adapted to constantly travel, may satisfactorily produce the shade effects herein earlier described. The high-lights may be produced by means of three rows 878, 879 and 880 instead of three blocks, of holes 130, while the dark shadows are preferably contained in the last 880 of the three consecutive rows only, as will be understood. The contacts 883 may be connected up in any desired manner, and the tape 884, or tapes, perforated accordingly. If the tape 884 is moved so that the rows 878, 879 and 880 of holes 130 which, in this instance, are preferably elongated, will pass under their respective contacts 883 in succession to permit contact between said contacts and a roller 885 around which the tape 884 passes and which is of conductive material, lamps 886, 887 and 888 will be energized once, twice and thrice, respectively, while when rows 881 are so passed, lamps 887, 888 and 889 will be involved, current being free to pass, by means of said holes, from the line wire Lp to the line wire Ln through the respective lamps, contacts, roller 885 and brush 890 which is affixed to one end of the plate 882 and engages said roller, by means of the wiring shown in said Fig. 66, and it is evident that the illusion of various degrees of brilliancy in lamps, and of changes in said degrees, will be produced by means of this construction just as was so produced by means of the lamps 11, 12 and 13, hereinearlier described. For simplicity's sake the lamps alone are shown in Fig. 66, and if the magnets v, for instance, are substituted, the display members 203 pertaining to such magnets so energized will be actuated, and half-tone pictures may be produced, as hereinearlier described.

I provide means whereby a sketch, as the sketch of the ring 268 produced by means of the tape shown in Fig. 14 for instance, and half-tone designs, may be produced by means of the manually controlled portion of the transmitter. The outer side of each of the disks 204 is provided with three projections 73 evenly spaced, (Fig. 5ª), adapted to engage an inclined projection h provided near one end of a pawl or rocker-arm d pivotally supported in a slot 326 of one of the partitions 202, and a spring 327, also affixed to said partition, tends to hold the pawl *d* in engagement with said disk. Each partition 202 is provided with holes 325, (Fig. 2), one for each series of the member 203, and rods 328, slidably placed therein, are provided with adjustable collars 329 each holding one of the pawls *d* out of engagement with the disk 204 by means of a projection 330 provided on said pawl at the end and side opposite to the projection *h*. The rods 328, and rods 565 which are exactly like said rods 328, and the purpose of which will be later explained, lead into the compartments 223 and are provided with heads 331 and 566, respectively, engaged by one end of bell cranks 332 and 567, respectively, pivotally supported by projections 333 of a wall 334 of the compartment 223, the other ends of said bell-cranks being pivotally secured to rods 335 and 508, respectively, common to all of said bell-cranks 332 and 567, respectively, and reaching from top to bottom of the compartment 223. The rods 335 and 508 are exactly alike and each provided with a projection 336 adapted to engage an iron catch 337 pivotally secured to a projection 338 of the wall 334, and electromagnets 339 and 509, also affixed to said wall, are adapted to draw the catches 337 from the projections 336 of the rods 335 and 508, respectively, while springs 340 tend to draw said catches away from said magnets. The upper ends of the rods 335 and 508 are provided with movable portions 341 and 511, respectively, adapted to be drawn into engagement, by means of electromagnets 342 and 510 (Fig. 3), respectively, affixed to projections 343 of the wall 334, with ratchet-wheels 344 and 512, respectively, affixed to shafts 345 rotatably supported by the wall 334 and by the wall of the case 200, and provided with gears 346, the gear 346 of the wheel 344 meshing (Fig. 3ª) with the gear 224 of the uppermost of the shafts *k*, while that of the wheel 512 meshes with the gear 224 of the corresponding shaft 484 of a series disposed exactly like that of the shafts *k*, and adapted to be employed in connection with the simultaneous production of shades and colors, as will be hereinafter described, and springs 347 are adapted to hold the movable portions 341 and 511 away from the wheels 344 and 512, respectively. An upper corner of the wall 334 is shown broken off in Fig. 3, and consequently only one upper gear 224 is shown in that figure, it being evident that the omitted gear 224 is related to the gear 346 of the wheel 344 exactly like the one shown and related to the gear 346 of the wheel 512.

Reference being had to Figs. 6 and 6ª, a dial-switch 348 is placed on its contacts 349, and current is thereby caused to pass from the wire L*p*, through wires 358, 352 and 353, magnet 339, wire 354, contact 349, switch 348, wire 355, switch 356, and wires 357 and 258, to the wire L*n*. This energizes the magnet 339 and causes it to withdraw the catch 337 of the projection 336, and the action of the springs 327 (Fig. 5ª) which tend to force that end of the pawls *d* having the projection *h*, toward the disks 204, as just described, and the opposite end to bear hard against the collars 329, causes the rods 328 to move and to release the pawls *d* which will now rest against the disks 204. If the switch 252 (Fig. 19ª) is opened, and the switch 249 (Fig. 6ª) placed on the contacts 313, and if the pin 54 is held on the contact 60 until the member 203 has completed either one third, two thirds or three thirds, of a revolution, said member will be caused to remain in its rotated position, because the projection *h* of the pawl *d* will hook one of the projections 73, said projections being so placed that at each position of said member, a projection 73 will just have passed the projection *h*, and it is evident that if the ring shown on block X of Fig. 14 is sketched on the sheet 237, said ring will appear on the sign in the order indicated by the numbering of the blocks shown in Fig. 14.

I provide resistances 350 and 351 (Fig. 6ª) which are so proportioned with respect to the resistance *m'* and 71 (Fig. 6) that, if the resistance 350 is interposed in the circuit just referred to, the lever *d* will disengage the disk 204 when the member 203 has made two steps, and if both resistances 350 and 351 are so interposed, the rotation of said member will be limited to its first step. If the switch 302 is placed on the contact 360, the resistance 350 is involved, and a shade, different from that produced when the switch is in the position shown, may be produced, while if said switch is placed in dotted position, both resistances 350 and 351 will be in circuit, and a third shade, of a picture may be produced. If the ring 268 shown at 310 in Fig. 1 is to be sketched on the sign, the operator draws said ring on the sheet 237 by means of the pencil 235 which he may manipulate by means of his right hand while he operates the switch 302 by his left. During the making of the stud 312 of said ring, the switch 302 rests in the position shown, and presupposing the display member 203 to form part of said stud, the pin 54 is caused to engage the contact 60 to permit flow of current from wire L*p*, through wire 248, switch 249, contact 250, wire 251, contact 245, tablet 241, wires 56 and 106, segment *y*, brush *z*, wires 3 and 41, segment *d''*, brush *g''*, wires 906 and 37, brush 209, ring 212, wire *y'*, magnet *v*, wire 253, ring 213, brush 211, wires 254, 255 and 298, switch 299, wire 300, contact 60, pin 54, wire 301, switch 302, and wires 303 and 258, to wire L*p*, this circuit being identically the same hereinbefore referred to. The pin 54 is held on the contact 60 while the brushes *z* and *g''* traverse the respective segments *y* and *d''*, *q* and *f*, and *t* and *g*, branch circuits being interrupted and completed during the interchanging of said segments with respect to their respective brushes, as hereinbefore described. Although the resistance *m'* and 71 will be in circuit when the brush *g''* reaches the segment *g*, the electro-motive force traversing said circuit is such as to just overcome said resistances, and the rotation of the display member 203 will not cease until said segment has left said brush, when said circuit will be interrupted and rotation of said member stopped, as hereinbefore described. When the portion opposite from the stud is sketched, said switch is shifted to dotted position, whereby the resistance 350 and 351 will be encountered by the current admitted, by means of their respective contacts 240 and pins 54 to the magnets *v* of the display members forming said portion, and although the resistance so added will not be sufficient to prevent actuation of the levers *o''* of said members while in idle position, the extra resistance added when the segments *f* reach the brushes *g''*, and the resistances *m'* are brought into the circuits involved, will weaken the current so that said levers will drop when said members have rotated one third revolution. Instead of writing on the sheet, a half-tone picture may be placed on the tablet 238, and copied off on a sheet of tracing paper, the switch 302 being simultaneously manipulated in accord with the requirement of the shades, shown on said picture which may be a photograph, a combination of letters or figures in various shades, etc. For example, if a photograph of a man's head identical with that shown in Fig. 1ª which shows a portion of the inner display surface of the sign with the display members 203 in different positions and reveals said head when removed a considerable distance from the spectator, is placed on the tablet 238, as the high-lights shown at 269 in said figure are traced the switch 302 is in the position shown in Fig. 6ª, said switch being placed in dotted position when deep shadows shown at 915 are encountered during tracing.

To erase the picture on the sign, the switch 348 is placed on the contacts 361, whereby current is permitted to pass from the wire L*p*, through the wires 358 and 362, magnet 342, wire 363, switch 348, wire 355, switch 356, and wires 357 and 258 to the wire L*n*. This energizes the magnet 342, which in turn attracts the movable portion 341 and places it in the path of the teeth of the wheel 344, which in turn moves the rod 335, and with it, by means of the cranks 332, the rods 328, end-wise, and thereby disengages the pawls *d* from the disks 204 and permits the return of the members 203 to inoperative position. The switch 348 may now be again placed on the contacts 349 if it is desired to draw a new sketch, and the switch 356 may now be placed in dotted position to deënergize the magnet 339, and save current.

If the switch 252 (Fig. 19ª) is closed, for instance, the switch 302 (Fig. 6ª) placed in the position shown, and the switch 249, on the contacts 313, as aforesaid, the member 203 may be rotated to various positions by means of the pin 54, if said pin is left on the contact 60 just long enough to move said member to the desired position, the circuits so formed being hereinbefore described, and identical with those last described, with the exception that switch 252 being closed as aforesaid, current will be free to pass from wire 3 to wire 37 through said switch, without first passing through brush *g''* and its segments proper. By this means, manually produced half-tone pictures may be produced simultaneously with the automatic production of half-tone pictures hereinbefore described, if the rotatable relations between the sign and the transmitter are so adjusted that the members 203 involved will not yet have rotated to first position during the time consumed by the three blocks of the tape for successively engaging their respective arms 124 and 125, said members being thereby permitted to return after each engagement, and not being locked in operative position by means of the pawls *d*. In other words, the rotary transmitter parts are speeded up so that when a block 180 having a hole 130 pertaining to magnet *v* is presented, display member 203 will be but little displaced by the time said block is withdrawn, and when three such holes in succession are involved as hereinbefore described, said member will be moved substantially three times as far, but not far enough to permit the pawl *d* to engage a projection 73, and lock said member, and by this means, manually produced sketch work will not be disturbed by automatically produced display, though the same display members may happen to be actuated by hand and by tape-means simultaneously. The sketch may be made on a portion of the sign not occupied by the moving picture, or it may be made right over said picture, and a very brief energization of the magnet 342 will be sufficient to erase said sketch, and will not interfere with the "run" of the picture, as will be understood. A fancy frame may be sketched around the picture, for instance, or comment about said picture may be written.

I provide means whereby an image of the moving picture, aforesaid, may be obtained during or before its production on the sign, to guide the operator, who may happen to be so located that the display surface of the sign is hidden from him. A mirror 364 (Fig. 7) of about the size of one of the blocks of the tape is affixed to a plate 365 pivotally mounted in the sides 151, and provided with a side-arm 366 with which is loosely connected, by means of a link 367, a ratchet-arm 368 affixed to a rod 369 pivotally mounted in the sides 151 and held, by means of a spring 370 secured to a projection 371 of the rod 369 and to a projection 372 of the case 122, against the periphery of a ratchet wheel 373 affixed to the shaft 155 adjacent to the commutator 156. A mirror 374 is affixed to a bracket 375 provided at one end of the case 122, and the mirrors 364 and 374 are tilted at such angles that the operator, if he looks into the case 122 and on the mirror 374, will see, by means of the mirror 364, a portion of the tape, as is indicated by dotted lines 376 and 377. The teeth 378 of the wheel 373 are so constructed, that if the shaft 182 is rotated and the tape caused to travel, as aforesaid, the image of that portion of said tape which is reflected on the mirror 374 will seem to stand still until the point of a tooth 378 is reached by the arm 368, which arm will then drop on the next tooth, and cause the mirror 364 to tilt back suddenly and to display a new portion of said tape. If the operator directs his gaze so, that one eye will follow the line 376 to the mirror 374 while the other follows the line 377, he will see a stereoptic picture, that is to say, two different portions of the tape, the center of each of which may be at the lines 376 and 377, respectively, will be conveyed to his mind as a single portion comprising the elements of both, and if one of said portions contains the ring 268 of the block III shown in Fig. 15, and if the other has the design of the block II of said figure, and if the distance between the two designs is such that they will nearly come to a focus in the brain of the operator, but will leave the joint image, so procured, somewhat blurred, it is evident that the holes of the upper portion of the ring 268, being provided on both blocks, will appear to be larger than those of the lower portion, which are contained by the block III alone, and the resultant ring will be seen in two shades. If the mirror 364 is broken in half, each half may be affixed to the plate 365 at a suitable angle for obtaining the focus desired irrespective of the distance between said blocks II and III, as will be understood. The necessary illumination of the tape may be obtained by placing the switch Y″ (Fig. 6ª) between full and dotted positions, and if the adjustment of the arms 124 and 125 is perfect, the lamps L, C, H″ and S will continuously glow, provided each block of the tape is provided with a hole 283, as will be understood.

The construction just described, is adapted to be employed in connection with a tape having the essential holes 130 for the production of a moving picture in either relief lines, or two shades. I provide a combination of lenses by means of which any number of shades in pictures distributed among the blocks 180 in any predetermined order, may be all reflected on a single display surface, and the pictures caused to move, as aforesaid. Near the end of the case 122 opposite from that occupied by the mirrors 364 and 374 is a gear 379 which meshes with a connecting gear 380 rotatably mounted on a pin 381 affixed to the outer side of said case, the gear 379 being affixed to the outer side of said case, the gear 379 being affixed to a shaft 382 (Figs. 23 and 24) rotatably mounted in the sides 151 and carrying cams 383 and 384. Within, and reaching from side to side of, the case 122 are partitions 385 the lower ends of which are located directly above the tape 50, and the center portion of each of which is provided with a gap 386 into which are loosely mounted bars 387 and 388 held in engagement with the cams 383 and 384, respectively, by the action of springs 389. Directly below the tape, and reaching from side to side of the case, is a tray 391 into which are placed a series of lamps 392, and affixed to the upper ends of the partitions 385 is a ground glass plate 390 adapted to intercept rays of light issuing from the lamps 392 and passing through the holes 130 of the tape, through lenses 393 and 394 mounted in the bars 388, and through a lens 395 mounted in the bar 387, (Fig. 24ª) when said lamps are lighted. The lenses 393, 394 and 395 are midway between the tape and the plate 390, and it is evident that the image of the hole, or a group of holes, so produced on the plate 390, will be of the same size as said hole or said group, and that when the tape is caused to travel, the image will travel in the opposite direction if said lenses remain at rest, but will remain at rest if said lenses are caused to travel with, but at only one half the speed of, the tape.

The gears 379 and 380 are of such diameters as to cause the shaft 382 to complete one revolution when the shaft 182 completes six, carrying the tape forward by six blocks, as is evident, and the cams are so constructed, that the bars 387 and 388 will travel with the tape during the passage of three blocks, after which said bars will suddenly rebound, and begin to travel forward again during the movement of the tape by three more blocks, etc., and it is evident that after each rebound a new group of holes will be reflected on the plate 390 through each lens, said lenses being so placed in the bars as to be each directly between the plate 390 and a block 180. Both bars reciprocate simultaneously, but although both cams are alike with respect to one of their halves, the other half of the cam 384 extends further from the shaft 382 than does that of the cam 383, and this difference causes a displacement of the lens 395 with respect to the lenses 393 and 394 after every rebound of the bars 387 and 388. The lenses 393 and 394 are so located, that there will intervene four blocks 180 between the blocks reflected, by means of said lenses, on the plate 390, as is shown in dotted lines in Figs. 23 and 25, and by reason of the displacement, aforesaid, there will intervene between the blocks reflected by means of the lenses 394 and 395, one block when the cams are in the position shown, and two blocks when said cams are caused to complete one half revolution. To prevent light from escaping through the play-room required between the three lenses, small sheets 396 of opaque material may be affixed to the bar 387 at opposite sides of the lens 395 in such manner that they will slide over the bar 388, and cover the space irrespective of the position of the two bars with respect to each other.

During operation, if the tape 50 shown in Fig. 16, for instance, is placed in position so that the block II is reflected on the plate 390 through the lens 393, the shaft 382 having moved into the position shown, the ring 268 will be seen on said plate in three shades, since its upper parts will be more brilliantly illuminated than its lower parts, by reason of the duplication of the holes 130 pertaining to said upper parts, and said ring will remain immovable, although the tape and the lenses are moving until the bars 387 and 388 have reached the first cut-away portions of the cams 383 and 384, when said bars will be caused, by the action of the springs 389, to descend on the second half of said cams, and the blocks IV, VI and V will now be reflected on the ground glass plate by means of the lenses 393, 395 and 394, respectively, and if the holes 130 of said blocks are arranged as are those of the correspondingly numbered blocks of Fig. 15, the ring will appear to have turned as hereinbefore described, and will remain in that position until the shaft 382 has completed a third half revolution, when the blocks VIII, VII and IX will be involved, as is indicated in Fig. 25. It is to be understood that the relative distance between the plate 390 and the tape is much greater than is shown, so that the difference in the length of the light-beams when the lenses begin to follow the tape, and when they cease to do so, will be practically *nil*, and the focus will be practically fixed.

If tapes designed for the production of an even number of shades, are to be employed, a modified construction shown in Fig. 28 may be preferable. In this construction, four lenses 397 are affixed to a bar 398 which is operated by means of a cam 399 which is exactly like the cams 383 and 384, except that both halves of said first named cam are exactly alike. The relative positions of the lenses 397, and of the blocks 180 are indicated in Fig. 29, in which the light-rays are shown to pass from the blocks II, IV, I and III, through the four lenses 397, during one forward movement of the bar 398, from the blocks VI, VIII, V and VII, during another movement, etc., and it is evident that if each of the groups of blocks 180 shown in this figure is designed for the production of a ring similar to that just described, but in four shades instead of in three, said ring, with its shades and movements, will be seen by the operator at a glance on the plate of ground glass. It is also evident that by adding two, four, or more lenses to the four described, images of pictures produced in six, eight, or more shades may be produced on the plate 390 by means of a single bar 398. While the construction employing the mirrors 364 and 374, being more simple and economical, is adapted to be employed when a moving picture in either relief line arrangement or half-tone effects consisting of two shades is produced, the construction employing lenses, aforesaid, is used when a tape designed for more than two shades is placed in position. Either construction, though especially adapted for electric signs, may be useful for diverse purposes.

I provide means whereby the ring shown at 310 in Fig. 1, may be produced by means of a single set of arms 124 and 125, and held on the sign independent of said arms. Contacts 49 and 34 (Fig. 6ª) which are exactly like the contacts 30 and 40, are provided in the plates 84 and 85, respectively. The switch 249 is placed on the contacts 313, and the remainder of the switches may be left in the position shown, and if the contact 34 is caused to touch the plate 45 as is shown, current will be free to pass from the wire L*p*, through the wires 248, 284 and *g'*, an electromagnetic switch *a*, wire 7, contact 34, plate 45, wire 37, switch 256, wire 257, brush 109, segments 111 and 157, brush 161, wire *v"*, switch U, and wire 258, to the wire L*n*. The magnet *a*, or switch, is energized, and electrical connection is secured at said magnet, by means of said armature between wires 17 and 18, and current will now pass from the wire L*p*, through the wires 358 and 362, magnet 342, a switch 400, and wires 401, 18, 17, 296 and 258, to the wire L*n*. The magnet 342 will be energized, and the pawls *d* actuated, as hereinbefore described. The wire 7 is also connected with the contact 49 by means of a wire 74, and if said contact is permitted to reach the plate 44, the same result is obtained.

During the operation, if the ring shown at 310 in Fig. 1 is to be produced, blocks I, II, and III, shown in Fig. 15, for instance, are passed through and caused to successively engage their respective arms 124 and 125, and the speed of the shafts $k$ is so regulated, that said shafts will complete one revolution during the time required for passing said three blocks, as aforesaid. The magnet 339 has been previously deënergized, and the pawls $d$ released, and it is evident that the members 203 actuated by means of the three combined blocks will have moved three steps, and will be held there by means of the pawls $d$, while those having been moved by means of one or two of said blocks will be found in either first or second position. Before blocks pertaining to the movement of the ring, aforesaid, are passed through their respective arms 124 and 125, a block void of holes 130, but having a hole 402 shown at 403 in Fig. 16, registering with one of the contacts 49 and 34, may be presented. By means of this hole, the ratchets $d$ will be withdrawn from the disks 204, and the moved display members returned to normal position.

By means involving this construction, a picture in two shades, may be produced instantaneously, in substantially the same way as is produced the ring 268 by means of the three sets of arms and the resistances $m'$ and 71 hereinbefore described. The cam 152 of the arm 124 is loosely mounted, but is secured to the shaft 150 by means of a pin 404 which is placed in a hole drilled through both cams 152 and through a disk 405 which is affixed to the shaft 150. A hole 407 is provided in said cams exactly opposite from the pin 404, and if said pin is removed, the first named cam turned half way around, and said pin inserted again, the arms 124 and 125 will be caused to follow the tape simultaneously, instead of successively, as is evident. The cams 149 are affixed to disks 48, and are adapted to be turned halfway around, in substantially the same way as are the cams 152, aforesaid. The cams 149 and 152 of the arm 124 being so turned, if the switch 252 is opened, and if blocks II and III shown in Fig. 15 are presented to the arms 124 and 125, respectively, the ring 268 will instantly appear on the sign in two shades, since the display members actuated by means of holes 130 contained in both blocks will rotate farther than those a hole 130 for each of which is provided in one block only, and if one of the blocks next involved contains a hole 402, the picture will be erased, and the sign will be in condition to receive a new picture, as is evident.

If during the production of a moving half-tone picture, aforesaid, one or more blocks having neither holes 130 nor a hole 402 are interposed between a set of blocks having said holes 130, and a block having said hole 402, the display of such moving picture will be more impressive, since the last presented shade will then be displayed during the passage of the blank block, or blocks, as is evident.

Instead of actuating the magnet 342 by means of the holes 402, said magnet may be operated by means of commutator 156. If the arms are caused to oscillate in opposite directions, for instance, and if the switch 249 is placed on the contacts 313; a switch 408, on its contact 409; a switch 410, in dotted position; and the various other parts, in the position shown in Figs. 6 and 6ª; current will be free to pass from the wire $Lp$, through the wires 358 and 362, magnet 342, switch 400, wires 401 and 465, switch 410, wire 411, a gang-switch 412, wire 413, brush 102, segments 100, 115, 104, 114, 113 and 164 which are all electrically connected with each other, thence through the brush 108, wire 469, switch 408, and wire 415, to the wire $Ln$. If three blocks of the tape, each representing a shade of a picture, have been passed, and a blank block thereafter, the fifth block, now presented, being also blank; the last produced shade will have been displayed during the passage of two blocks, that is to say, during the time consumed by both arms in following the tape, provided the relative speeds of the shafts 182 and $k$ are such as to cause the display members 203 involved to make one step during the presentation of each block. The picture will now be erased, and a new set of five blocks may now be passed along, it being evident that as the new fifth block is presented, the brush 102 will engage the segment 165 the electric connections from which to the segment 164 are made through the segments 416. If the arms 124 and 125 are caused to move together, that is to say, in the same direction and if the switch 252 is opened, as hereinbefore described in connection with the production of moving pictures in two shades, and if the switch 412 is placed in dotted position, current will pass from said switch to the segment 115 now through a wire 417 and through the brush 101, during the presentation of the fifth of each set of five blocks, as before.

I provide means whereby the ring 268 may be caused to change its shades. If the switch 348 is placed on the contacts 418, current will be free to pass from the wire $Lp$, through the wires 358 and 419, an electromagnet 420 of a group-switch 421 which is exactly like the switch 299, except that a plain metal plate 422, exactly like the plate $p$ of the switch 15, is substituted for the plate 228, thence through wire 423, switch 348, wire 355, switch 356, and wires 357 and 258, to the wire $Ln$. This energizes the magnet 420, closes the switch 421, and causes contact between its pins 184 and its plate 422, and also between its arm 679 and the core 75 of its magnet 420, and current will now be free to pass through the path hereinbefore described in connection with the manually operated apparatus except that a branch circuit will be completed and current will pass from the wire 300 to the wire 258 through wire 425, switch 421, arm 679 which is electrically connected with the plate 422, thence through core 75 and wire 424, instead of the contact 60, pin 54, wire 301, switch 302, and wire 303. Thus the magnet $v$ will be energized to actuate the movements of the member 203. But not only said magnet shown will be energized, but all those magnets $v$ of the sign, pertaining to the group of pins 184 of the switch 421, since each of said pins will now be in contact with the plate 422. If the switch 348 is caused to rest on the contacts 418 until the shafts $k$ complete one-third of a revolution, the display surface will have changed its shade, since all members 203 will have moved one step, and said shade will remain changed if said switch is now removed from said contacts. If said switch is again placed on said contacts for the same length of time, the shade of the sign will again be changed, the members now being in second position, and if the shafts $k$ are rotated very slowly, the change will be so gradual as to be imperceptible. A sketch, aforesaid, may be made after the members 203 have been placed in either of the three positions, and if they rest in third position, the members displaying the sketch will take a fourth step, or one step more than once around, provided the pin 54 is caused to engage each contact 60 and 240 only until the last mentioned members have taken said additional step, or if the switch 302 has previously been placed in dotted position as hereinbefore described. If a sketch is produced in various shades, all the shades will change with the background. Instead of the slow procedure of sketching a picture, said picture may be perforated or stenciled in a sheet of paper of the size of the plate 422 of the switch 421, and when said switch closes over said sheet, those pins 184 registering with the perforations only, will be allowed to meet said plate, as is evident. If the tape shown in Fig. 15 is passed between the plates 198 and 422 of said switch, and if the switch is closed when the block VI is in position, and opened when the members 203 involved have moved one step, a plain ring 268 will be produced on the sign. The same block may now be placed on the tablet 238, and the holes pertaining to blocks IV and V may be touched by the pencil 235, to produce shades in said ring. If strips of paper, suitably set apart, are placed on the plate 422, and if the switch 421 is closed, the sign will become striped, provided the switch 299 is closed, and the switch 249, on the contacts 313, and if a picture is now produced on the sign, said picture will also be striped, although in shades different from those of the background. The striping of the sign surface may also be produced if the rotation of the shafts $k$ is stopped when the members 203 have completed only one half of a step by means of the closure of the switch 421, aforesaid, as will be understood. It is evident that the picture and the background both may be simultaneously so changed by means of said switch.

If the shafts 484 rotate with considerable speed, it may be difficult to time the manipulation of the switch 348 correctly. I provide a time-limit relay for automatically breaking the circuits through the magnets $v$ when the members 203 have made one step. Reference being had to Figs. 2, 3 and 6ª, the relay $k''$ comprises a toothed wheel B'' provided in the compartment 223 and affixed to one of the shafts 484. The wheel B'' is situated between ears 406 of a block 426 which hangs loosely from said shaft 484 and is provided at its lower end with electro-magnets 76 and 77. Between the ears 406 is pivotally mounted a bent arm 427 to which are affixed blocks of iron 435 and 428 forming armatures for the magnets 76 and 77, respectively, and strips $x''$ and 429 of resilient material, affixed to the block 426, engage pins 430 affixed to the arm 427, and are so adjusted that there will be normally less space between the arm 427 and the magnet 76, than there will be between said arm and the magnet 77, and one end of the arm 427 is adapted to engage the teeth of the wheel B'' when the magnet 76 is energized as will presently be described, said energization causing displacement of said arm, and affixed to the arm 427 are metal strips A'' and 79 normally touching each other. If the switch 348 (Fig. 6ª) is placed on the contacts 431, the remainder of the switches and other parts being in the position shown in Figs. 6 and 6ª, current will be free to pass from the wire L$p$, through wires 248, 284 and 80, magnet 76, wire $z'$, strips A'' and 79, wire 432, contacts 431, switch 348, wire 355, switch 356, and wires 357 and 258, to the wire L$n$. Current will pass from the wire 80 to the wire 432 also through wire 433, magnet 77, and wire 434. Both magnets 76 and 77 will be energized, and the arm 427, being nearest the magnet 76, will be attracted by said magnet the core 436 of which will now touch the block 435. Current will now be free to pass from the wire L$p$, through the wires 358 and 419, magnet 420, wires 423 and B, block 435, core 436, and wires 78, 437, and 258 to the wire L$n$.

The operation of the relay is as follows:—

The wheel B″ is continuously rotating in the direction of the arrow 438 (Fig. 3), and if the magnets 76 and 77 are energized, and the arm 427 displaced, as just explained, said arm will engage said wheel, and the block 426 which normally rests against a projection 439 of the wall 334 of the compartment 223, will be swung around until the strip 79 strikes a similar projection 440 when the arm 427 will be forced out of engagement with the wheel B″ and with the magnet 76, and will be thrown against the magnet 77, and held there. The strips A″ and 79 part at the same time, thus rupturing the circuit through the magnet 76 momentarily to doubly insure the engagement of the arm 427 with the magnet 77 which remains in closed circuit so long as the switch 348 remains on the contacts 431. The switch 421 will close by means of the contact between the block 435 and the core 436, and the members 203 involved will begin to rotate as the arm 427 is caused to engage the wheel B″, and as the block 426 begins to swing around, and after said members have completed one step, the block 426 will have moved into position for the strip 79 to strike the projection 440 and to break the circuit through the magnet 76, thereby causing the switch 421 to open, and said members 203 to cease to rotate. The block 426 will now return to the projection 439 by means of gravity, and although the magnets 76 and 77 will now both be energized the arm 427 will be held against the magnet 77, and out of engagement with the wheel B″, or the teeth thereof, and said arm will fall back, by means of the strips $x''$ and 429, into normal position when the switch 348 is removed from the contacts 431. It will be understood that by means of the construction just described, the shade of a moving picture, and the background with it, will be changed, if the rotatable relations are so adjusted that the members involved will make less than one step during the presentation of three blocks 180, as hereinbefore described.

If manually produced display is to be produced between two acts of a moving picture, for instance, it may be objectionable to let the spectators wait until a sketch, or the like, is finished. I provide means whereby said sketch may be prepared in invisible form during the "run" of the picture, and may be flashed on the sign immediately after the end of an act.

Affixed to each partition 202, over each slot 326, and near that end of the pawl $d$ adjacent to the collar 329, but on the side opposite from that occupied by said collar, is an electromagnet $s$ adapted to attract said pawl which is preferably of soft iron. When the circuit through the magnet $v$ is completed by means of the holes of the tape as hereinbefore described, a branch circuit (Fig. 6) through the magnet $s$ is also completed when the member 203 begins to rotate and when the brush 1″ becomes engaged with the segment $l$, and current passes from the wire L$p$ to the wire 67 also through wire 248, switch 249, contact 250, wire 251, contact 245, tablet 241, wires 56 and 106, segment $y$, brush $z$, wire 3, a wire 441, segment $l$, brush 1″, wire 81, magnet $s$, wires 1′, and 445, and a group-switch 82 which is similar to the switch 189. If the magnet 339 has been energized, and the pawl $d$ released, said pawl will be drawn from the disk 204 during the rotation of the member 203, but the action of the magnet $s$ will be ineffective, however, since when the magnet $v$ is deënergized, and the rotation of the member stopped, the magnet $s$ is simultaneously deënergized, and the pawl will engage the disk 204 before any of the projections 73 are able to pass said ratchet. When the magnet $v$ is energized by means of the pin 54, current is free to pass from the wire 3 to the wire 300, in addition to the path hereinbefore described, also through the wire 441, segment $l$, brush 1″, wire 81, magnet $s$, wires 1′, 445 and 442, a group switch 443 which is exactly like the switch 299, and a wire 444, when the member begins to move, and with the same result.

To prepare the sketch, aforesaid, the switch 299 is opened and a switch $u'$ is placed in dotted position (Fig. 6), and if the pin 54 is placed on the contact 60 (Fig. 6$^a$), current will not be permitted to pass through the magnet $v$ owing to the break in its circuit at the switch 299, but a circuit will be completed through the magnet $s$, and current will pass from the wire L$p$, through the wires 248, 284 and C″, switch $u'$, wires $j'$ and $v'$, segment $j$, brush 1″, wire 81, magnet $s$, wires 1′, 445 and 442, switch 443, wires 444 and 300, contact 60 pin 54, wire 301, switch 302, and wires 303 and 258, to the wire L$n$, and the magnet $s$ will now be energized independently of the rotation of the member 203 so long as the pin 54 rests on the contact 60. But if a switch $t'$ is placed in dotted position, said magnet will remain energized even after removal of the pin 54 from the contact 60, by reason of the closure of the pawl $d$ over the core of the magnet $s$ and the subsequent formation of a branch circuit through said magnet, current being now free to pass from the wire L$p$ to the wire L$n$ also through wires 248, 284 and C″, switch $u'$, wires $j'$ and $v'$, segment $j$, brush 1″, wire 81, magnet $s$, wires $1'$ and $h'$, core of the magnet $s$, pawl $d$, wires $j''$ and 446, switch $t'$, wires $W''$, 296 and 258. If now a picture is sketched on the sheet 237, said picture will not appear on the sign as written, but if after the completion of said picture the switch 443 is opened, the switch 299 closed, and the switch 348 placed on the contacts 431, the entire sign surface, aforesaid, will change its shades by means just described in connection with relay $k''$ for changing the shades of a moving picture and its background simultaneously, but the members forming said picture will return to normal position after the strip 79 of the relay $k''$ hits the projection 440, since the pawls of said last named members will be held out of the path of the projections 73, while the members not associated with said picture will be locked. The background may be now changed to the next shade, without changing the picture, as is evident. New objects may be added to the picture, or script under process of construction produced, if the switch 299 is again opened, and the switch 443 closed, as will be understood. The surface of the sign may be changed before the production of a sketch, by the same means. A moving picture may be produced by means of the tape during the preparing, production, and addition to the sketch, provided the members pertaining to said moving picture are not permitted to move a full step, as hereinbefore explained.

If a sheet of paper containing a perforated picture is placed on the plate $p$ of the switch 15, if the plate 198 of said switch is placed over said plate $p$, and if the switch 63 is placed in dotted position, then will said picture be produced on the sign independently of the rotation of the shafts $k$, because electrical connections will be made only through such perforations to close circuits through corresponding lamps 13 in a manner hereinbefore described, and may be displayed simultaneously with the production of a moving picture not involving the lamps 13, several means therefor having been hereinbefore described.

If it is desired to erase portions of the picture produced by means of the branch circuit through the magnets $s$, last described, the switches $t'$ and $u'$ are placed in full position, and the switch 299 is closed, and any of the contacts 60 pertaining to the picture, if touched by means of the pin 54, will permit their respective members 203 to move to the position occupied by the members forming the background, all without interfering with the "run" of a moving picture, aforesaid.

I provide means whereby a moving picture in three full shades, and with blank blocks interposed between the changes of pictures for the purpose of sustaining each of said changes, as hereinbefore described, may be produced without interfering with simultaneously produced sketch work. If the springs 327 of the pawls $d$ are so adjusted with respect to the springs 217 of the levers $o''$ of the magnets $v$, that it will require less current to move said pawls than it will to move said levers; if the cams 149 and 152 are so set that the arms 124 and 125 will both move in the same direction; if the switch 260 is closed, the switch 249 on the contacts 313, and the rest of the various switches in the position shown; if the electro-motive-force behind the current supplied is reduced to such extent that neither one of the wires shown at 187 in Fig. 8 will be of sufficient capacity to carry enough current for actuating both the pawl $d$ and the lever $o''$, but that any two of said wires will; and if a tape is in place, having both of the two first involved blocks 180 like the block I of Fig. 16, for instance, the second involved pair like the block II, the third pair like the block III, the fourth pair like block IV, and one of the fifth pair like block V, of said figure; then will the ring shown at 310 in Fig. 1 be produced by means of the three pairs of blocks, and will be partly erased by means of the fifth pair, by reason of the fact that current will be compelled to force its way through a single of said wires, while the first three pairs each present two holes pertaining to two wires placed in circuit with a single pair of magnets $v$ and $s$. It is to be noted that block V of Fig. 16 does not contain all the holes $o$ required to erase the complete ring 268. Certain parts of the ring produced by means of blocks I, II and III shown in this figure, retain the same shade during its second position involving blocks VI, VII and VIII, and I prefer not to erase those parts since they will not require to be disturbed during the building of said second position, as will be understood.

The simultaneous display of sketch work may be produced in either of two ways: the switch 302 may be placed in the position shown during sketching, and either in dotted position or on the contact 360, during erasures, and while enough current will pass through the magnet $v$ for actuating the lever $o''$ when said switch is in full position, that will not be the case when the resistances 350 and 351 are in circuit. Another way is to place a dial switch 447 (Fig. 6ª) on its contacts 448 (the switches 299 and 443 having been previously opened) during sketching, and on contacts 449 during erasures. When the switch 447 rests on the contacts 448, current passes from the wire $Lp$, through the wires 358, 419 and 450, magnet 451 of the switch 299, wire 452, switch 447, and wires 453 and 258, to the wire $Ln$. If the pin 54 is now caused to engage the contact 60, the magnet *v* will be energized, and the member rotated, say, two steps, as hereinbefore described, since the switch 299 is closed by means of the magnet 451. When the switch 447 rests on the contacts 449, a branch circuit will be established between the wire 419 and said switch, by means of a wire 454, magnet 455 of the switch 443, and wire 456; the magnet 455 will be energized, and said switch 443 caused to close, and if the pin 54 is now brought into momentary contact with the contact 60, current will pass through the magnet *s* by way of the circuit hereinbefore described in connection with the ineffective energization of said magnet during the actuation of the magnet *v*. Since the switch 299 is now open, the magnet *v* will remain "dead," and the movement of the pawl *d* will permit the member 203 to make one backward step. If the pin 54 is again caused to touch the contact 60, said member will go back another step, and by means of this construction, the highlights of a picture may be changed into shadows, as is evident, provided the pencil 235 is caused to trace the portion of the picture, to be so changed, with considerable speed. If it is desired to erase said portions completely without holding the pin 54 on the contacts 60 and 240 touched until the members located in second or third position have completely returned, the switch *t'* is placed in dotted position to prepare the branch circuits through the magnets *s*, as aforesaid, and the pawls *d* actuated will be withheld from the disks 204 until the members involved assume normal position, when contact between the brushes 1" and the segments *l* will be broken, and said pawls will engage said disks; or the complete sketch may be erased instantaneously by placing the switch 348 on the contacts 418 for a moment, by means of which act current will be sent through all the magnets pertaining to said picture, as is evident. Since a very short engagement of the switch 348 with the contacts 418 is sufficient to return all the members involved, the "run" of the picture will not be materially affected.

Affixed to a block 457 (Figs. 2 and 3) adjustably secured to the wall 334 by means of a slotted arm 458, is an electromagnet *x* the armature D" of which is pivotally mounted in a groove 459 provided in a projection 460 of the block 457 (Fig. 2ᵃ) and adapted to intercept the strip 79 of the relay *k"* when the magnet *x* is energized. If the switch 348 (Fig. 6ᵃ) is slid on contacts 462 and 461 from the position shown, the contact 462 will first be reached, and a branch circuit will be completed between the wire 419 and said switch, through wires 463 and *h"*, magnet *x*, and wire E"; the magnet *x* will be energized, and its armature D" actuated. As the switch 348 reaches the contact 461, with which is connected the wire 432, the circuit through the magnets 76 and 77 will be completed, the relay moved and the magnet 420 energized, as hereinbefore explained, except that the strip 79 will strike the armature D", instead of the projection 440, and that the switch 421 will be closed during a very brief period of time. The position of the block 457 with respect to the relay *k"* is so adjusted that, if a member 203 is in third position, for instance, and said relay is actuated, the backward move of said member will be stopped when in second position, and if a sketch has been produced in third shade while the members forming the background are in normal position, the contrast of the sketch will change, but not the background; but if the members pertaining to the background are also in an actuated position, the background will change simultaneously with the picture. A moving picture may be changed from third shade to second, with the consequent changing of the background from second to first, provided the speed of the shafts *k* is not sufficiently high to permit the members involved to move a whole step during the three shades, as will be understood. The moving picture, or the sketch, or both, together with the background, may be caused to change their shades forth and back indefinitely, by constantly shifting the switch 447 from the contacts 449 to the contacts 448, and the switch 348, from the contacts 461 and 462 to the contacts 431, and back again, as will be understood.

I provide means whereby moving pictures of the class last described, may be produced by means of a single block 180 of the tape for each shade, and without interference with display produced by manual means. The arms 124 and 125 are caused to engage the tape successively, the switch 249 is placed on the contacts 313, the switch 299 is opened, switches 89 and 466 are placed in dotted position, the remaining switches shown in Figs. 6 and 6ᵃ may be left in the position shown, and the tape shown in Fig. 16 is so placed over the roller 133, that block I will come into play when the commutator 156 is in the position shown. Current is now free to pass from the wire L*p*, through the wires 358 and 88, magnet 195, wire 87, switch 89, wires 464 and 401, brush 110, segment 163, brush 168, switch 466, and wires Y and 258, to the wire L*n*. The magnet 195 is energized, and the switch 189 closed, and a ring 268 is produced on the sign by means hereinbefore described. The rod 335 has been previously released, and the portion of said ring pertaining to the first shade will be held by means of the pawls *d* while other portions are changed to other shades, by means of blocks II and III shown in said Fig. 16. By the time block V is presented, the segment 163 will have passed from under the brush 168, the circuit through the magnet 195 will be interrupted, and the switch 189 opened, with the consequence that the magnets $v$ pertaining to the holes of block V, will be deënergized, and the respective magnets $s$ alone will remain energized and will cause the return of the members 203 pertaining to said block. During the passage of blocks VI, VII, VIII and IX, both brushes 110 and 168 will again rest on the segments 163, and when block X is presented, contact between the brush 110 and said segment will cease, and the members pertaining to block X will be returned.

I provide means whereby the shafts $k$ may be rotated at a higher speed than that hereinbefore described, if desired, and whereby the members 203 may be caused to make stops between each step taken, with the result that each shade will be displayed for a longer period than it will be if said shafts rotate with less speed, as will be understood. The switch 249 is placed on the contacts 665, the switches 189 and 82 are opened by means of the buttons 229, switches 408 and 466 are placed in dotted position, and the remaining switches may be left in the position shown. When, during operation, the commutator 156 reaches the position shown, the switch 189 will close as just explained, and if the contact 30 is permitted to rest on the plate 44 by means of a hole 130 contained in block I of the tape shown in Fig. 16, current will be free to pass from the wire $Lp$, through the wire 358, to the arm $G''$ of a group-switch 90 which is like the switch 189, thence through the block $Q''$ of said switch, and wire $D'$, to the block $V'$, of a group-switch 92 which is also like the switch 189, thence through the arm 93 of the last mentioned switch, wire $8'$, arm $3'$ and block $4'$ of the switch 82, wire $P'$, core 96 of the magnet 195, arm 194 of the switch 189, wire 467, switch 408, wire 469, brush 108, segments 164, 113, 114, 104, 115, and 100, brush 102, wire 413, switch 412, wire 411, switch 410, wire 112, a gang switch $E'$, and a wire 473 to the wire 56, and thence through the magnet $v$ and to the wire $Ln$ by means of the wiring hereinbefore set forth. When in the course of the rotation of the member 203, the segment $y$ parts with the brush $z$, the rotation of said member will cease, as hereinbefore explained, and said member will be held by means of the pawl $d$. After the segment 100 parts with the brush 102, the brush 103 will come into engagement with the segment 104, a branch circuit will be formed between said segment 104 and the brush $z$, and current will pass from said segment 104 to said brush $z$ now through the brush 103, wire 471, switch 412, wire 472, switch $E'$, wires 470, 242 and 112, and segment $q$, provided block, now involved, contains a hole 130 registering with the contact 40, and the member will move to second position and will be locked there when the brush $z$ is off the segment $q$ and on the segment $t$ which is dead until the segment 113 has reached the brush 107, after which a branch circuit will be established between said segment 113 and the brush $z$, through the brush 107, wire 474, switch 412, wire 475, switch $E'$, wires 476, 318 and 121, and segment $t$; the member will be caused to take its third step, and will be locked when the segment $y$ begins to pass under the brush $z$. By the time block V is presented, contact between the segment 163 and the brush 168 will be broken, the magnet 195 will be deënergized, the switch 189 will be opened, and a contact $R''$, suitably affixed to but insulated from the arm 194 of said switch, will come in contact with contacts 94 and 95 affixed to any suitable part of said switch, and current will be free to pass from the wire $Lp$, to the wire $Ln$ through the wires 358 and 477, magnet $R'$, wire $Q'$, switch $C'$, wire $F''$, contacts 94, $R''$ and 95, and wires 97, 437 and 258. The switch 82 will close, and shortly after that the brushes 107, 103, and 102 will be engaged by the segments 117, 118 and 119, respectively, in succession, and said segments being electrically connected with each other and with the segment 164 through the segment 116, the three last described branch circuits, involving the segment 164 and the brush $z$, will be successively completed, except that for the segments 113, 104 and 100, the segments 117, 118, and 119 are substituted, and if block V of the tape shown in Fig. 16 contains a hole 130 registering with the contact 30, current will be free to pass from the wire $Lp$ to the brush $z$ through the path just described, with said exception, and with the exception that said current will pass from the arm $3'$ of the switch 82 to the wire $P'$, through the core $S'$ of the magnet $R'$ of said switch, instead of through the block $4'$, and from the wire $P'$ to the arm 194 of the switch 189, through the block 196, instead of the core 96. From the brush $z$, current will pass through the magnet $s$, and to the wire $Ln$, through the path hereinbefore described in connection with said magnet $s$, instead of through the magnet $v$, and it is evident that the member 203 will be brought back to second position when the segment 117 reaches the brush 107, to first position when the segment 118 comes in contact with the brush 103, and to normal position when the segment 119 touches the brush 102, after which the segment 163 will again have passed under the brush 168, the magnet 195 will be energized, the switch 189 closed, the contacts 94, $R''$ and 95 separated, the magnet $R'$ deënergized, and the switch 82 opened. The segment 165, which is electrically connected with the segment 164 across the segments 416, will now be located under the brush 102, and current will again be free to pass through the magnet $v$ during the movement of the member 203 to first position, if block VI has a hole registering with the contact 40, and when block X is in position, the segments 166 will be involved just as were the segments 117, 118 and 119, and the brush 110 will be off the segment 163 as was the brush 168 when block V was involved, and with the same result, after which both brushes 168 and 110 will rest on the segment 163, and the brush 102 on the segment 100, as was the case when block I was involved.

The object of causing the arm 194 of the switch 189 to play between the block 196 and the core 96, and the corresponding arms of the switches 82, 90 and 92, between their respective blocks and cores, is to prevent sparking at the "make" and the "break" of contact between the pins 184 and the pins 321, of said switches. The pins 184, being resilient, will reach the plates 228 before said arms reach said cores to close the circuit to admit current to said pins, and will leave said plates after current ceases to pass through said pins when said arms leave said cores, the circuits involving said contacts being momentarily interrupted as the arms move from the cores to said blocks, and again as they move from the blocks to the cores, by reason of the energization of said magnets.

Various display effects may be produced by means of the segment 163 in connection with the relay $k''$. If the switch 348 is placed on the contacts 431, and the switch 249 on the contacts 665, current will find its way through the magnets $v$, though the circuits through the switch 249 be interrupted, by reason of the fact that branch circuits will be completed from the wire $Lp$ to the wires 56, 242 and 318 through wires 358, 419, 463 and 478, the armature $I''$ of an electromagnet $J''$, and wires $f'$, $4'$, and $L''$, respectively, because when the arm 427 is attracted by the magnet 76, the strip $x''$ will come in contact with a pin R, current will pass from the wire $Lp$ to the wire $Ln$ through wires 358, 419 and 463, magnet $J''$, wire $7'$, strip $x''$, pin R, and wires $n''$, 437 and 258, the magnet $J''$ will be energized, and electric connections made between the armature $T''$ and the wires $f'$, $K''$ and $L''$. If a moving picture is being produced while the relay $k''$ is so actuated, said picture, together with the background, will change shade by means previously described, and the change will be permanent as by means of the segments 100, 104, 113, 165 and 416, only one forward step and by means of the segments 117, 118, 119 and 166, only one backward step, of the display members involved, will be permitted at one time. The original color may be restored by placing the switch 348 on the contacts 462 and 461, as is evident. If after the aforesaid forward step of the display members, the switch 408 is shifted from dotted to full position, and back again, and if this shifting is repeated, the shades, of the picture and of the background will become mixed, and the mixture will become more pronounced with each reciprocation of said switch, because those members which are now normally in first operative position will be prevented to move to second position, even though holes 130 pertaining to such members are presented, if the switch happens to be in full position while the brush 102 rests on either of the segments 100 and 165, and said members will be consequently permitted to return to inoperative position during the engagement of either of the blocks V and X of the tape; and on the other hand, if said switch happens to be so located during the engagement of either of the blocks V and X, the members involved will not be permitted to return to normal position, and will be caused to rotate farther forward than required during the next block causing their rotation. When the mixtures become too pronounced, they may be eliminated by placing the switch 348 on the contacts 418, and the switch 447 on the contacts 449, and the normal shade of the background will be restored after one or more revolutions of the commutator 156, as will be understood. If the shafts $k$ are rotated at fairly high speed, the aforesaid mixtures may be produced by shifting the switch 249 on its various contacts, instead, and if said switch is placed on the contacts $O''$, the segments $q$ and $t$ will both be in a prepared circuit, and members 203 actuated by means of blocks of the tape, will be caused to take two steps forward when the brushes 110 and 168 are on the segment 163, or two steps backward when one of said brushes is off said segment, although the tape may be designed to cause said members to take a single step, as is evident.

If the rotation of the shaft 182 is stopped when the commutator 156 is in the position shown, and when block I of the tape shown in Fig. 16 is in place, the ring 268 will be displayed in first color. If the switch 348 is now placed on the contacts 431, the ring will change to second color, while the background will change to first color. If the switch 249 is shifted to the contacts 479, and the switch 348 from the contacts 431 to the contacts 418, the switch 356 being momentarily shifted to dotted position to prevent a repetition of the action of the relay $k''$ as the switch 348 is crossing the contacts 462 and 461, the background will change to second color, while the ring remains on said color, the circuit through the segment *t* not being prepared, and said ring will virtually be erased. The ring may be caused to appear again in three ways: by bringing it to third color, which is accomplished if the switch 408 is placed in full position, and the switch 249, on the contacts O''; or by bringing it back to first color, which will be the case if the switch 89 is placed in full position while the switch 249 is on the contacts O'', whereby will be caused the opening of the switch 189, the closure of the switch 82, and the energization—until the segments *y* have reached the brushes *z*—of the magnets *s* involved; or by placing the switch 348 on the contacts 418 while the switch 447 is on the contacts 449 and while the switch 249 is on the contacts 481, for instance, whereby the background will be caused to change back to first color, but the ring, the members 203 forming which are held in second position by means of their magnets *v*, will remain stationary, all as will be understood in view of the foregoing description.

The cutting up of the metal ring under the brush *z* into segments, and the introduction of each of said segments into a separate circuit, is of especial value when hand-controlled display is produced. If the switch 447 is placed on the contacts 448 and the switches 408 and 249, in the position shown, and if the pin 54 is now caused to engage the contact 60, the member 203 will rotate to first position, but no farther. If the switch 249 is now placed on the contacts O'', said member will be caused to take two additional steps, but will be automatically locked when in third position. If the switch 447 is now placed on the contacts 449, and the switch 249 simultaneously on the contacts 481 while the pin 54 still rests on the contact 60, the member will be caused to take two steps back, all as will be understood in view of the foregoing description. If the shafts *k* are caused to complete one revolution during the presentation of three blocks of the tape, the switch 408 may be left in dotted position all through the aforesaid changes of the position of the display member, provided the pin 54 is not allowed to rest on the contact 60 long enough to cause said member to take a full step more than desired, and with said provision, the production of moving pictures in full shades may be carried on simultaneously with that of sketch work in shades, or colors, and without interference of the one with the other, as is evident.

I provide branch circuits through the magnets *v*, by means of which an extremely brief engagement of the pin 54 with the contacts 60 and 240 will be sufficient to bring the display members to their appropriate positions, whereby the two aforesaid modes for producing display may be carried on altogether in harmony, and irrespective of the speed of the shafts *k*, said circuits being similar to those involved when the switch *t'* is placed in dotted position to sustain the energization of the magnets *s* after a brief contact between said pin and said contacts, as was previously described. This branch circuit through the magnets *v* comes into play if the switch 482 is placed in dotted position, when current will be free to pass from the wire *y'* of the magnet *v* to the wire 258 also through a wire 8', lever *o''*, disk *d'*, wires 26 and *z''*, switch 482, and wire 296, if the magnet *v* has been energized by means of contact between the pin 54 and the contact 60, or between either of the plates 44 and 45 and their respective contacts 30 and 40, and by means of the closure of the lever *o''* over the disk *d'*, and the energization of the magnets *v*, will be sustained independent of said contacts, until the circuits therethrough are broken by means of either of the segments *y, q* and *t*, and it is evident that a sketch, made on the sheet 237 with rapid strokes by means of the pencil 235, will be reproduced on the sign with an equal rapidity, and may be erased equally rapidly if the lines so made on said sheet are traced by means of said pencil after the switch 447 is shifted from the contacts 448 to the contacts 449, and without being interfered with by means of the constantly changing relations between the brushes 102, 103 and 107 and their respective segments of the commutator 156, during the simultaneous production of a moving picture; nor will the sketch-work interfere with the run of the picture.

If the switch 482 is placed in dotted position while the switch 249 rests on the contacts 313, during the production of sketch work, aforesaid, there will be no "dead" portion to the ring under the brush *z*, and the display members involved will rotate continuously with the shaft, and will carry the weight 220 with them, with the result that the sketch, so produced, will be of a hue which would naturally be produced if the three shades contained by the sheet 205 were mixed together, and said sketch will thereby be different from the background, as is evident. If the background had been changed before the sketch is so produced, the hue of the sketch will be unaltered, though the background will be different. Instead of sketching the picture, a perforated sheet may be placed between the plates 84 and 44, or in the switch 421 as aforesaid, or in the switch 299 with the subsequent closure of said switch 421, to produce the result last described, as will be understood. But, to produce said result, a suitable collector-ring and brush similar to those interposed between the wires 37 and *y'*, and 254 and 253, will have to be interposed in each of the wires leading from the various brushes of the projection 207, and from the rings 212 and 213. Rings 891 and 892 may be affixed to that side of each disk $d'$ opposite the rings 212 and 213, while brushes 893 and 894 therefor may be affixed to the adjacent partition 202; and similar rings for the brushes of the projection 207 may be affixed to the disk 204 in a similar manner as are the segments $l$, $b$, $a'$, 10, $v$, $g$, etc., shown in Fig. 68 and to be later described, so affixed and engaged by similar brushes affixed to the adjacent partition, all as will be understood.

I provide means whereby colored half-tone pictures may be produced by means of the tape 50, or the pencil 235, or both. The hereinbefore mentioned shafts 484 are each provided with a series of display members 486 which are exactly like the members 203, except that the commutators 206 with their constituents, and the projections 207 with their brushes, are omitted, and that the sheets 568 which are exactly like the sheets 205 except that neither transparency nor shading is required, are provided with projections 489 (Figs. 3 and 4) adapted to engage dents 490 in endless belts 491 passed around said disks and around drums 492 rotatably mounted between the partitions 202 and directly behind the glass front 201, the belts 491 being composed of transparent and flexible material, and stained, similarly to the sheets 205, the differently stained portions of said belts being adapted to be moved in front of the members 203, and toward display, in succession, by substantially the same means as said sheets are so moved. The belts 491 (Figs. 4 and 5) are provided with projecting runners 493, 494, 495 and 496 adapted to engage levers 497, 498, 499, and 500, respectively, pivotally mounted in projections 501 of the back of the sign and held in engagement with the belts 491 by means of gravity, and spring contacts 502, 503, and 504 are affixed to the projections 501, above the levers 497, 498 and 499, respectively while spring contacts 505 are similarly affixed below the levers 500 as is diagrammatically shown in Fig. 6. Pawls 62 (Fig. 4$^b$) which are exactly like the pawls $d$, are adapted to engage projections 59 of disks 487 which are similar to the disks 204, and are adapted to be operated by means of mechanism exactly like that adapted to operate the pawls $d$, said mechanism having been hereinbefore described, and being located near the back of the sign, while that pertaining to the pawls $d$ is located nearer the front. The members 486 are rotated when levers 506 which are exactly like the levers $o''$ are caused to engage disks 488 which are exactly like the disks $d'$, by means of electromagnets $w$ which are exactly like the magnets $v$, and the return of the members 486 to normal position is accomplished also by means of electromagnets $u$ which are exactly like the magnets $s$, and one end of the coils of the magnets $w$ is connected with rings 91 which are exactly like the rings 212 and on which rest brushes 514 which are exactly like the brushes 209, while the opposite end of said coils is electrically connected with rings 513 which are exactly like the rings 213 and which engage brushes 515 which are exactly like the brushes 211, as is clearly shown in Fig. 4$^b$.

The switch 348 is placed on the contacts 507, and the pawls 62 are released by means of the passage of current from the wire L$p$, through the wires 358, 352 and 353, magnet 509, wire 517, switch 348, wire 355, switch 356, and wires 357 and 358, to the wire L$n$. The magnet 510 may be energized by placing said switch on the contacts 518, when a branch circuit will be completed between the wire 358 and the switch 348, through the wire 519, magnet 510, and wire 520. Or said magnet may be energized, and the pawls 62 caused to disengage the projections 59, by means of the holes 402 in the tape, aforesaid, and if the magnet $a$ is energized by means hereinbefore described while the switch 400 and a switch 521 are in dotted position, current will pass from the wire L$p$, through the wires 358 and 519, magnet 510, wire 520, switch 521, wire 522, switch 523, and wire 524, and thence through the path hereinbefore described in connection with the magnets $a$, to the wire L$n$. If the switch 400 is placed in the position shown while the switch 521 is in dotted position, it is evident that both magnets 342 and 510 will be energized by means of a single hole 402 of the tape. Or the magnet 510 may be energized simultaneously with or independently of the energization of the magnet 342 by means of the segment 163 of the commutator 156, as hereinbefore described, by simply placing the switch 521 in dotted position, in addition to the preparation of the circuits so described, as will be understood. It will be also understood that the switch 90 may be actuated when the switch 189 is actuated by means hereinbefore explained, which will result if a switch 99 is placed in dotted position, when current will pass from the wire 358 to the wire 401 also through a wire 525, the magnet 468 of the switch 90, switch 99, wires 526 and 522, switch 523, and wire 524.

If, when the switch 189 is closed during the forward movements of the member 203 by means of the tape as aforesaid, the switch 90 is also closed, the member 486 will be also caused to move, because current will pass from the wire 56, during the first step of the member 203, to the wire 262, also through a wire U$''$, contact 502, lever 497 when said lever is caused to engage said contact as will be presently described, wire 527 which is connected with said lever and the levers 498 and 495, brush 514, ring 91, wire Z", magnet w, wires P", and S", ring 513, brush 515, wires 528 and 529, and switch 90. As the member 203 rotates to display its first contrasting shade, the member 486 will also rotate, and cause the belt 491 to travel until the first contrasting color 921 of said belt is reached, when the lever 497 will descend from the runner 493 on which it normally rests at 530 as is shown in Fig. 5ᵇ in which said belt is shown developed, and contact between said lever and the contact 502 will be broken at the moment when the brush $z$ parts with the segment $y$, provided the shafts $k$ and 484 rotate at the same speed. The lever 498 will now have been forced against the contact 503 by means of the runner 494, and during the second step of the member 203, current will be free to pass from the wire 242 which is now in closed circuit by means of the segment $q$, to the wire 527, through a wire V", contact 503 and lever 498. The member 486 will be rotated until the runner 494 passes from under the lever 498, when contact between said lever and its contact 503 will be broken, but contact between the lever 499 and the contact 504 will be made, with the resulting completion of a branch circuit between the wires 318 and 527, by means of a wire Y', contact 504, and lever 499. By this means, if the belt 491 is of four contrasting colors suitably distributed along the surface of said belt, the first color will be displayed when said member is in normal position, the second, when it is in first operative position, and so on. It is evident that if the switch 189 is opened, the members 486 may be rotated while the members 203 are at rest.

For causing the forward movements of the members 486 by means of the pencil 235, I provide a group-switch 531 which is exactly like the switch 299. If the switch 447 is placed on its contacts 532, current will pass from the wire L$p$, through the wires 358, 419 and 533, magnet 534 of the switch 531, wire 535, contact 532, switch 447, and wires 453 and 258, to the wire L$n$, and the switch 531 will become closed. A branch circuit will simultaneously be completed from wire L$p$, through wires 358, 419 and 450, magnet 451, wire 452, contact 532, switch 447, and wires 453 and 258, to wire L$n$ and the magnet 451 will be simultaneously energized, and if current is transmitted through the magnet $v$ by means of contact between the pin 54 and the contact 60, as has been explained, current will pass through the magnet $w$ also by means of the aforesaid branch circuit to the wire 529, thence through wire 536, switch 531 and wire 537, to the wire 300 with which connections are also made to the switch 299. If the switch 447 is placed on its contacts 538, the magnet 534 will be energized, while the magnet 451 will be "dead."

When the switch 482 is placed in dotted position for holding the magnet $v$ in actuated condition after contact between the pin 54 and the contact 60 has ceased, as hereinbefore explained, and if the magnet $w$ has been also energized as just described, said magnet $w$ will also be held, or the armature-lever 506 thereof, because a branch circuit will be completed between the end P" of the coil of the magnet $w$ and the wire $z''$ which is in said holding circuit of said magnet $v$, through the lever 506, disk 488, and wire 439.

If the switch 447 is placed on its contacts 540, current will be free to pass from the wire L$p$, through the wires 358, 419 and 541, the magnet 542 of a group-switch 544 which is exactly like the switch 299, wire 543, switch 447, and wires 453 and 258, to the wire L$n$. Current will also pass through the magnet 455, and if the magnets $s$ are now energized by means of the segment $l$, aforesaid, the magnet $u$ will simultaneously be energized, because the switch 544 will be closed, and current will be free to pass from the wire 527 which is in circuit with the wires 56, 242 and 318 as aforesaid, to the wire 300 through the wire 480, contact 505, lever 500 which will have been disengaged with the runner 496 and on said contact, thence through wire G', magnet $u$, wires 545, 546 and 547, switch 544, and wire 548. If the switch $t'$ has been placed in dotted position to cause the magnet $s$ to remain energized independent of the contacts 30, 40 and 60, as has previously been explained, a holding circuit will be completed through the magnet $u$ also, current being now free to pass from the wire 545 of the magnet $u$ also through a wire B', the core of said magnet, pawl 62, wires 549 and 446, switch $t'$ and wires W", 296 and 258, to the wire L$n$.

I have already explained the means whereby the switch 82 closes when the switch 189 opens. The switch 92 closes by substantially the same means and when the arm G" of the switch 90 descends, current will pass from the wire L$p$, through the wires 358, 447 and 550, magnet K" of the switch 92, wire L", a switch O', wires $m''$ and 437 which are now electrically connected together, and wire 258, to the wire L$n$, and the switch 92 will close. If now the magnet $s$ is energized by means of the contact 30, for instance, as hereinbefore explained, the magnet $u$ will be also energized, since current will be free to pass from one or more of the wires 56, 242 and 318 to the wire 262 also through one or more of the paths to the wire 546, hereinbefore described in connection with the switch 544, thence through switch 92 and wire 552, both pawls *d* and 62 will be moved, and both members 203 and 486 will be rotated backward, if they have been previously rotated to operative positions.

The display members 203 may be rotated forward and backward by means of blocks 180 placed between the plates 85 and 45 while the members 486 are so rotated by means involving the plates 84 and 44, in substantially the same manner as the lamps 12 and 13 are energized in connection with the production of colored pictures by means of lamps independently of the movements of the members 203, as was previously described, because the wires 262, which lead to the plate 84, are associated with the magnets *u* and *w*, while the wires 67, leading to the plate 85, are in circuit with the magnets *v* and *s*, and it is evident, in view of the foregoing, that if blocks of the tape, presented to the arm 124, are provided with the essential holes 130 for the production of a combination of colors, for instance, and if blocks presented to the arm 125 pertain to various shades a picture may be produced in shade effects as well as in colors. The same effect is produced by means of the pencil 235, if during the production and erasures of shades the switch 447 is placed on the contacts 448 and 449, respectively and on the contacts 538 and 551 when colors are involved, as will be understood.

If the illusion of a moving picture in shades and colors, just described, were to be produced while the rods 335 and 508 are locked, and the pawls *d* and 62, respectively, are withheld from the disks 204 and 487, respectively, the clearness of the picture would be seriously affected, since there would be inoperative intervals during the return of the arms 124 and 125, as will be understood. To avoid this defect, I cause said arms to follow the tape together, as hereinbefore described, and employ the branch circuits through the magnets *v* and *w*, aforesaid, to hold said magnets while the arms are moving backward. Instead of placing the switch 482 in dotted position, it is placed on the contact U' and the switch 256 and a switch 918 are placed in dotted position, the remaining switches being placed in the same position as when the just mentioned moving pictures are produced. The wire 27 being now connected with the wire 263 by means of the switch 256, current passing through the contacts of either or both of the plates 84 and 85, will pass through the brush 169, the brush 109 being now in circuit with the holding circuits just mentioned, and when the commutator 156 reaches the position shown, and the magnets *v* and *w* have been energized as aforesaid, said holding circuits will have been completed just before the circuits through the contacts 40 and 30 are interrupted by the disengagement of the brush 169 with the segment 158, and said holding circuits will hold said magnets until two tape-blocks next in order will be in position, and until the brush 169 engages the segment 167, and if said next blocks contain holes registering with the contacts 40 and 30, the energization of the magnets *v* and *w* will not have been interrupted during the changing of the brush 169 from the segment 158 to the segment 167. But if said next blocks contain no such holes, said magnets will be deënergized when the segment 111 leaves the brush 109, because current will now not be free to pass from the switch 482 to the wire 258 through wire I', switch 918, wire 257, brush 109, segments 111 and 157, brush 161, wire *v''*, and switch U, nor will current be able to pass between said points through the wire 296, the switch 482 having been shifted as aforesaid. It is evident that, since the circuits are completed and interrupted at the brushes 168 and 109, there can be no sparking at the contacts 30 and 40 at any time. If the switch 89 is placed in full position, the magnets *v* will be inoperative because circuits including said magnets will be interrupted at said switch, and if the switch 99 is placed in full position, instead, the magnets *w* will be idle, for similar reasons. If the switch U is placed in dotted position, neither of said magnets will be operative because current supplied to magnets *v* and *w* will cease to flow, circuits therefore being interrupted between said switch and wire U'', and if it is desired to write a notice on the sign during the "run" of a picture, and to prevent the display of said picture while such notice is written, it is only necessary to manipulate the switch U, as will be understood.

I provide means whereby the magnets 468 and 195 may be actuated, by means of holes in the tape, aforesaid, independent of each other when the arms 124 and 125 are both moving in the same direction as aforesaid. An electromagnet *c* is wired in substantially the same manner as is the magnet *a*, and adapted to be energized by means of contacts 52 and 33 which are exactly like the contacts 49 and 34 and which are wired to said magnet *c* in substantially the same way as are the last said contacts to the magnet *a*. While the wire 18, associated with the magnet *a* as aforesaid, leads to the switch 89 of the magnet 195, through wires 401 and 464, the wire 522 which leads to the switch 99 of the magnet 468 through the wire 526 as aforesaid, is similarly associated with the magnet *c*, and holes 552, similar to the holes 402, and shown in Fig. 12, are adapted to register with said contacts 52 and 33.

During the simultaneous movements of the arms 124 and 125, if the magnets $a$ and $c$ are employed as aforesaid, the holding circuits through the brush 109 are employed to prevent undesirable interruption of the energization of said magnets. Switch $q'$ and 20 are placed in dotted position together with the switches 256 and 918 the switch 482 being on the contact U', and branch circuits through the magnets $a$ and $c$ will be completed, since current will now pass from the wire $Lp$, through wires 248, 284 and $q'$, magnet $a$, wire 7, switch $q'$, wire 19, core of the magnet $a$, and armature $h$, to a wire $k'$, and by substantially the same wiring from said wire $Lp$ to said wire $k'$ through the magnet $c$, and thence to the wire $Ln$, through the path last described, and said magnets will be energized independently of the contacts 49, 34, 52 and 33 until the circuits are broken by means of the commutator 156 as aforesaid.

I will now explain the function of the gang-switch E', and of gang-switches 553, 554 and 555 shown in Fig. 6ª, and will describe means for holding the switch E' in an upward position while the last named switches are in a downward position. The plate 84 contains contacts 9, 46, 25 and 35, and the plate 85 contacts 32, 31, 23 and 24, the eight contacts being exactly like the contacts 30 and 40. When the various switches are in position to permit current to be transmitted from the contacts 30 and 40 to their respective plates 44 and 45, if the contact 9 is permitted to reach the plate 44, as is shown in Fig. 6ª, an electromagnet $n$ which is similar to the magnets $c$ and $a$, and similarly connected up, will be energized and will thereby cause the energization of the magnet T" of the switch E', wires L' and 22 becoming electrically connected together under movement of the armature $s'$ of the magnet $n$, and current being transmitted from the wire 284 to the wire 296 through wire $o'$, magnet T", and wires 22 and L', and the armature $x'$ of the magnet T" being movably connected with the switch E', will raise said switch to the position shown. The switches 553, 554 and 555 are exactly like the switch E', and are actuated by substantially the same means as is the switch E'.

To produce best results when the expression of a human face or detail of a landscape, is to be depicted on the sign, for instance, I divide the sign in sections each being of a capacity of each of the contact plates hereinbefore described, that is to say, each having as many display members 203 and 486 as there are contacts 30 in the plate 44, for instance, and while the wire 473 leads to the wire 56 which leads to all the wires 106 associated with the members 203, and to all the wires U" pertaining to the members 486, of one section, wires 556, 557 and A' each similarly lead to all such wires of another section; while wire 254 leads from the brush 211 to the wire 255, three similar wires lead each from a corresponding brush of another section to said wire 255; while the wire 322 leads from the wire 323 to the lamp 11, similar wires lead from said wire 323 to all such lamps of all four sections, etc. It is evident that, if the switch E' is caused to fall by means of the deënergization of the magnet T", and if one of the switches 553, 554 and 555 is raised, the display members 203 and 486 shown in Fig. 6 will become inoperative, and corresponding members of a new section will become operative, and it is equally evident that the portion of the sign I have hereinbefore referred to, is in fact only one of four equal parts or sections of the complete sign.

The tablet 239 is also divided in four sections a portion of each of which is shown in Fig. 6ª, but the contacts 60 and 240 are so wired that one contact of each section will be electrically connected with a single wire 300 by means of wires 919, while a new contact of all the sections will be similarly connected with a new wire 300. The construction shown in Figs. 20 and 21 is such that, when the arm 233 is so placed that the pin 54 will engage the lower left hand section of the tablet 239 as is shown in Fig. 6, the contacts 245, 246 and 247 will engage the blocks 244 shown connected up, while if said pin is shifted to another section of said tablet, said contacts will engage new blocks 244 the wires 56, 242 and 318 of which lead to new sections of the sign, and it is evident that if the pencil 235 is slid from one corner of the sheet 237 to another, one section of the sign will be automatically switched out while another is switched in.

When the switch 348 is placed on the contacts 418 for changing the contrast forming either a picture or its background, aforesaid, if the entire display surface is involved, a switch D, located near the relay $k''$ in Fig. 6ª, is placed on its contact 2", branch circuits are formed, and current is free to pass from the wire 419 to the wire 423 through a wire 558, an electromagnet G, wire H, switch D, and wire 2'. This will cause the upward movement of all four switches E', 553, 554 and 555, because branch circuits will be formed, and current will be free to pass from the end 22 of the coil of the magnet T" to the armature I' of the magnet G through a wire 560, and similarly from the corresponding ends of the coils of magnets of the switches 553, 554 and 555, and from said armature to the line-wire through wires 559, 437 and 258. By this means, the circuits pertaining to all four sections of the sign are prepared simultaneously with the closure of the switch 421, when the switch 348 is placed on the contacts 418. If the switch D is placed in the position shown, and the relay $k''$ actuated, as aforesaid, the magnet G will be simultaneously energized, since the wire $7'$ and H will be connected with each other by means of the switch D. If the switch D is placed in dotted position, the magnet G will be energized independent of the position of the switch 348.

I will now illustrate how a colored halftone ring, so large as to occupy all four sections of the sign, may be produced and caused to move, by means of a single set of arms 124 and 125, aforesaid. All the various group-switches except the switch 252 are opened, the switches $C'$ 400, 523, 99, $O'$, 89 and 408 are placed in dotted position, the switch 249 is placed on the contacts 313, the switch 348 is placed on contacts 569 whereby circuits will be completed through both magnets 339 and 509, and the pawls $d$ and 62 will be released, and the various other switches shown in Figs. 6 and 6$^a$ may be left in the position shown. The tape shown in Fig. 12 is placed in position, and when block of said tape becomes clamped between the plates 84 and 44 during the rotation of the shaft 182 and of the various movable parts associated with it, as has been hereinbefore described, the contact 9 will touch the plate 44 (the block I (Fig. 12) being provided with a hole 602 registering with said contact), the magnets $n$ and $T''$ will be energized, the switch $E'$ actuated, and the circuits pertaining to that section of the sign which is shown, prepared if said block is provided with the holes 402 and 552, aforesaid, which holes permit contact between the plate 44 and the contacts 49 and 52, respectively, which contact causes the energization of the magnets $a$ and 195, and $c$ and 468, respectively, and the subsequent closure of the switches 189 and 90, respectively. Holes 130 pertaining to one quarter of the ring 268 are also provided in this block, and if that portion of the sheets 205, displayed when the members 203 make one step, is dark brown, while that pertaining to the second step is stained light brown, as aforesaid, and if that portion of the belts 491 involved when the members 486 are in first operative position is yellow, while the next displayed portion of said belts is red, that portion of a dark brownish yellow, as will also be the portions shown on consecutively involved the ring 268 shown on this block will be of blocks II, III and IV which are provided with holes 572, 573 and 574, respectively, in addition to the holes 402 and 552 and to the holes 130 forming said portions of the ring 268. The hole 572 of block II permits engagement of the contact 31 with the plate 45, the energization of electromagnets $o$ and $M''$, the upward movement of the switch 553, and the consequent preparation of the circuits pertaining to a new section of the sign, while the hole 573 of block III and the hole 574 of block IV pertain to the contacts 25 and 24, respectively, and cause the introduction of the two remaining sections into a prepared circuit by means hereinbefore described, and said four portions will be transferred on the sign and will form a complete ring 268. The hole 402 is omitted in block V, and during presentation of said block, the members 486 only, pertaining to the stone 577 of the ring 268, will be caused to move to second operative position, and said stone will be displayed in a brownish red, or ruby tint, and by means of block VI, those members only which pertain to the highlights of the ring are rotated to second step. Since the circuits through the magnets $R'$ and $K''$ are interrupted at the switches $C'$ and $O'$ respectively, the circuits through the magnets $s$ and $u$ pertaining to the ring will not be actuated when the switches 189 and 90, respectively, are opened, and the ring will consequently be held on the sign by means hereinbefore described. Block VII contains holes 576 and 575 registering with contacts 47 and 51, respectively, provided in the plate 84 and electrically connected with contacts 29 and 36, respectively, provided in the plate 85, the four contacts being exactly like the contacts 30 and 40, and when said block is involved, current will pass through electromagnets $e$ and $i$ which are wired to the contacts 47 and 29, and 51 and 36, respectively, in substantially the same manner as are the magnets $a$ and $c$ to the contacts 49 and 34, and 52 and 33, respectively, and by the medium of which the magnets $R'$ and $K''$, respectively, are energized in substantially the same manner as are the magnets 195 and 468 by means of the magnets $a$ and $c$, respectively, a wire 578, connected with the switch $C'$, leading to the armature of the magnet $e$, and a wire 579, connected with the switch $O'$, to the armature of the magnet $i$. The pawls $d$ and 62 by means including which was made the stud 312 of the ring will be actuated, and said stud erased, and when block VIII is in position, that portion of the highlights nearest the shadows will be reduced. By means of block IX the stud will be caused to appear on the section adjacent to that formerly occupied by said stud, and will appear to have moved, the ruby stone 577 being added by means of the next involved block X, and the essential highlights being added to the stud-portion of the ring by means of block XI (not shown), the stud being again erased when block XII is presented, and added to the ring at a new spot by means of blocks next involved, to produce the illusion of a continuous rotation of the ring on the sign, as will be understood.

The aforesaid sign-sections may be interchanged by means of the tape-holes 602, 572, 573 and 574, as just described during the production of a moving colored half-tone picture by means of the segments 100, 104, 113, etc., of the commutator 156 previously described, in connection with the tape shown in Fig. 16, but an additional set of five blocks will be required for each section added, and additional sets may be required for the addition of color effects to the shade effects so described, and if the arm 124 is reserved for blocks pertaining to colors, for instance, blocks adapted to engage the arm 125 will necessarily contain the essential holes for the production of shade effects, as will be understood. Although to produce a succession of fixed colored half-tone pictures, the shaft 182 may be caused to rotate at any desired speed, an exceptionally fast speed will be required to produce the illusion of a continuously moving picture, owing to the large number of blocks required for each movement in said picture.

It is not necessary, to produce colors, that the same number of blocks be employed for each movement in the picture as are employed to produce shades, and five blocks, for instance, may contain the essential holes 130 for the production of one movement in complete shade efforts, while two blocks may be sufficient to produce colors, and although the moves pertaining to the shades will not then occur at the same moment as will those pertaining to the colors, it is evident that the combined effect will be harmonious if the blocks 180 are designed and arranged, correspondingly. Neither is it necessary that the shafts $k$ and 484 rotate at the same speed, since one of said shafts 484 is provided with a pulley 480 adapted to be belted to a separate motor, and said speeds may be so varied that the ring 268, for instance, involving one of the display-elements consisting of the display members 203 and 486, will appear as is shown at 310 in Fig. 1, while that involving the other of said surfaces is produced as shown at 311, and while said two rings may be displayed separately they may be produced one over the other so as to produce a single colored half-tone ring. Furthermore a relay $k''$, may be provided for each of the display surfaces to render said surfaces altogether independent of each other.

It is known to those versed in the art that when a picture is produced by means of display elements grouped substantially as shown in Fig. 1, the larger the number of such elements within the range of the picture the more distinguishable and agreeable to the eye it will be, and if the rings 268 that are shown in this figure, each requires a square block of twenty-five such elements and that are barely distinguishable as rings, are each caused to take up a square of, say, four hundred elements as is required when tape blocks shown in Fig. 12 are employed, the curves comprising said rings are decidedly more graceful and agreeable, as is shown on block "I", or block "IV", for instance, each of which blocks show approximately only one-fourth of a complete ring, as hereinbefore described.

I have also discovered that if a movement is imparted to a picture as a whole with respect to a display surface composed of lamps, or movable members, or both, forming the indicators, aforesaid, a very small part of the indicators required to clearly produce said picture when not so moving will be sufficient to so produce it. Block I shown in Fig. 17 contains one quarter of the ring 268 the center of which is shown at 563, and on block II of the tape there shown, said ring is shifted so that its center will be at 564, it being evident that the ring displayed on the sign by means of said block II will be also shifted with respect to that previously displayed by means of said block I, and said shifting will continue during the engagement of the blocks following in order of engagement, until when block VII is involved, the ring on the sign will appear to have described a circle, and if the irregular shape of the portion of the ring shown on the different blocks shown is studied, it will be found that commotion is produced in the ring, that is to say, the ring will appear to bulge, contract, expand, etc., now at one point and then at another and that the shape, though uniform as a whole, constantly changes with respect to its detail, and said changing will smooth off the harsh points seen in the design on each of said blocks, if said blocks are displayed in rapid succession. For instance, while the indicator corresponding with the hole shown at 562 on block V recedes from the inner radius of the ring, the indicator of the corresponding portion of the ring, produced by means of the hole shown at 561 on block VI, projects beyond said radius and will produce the illusion as though said portion, produced by means of said two blocks, were situated at said radius. It is to be noted that the steps taken by the ring are far more gradual than indicated in this figure, and will not materially affect its display. If the sign is not very bulky, as when placed in a show window, for instance, it may be automatically caused to describe a circle in the opposite direction, suitable gearing being provided between the sign and the transmitter to synchronize the movements, and by this means, the ring will stand still in appearance, though not in fact. Such construction is shown in Figs. 69 and 70. Blocks 895 each provided with a recess 896 in which an eccentric 897 is adapted to rotate, are affixed one below and another above the sign case 200. Shafts 898 and 899 each of which supports one of the eccentrics 897 are rotatably mounted in a frame 900. Said shafts, synchronism of movement to which is imparted by means of sprocket wheels 901 and chain 902 are driven in synchronism with the transmitter the gear 178 of which meshes with a gear 903 affixed to the shaft 899, and since the sign is held in position exclusively by the eccentrics 897, rotation of the latter will evidently move said sign. It will also be understood that it is not necessary for the ring to move in a circle, and said ring may be caused to describe the figure eight, or it may reciprocate, with respect to the sign, or it may remain stationary with the exception of the constantly shifting harsh points, aforesaid. It will also be understood that although a plain ring is shown in this figure, the same effect may be produced in half-tone and colored pictures by the same means.

I will now illustrate how a single display-effect may be produced by means of several of the various constructions hereinbefore described, and will take as an example the illusion of a thunderstorm. A tape especially designed for that purpose may be employed, but in absence of such a tape, a tape designed for the production of an ordinary outdoor scene, and containing fixed as well as moving objects may be selected from out of general stock. Presuppose that the selected tape calls for a single set of arms 124 and 125: that two blocks of each movement of the picture, adapted to engage the arm 124, are reserved for colors, and five blocks pertaining to each movement, and to the arm 125, for shade effects: that the normally displayed portion of the sheets 205 of the display members 203 is stained white, the first operative portion, dark brown, and the second operative portion, light brown; that the normally visible portion of the belts 491 of the members 486 is perfectly transparent, the first operative portion blue, and the second, red: that holes 552 and 575 are provided on a suitable number of the blocks pertaining to the arm 124; the rods 335 and 508 are released, all of the various group-switches except the switch 252 are opened, the switches 58, 61, 63, 319, c″ and a″ are placed in dotted position, and the remaining switches shown in Figs. 6 and 6ª are placed in position to permit of the energization of the magnets v and s, and the magnets w and u, by means of the switches 189 and 82, and 90 and 92, respectively, as aforesaid, the switch 249 being preferably on the contacts 313, and the shafts k being caused to complete one revolution during the passage of three blocks associated with the arm 125, as aforesaid.

If the moving picture occupies the entire display surface, a strip of paper may be placed in each of the switches 189, 90, 82 and 92 to render the corresponding portion of the picture inoperative in order to reserve working space on the sign. If said picture contains no house, nor tree, in the foreground, a block 180 containing such house, and one containing such tree, may be selected from out of the stock, and placed in the switches 299 and 531, and said switches closed over each block, after which it may be placed on the tablet 238, and the tree and the house modified to any degree desired by simply tracing them by means of the pencil 235, and by properly manipulating the switches 447 and 249, all as hereinbefore described.

At the beginning of the "run" of the picture, the switch 447 is placed on the contacts 448, and the switch 348, on the contacts 431 three times in succession, to change the background to third shade, and produce the illusion of broad daylight, and when the storm approaches, said background is gradually returned to normal position to imitate increasing cloudiness. The operator sketches the spiral 306 (Fig. 22) with such rapidity that the members 203 involved will not reach first step, and will consequently return, and whirlwind is produced. The spiral movements are carried across a part of the roof of the house, and when said roof is reached, the switch 447 is placed on the contacts 540, whereby said part of the roof will appear to be torn away, after which said switch is again placed on the contacts 448. After leaving the house, the whirling process is slackened down so that a number of the members 203 involved will be permitted to be locked in first step, to imitate debris of the damaged roof. The switches 61 and 63 are placed in full position, the lamps 11, which alone will now be involved, being in circuit with the resistances 4 and 5, and the cloudiness is further increased; and to increase it still further, the speed of the shafts k is reduced until the members 203 rotated by means of three blocks 180 will not move far enough to be hooked, and said reduction may be carried so far that the display members involved will be but slightly displaced at the end of the engagement of three blocks with the arm 125, and since two of the five blocks pertaining to each movement of the picture are blank, said picture will be hardly distinguishable in the darkness. Every now and then the zigzag movements 305 are produced to imitate lightning, and to produce rain drops, the switch 447 is placed on the contacts 532, and an irregular series of lines 304 are drawn rapidly on the sheet 237. A heavy downpour of rain is imitated if an ordinary perforated tape is placed between the plates 198 and 228 of the switch 421 (Fig. 26), the switch 348 placed on the contacts 418, and said tape rapidly passed through said switch 421. If the switch 421 is affixed to the inner side of the case 122 and within reach of the tape 50, an idle portion of said tape may be placed in said switch, and when said tape is caused to travel, it will travel through said switch also, as will be understood. But in connection with this construction, the tips of the pins 184 of the switch 421 should be bent to form inclines which will ride over the holes 130 without tearing them, as is shown in Fig. 71. In the construction shown in this figure, plates 904 and 905, acting as plates 198 and 228 of the switch 421 just mentioned, are affixed between the sides 151 in a position to engage the tape 50 at all times, and are interposed between the wires 300 and 258 just as is so interposed said switch 421, an additional switch 906 being provided for switching the parts out of circuit when not required, and just as is the switch U so employed for switching the plates 44, 84, 45 and 85 out of circuit when a notice is to be written on the sign during the "run" of a moving picture the display of which is to be prevented during such writing, as hereinbefore described. It is to be noted that the tape 50 is, in practice, much longer than shown in the drawing, and that any approved mechanism may be employed for winding said tape. The switch p′ is now placed in the position shown, and the various other switches shown are set in their proper positions, aforesaid, for operating the pawls d by means of the rods 335 instead of the switch 82, in connection with the tape 50. The switches u′ and t′ are placed in dotted position, the switch 443 is closed, and the operator sketches shadows, at present invisible on the sign at the fixed objects of the picture, that is to say, he causes the pawls d pertaining to said shadows to disengage the respective disks 204 and to remain so, as aforesaid. Since the pawls d actuated by means of the rod 335 do not quite touch the cores of their respective magnets s, they will be permitted to fall back when said rod is released. The image, aforesaid, guides the operator in correctly placing the shadows, and a clearer image may be obtained at certain stages of the picture by means of the mirrors 364 and 374, while at certain other stages, a glance at the ground glass plate 390 may give best results, if the mirror 364 is adjusted so as to register with the blocks pertaining to the colors, and the lenses, aforesaid, to register with blocks associated with the production of shade effects. If the switch 421 is automatically fed, as just described, the sketching may be done during the rain, and flashes of lightning may be produced at intervals. A slight decrease of the darkness is effected by increasing the speed of the shafts k so that the members 203 involved will be caused to remain in their actuated positions. Heavy lightning strokes are effected by placing the switch 63 in dotted position, and the switch 348 simultaneously on the contacts 431 while the switch 299 is closed and while the stroke is sketched on the sheet 237, when the objects displayed at that moment will become brighter by means of the lamps 13 involved, and the background will be lighted up while changing its shade and when the stroke is finished, the switch 63 is shifted back to the position shown, and the switch 348 is simultaneously placed on the contacts 361 to change the background to normal, after which said switch 348 is placed on the contacts 349, all as is evident in view of the foregoing description. One of the heavy strokes may be carried across the tree, and said tree set on fire in the following manner:—the switches u′ and t′ are placed in the position shown, the switch 447 is placed on the contacts 532, and the various switches pertaining to the tape-control for the ratchets d, aforesaid, may again be so set that the rod 335 will be substituted by the switches 189 and 82, as at the beginning of the picture. The tape-block containing the tree, aforesaid, is again placed on the tablet 237, and the switch 249 is shifted to the contacts 479. Slow spiral movements, beginning at the top of the tree, and moving gradually upward and alternately downward, are described by means of the pencil 235, the members 203 and 486 involved being thereby caused to display light brown and red, respectively, and to imitate flames. The switch 249 is occasionally shifted to the contacts 250 to cause the display of dark brown and blue, the pins 53, 54 and 55 being all caused to engage the contacts 60 and 240, to represent thick, rolling masses of smoke. If the lamps 12 are of a pink color, for instance, the switch 61 is placed in dotted position and the plate 198 of the switch 14 is placed over the plate p, when all of said lamps will be lighted, and the fire will appear to be reflected against the sky and the various objects displayed. The smaller strokes of lightning are occasionally produced, but more and more dimly, and the switch 348 is placed on the contacts 431 while the switch 447 is placed on the contacts 448, to change the background from black to dark brown, and imitate the clearing of the sky. Black smoke may now be produced if the switch 447 is placed on the contacts 449 while the switch 249 is shifted to the contacts 6, the members 203 actuated by means of the pin 54 now being free to return to normal position, and as the flames descend slowly down the tree, the charred stump of the tree may be caused to appear by the same means, it being only necessary to trace the corresponding portions of said tree, contained by the aforesaid block resting on the tablet 238. To depict further clearing of the sky, the background is changed to light brown, then to white, and the lamps 11, 12 and 13 are all caused to burn, except those pertaining to the stump of the tree, aforesaid, which is caused to be black, and except other objects contained in the picture, which will be of various hues, all as will be understood. To produce a rainbow, all that is necessary is to draw curved lines across the sheet 237, the proper switches being placed on the proper contacts for obtaining the proper color of each line, or each series of lines. But to obtain an even radius and spacing, a sheet of paper 570, cut up in strips 571 as is shown in Fig. 27, may be placed in the switch 421, and if one of said strips is removed, as is shown at 581, the switches 249 and 447 placed on suitable contacts and switch 348 placed on the contacts 418, the members 203, 486, or both, pertaining to the removed strip, will be actuated. Said strip may now be placed back, and another strip removed, and if one or both of the switches 249 and 447 are shifted to other contacts, another color, or shade, or both, will be produced, as is evident. If additional collector-rings and brushes, similar to the ring 212 and the brush 209, for instance, are provided to permit the continuous rotation of the display members involved, as hereinbefore described, and if the switch 482 is placed in dotted position, and the switch 249, on the contacts 313, any objects thereafter produced by means of the tape, or the pencil, or both, will appear to glitter in the bright sunshine, because the display elements now involved will produce a flickering effect, the three differently stained display surfaces of each appearing in rapid succession, the proper rapidity being obtained by regulating the speed of the shafts $k$. At the end of the picture, the operator may sketch a fancy emblem of the class sometimes produced after moving pictures produced by means of the cinematograph, or he may write a notice which may read as follows:—
"This picture was produced partly by hand." To produce said emblem, or said notice, in shade effects rapidly, the switch 252 is opened, and the resistances $m'$, 71, 350 and 351 employed, as hereinbefore described, whereby the display members involved will be brought to their appropriate positions at once, and without the necessity of going over parts of the sketch twice with the pencil, as will be understood.

As previously mentioned, a tape especially designed to produce the storm, just described, may be employed, and said storm produced altogether automatically. The various switches involved may all be electromagnetic, and tape-holes similar to the holes 402 may be provided to cause their operation; for instance, if it is desired to transmit by means of tape holes, just mentioned, current between the wire 248 and, alternately the contacts 481 and 479, as is done by means of the switch 249 (Fig. 6ª), electromagnets 866 and 867, and their appropriate parts, shown in Fig. 72 and being identical to the magnets $a$ and $c$, for instance, shown in Fig. 6ª, may be connected up in parallel or multiple with the last said magnets. The armature $h$ (Fig. 72) is connected with said wire 248 by means of a wire 863 and is adapted to close upon wires 864 and 865 connected with said contacts 481, the magnet 867 being similarly associated with the contacts 479. Or suitable signals may be painted on the tape to guide the operator to manipulate the required switches, as are signals provided on music rolls to guide the operator to manipulate the required levers of the instrument involved, for instance, a self-player piano forte, as is well known. It is also evident that it is not necessary to reserve the same number of blocks 180 for each movement in complete shades, or colors, throughout the "run" of the picture, and while at the beginning two blocks may be reserved for each movement in colors, five blocks for each of said movements, for instance, may be employed near the end of the picture, and suitable means aforesaid, provided for properly changing the "setting" of the switches involved. But unless extremely rapid oscillations of the arms 124 and 125 are produced, I prefer to produce the whirlwind, the lightning, and the rain, by hand.

If the switches $w''$ and 356 are placed in dotted position, the switch 348, on the contacts 418, for instance, and the switch 447, in any of its positions employed to change the color of a picture or to erase a sketch, as aforesaid, no action will take place, circuit being interrupted at the switch 336, but if now the last said switch is placed in the position shown, the desired change will occur with the exception that no lamps will be lighted during said change because of the shifting of the switch $w''$. But if, after said change, the switch 356 is placed in dotted position, a branch circuit through the lamps involved will be completed, and current will be free to pass from the switch $w''$ to the wire 258 through wire 582, contact O, contact I which is affixed to but insulated from the switch 356, contact 583, and wire 584. By this means, sparking at the brushes $b''$, $i''$ and $p''$ is prevented while said brushes change from one to another of their appropriate segments, as will be understood.

During the production of moving pictures, it is important that new tape-blocks are presented in rapid succession, for the more gradual the movements, the more natural they will be, and the shorter and smoother the oscillations of the arms 124 and 125, the more rapid said oscillations, and said succession, will be. In Figs. 32, 33 and 34, I have shown means for facilitating said oscillations, said means comprising a ring 585 in which is rotatably placed an eccentric 587 secured to the shaft 150. The ring 585 is pivotally mounted between ears 588 of a block 589 which is adapted to replace the block 128 (Figs. 7 and 8). When the eccentric 587 is rotated, the ring 585 is kept from rotation by means of the block 589 which will be thereby caused to reciprocate. During rotation of the eccentric 587, while that portion between the dotted lines 591 and 604 passes the pivoted portion 590 of the ring 587, the block 589, and its relative arm 124 or 125 with it, will move at a practically even speed, and the size and the degree of displacement of the eccentric 587 are such that said speed will be that of the movement of the tape. An eccentric 592 is substituted for each of the cams 149, and said eccentrics 592 and the eccentrics 587 are so affixed to the shaft 150 (Fig. 32$^a$) that when the ring 585 pertaining to the arm 124, for instance, is just midway between the lines 591 and 592, that portion of the eccentric 592 farthest from the shaft 150 will be engaged by the roller 148, and the segment 158, for instance, will be in position to leave the brush 169, as is shown in Fig. 6$^a$ and if the holding circuits through the magnets $v$ have been prepared by placing the switches 256 and $s''$ in dotted position, and the switch 482, on the contact U', as aforesaid, the brief contact between the plate 44 and the contacts 30 involved will be sufficient to energize the magnet $v$ associated with said contacts and to prolong said energization until a new selection from among said contacts have come in contact with said plate.

Since there may occur objectionable sparking during the "make" of contact between the plate 44 and the contacts 30, for instance, segments 593, 594 and 595, shown in Fig. 35, and adapted to engage brushes 597, 596 and 598 respectively, may be substituted for the segments 111, 158 and 167, said brushes replacing the brushes 109 and 169, and if the brushes 596 and 597 are electrically connected with each other by means of wires 599 and 600, and of a switch 601, as is shown in this figure, the brush 598 which takes the place of the brush 169 in this instance, will reach one of the segments 595 which, together with the segments 593 and 594, are electrically connected with the segment 157, after the tape 50 engages the plate 44, and will leave said segment before said tape disengages said plate, and the brush 597 which together with the brush 596 replace the brush 109 as a result of this setting, will engage one of the segments 593 before the brush 598 leaves a segment 595 and will disengage said segment 594 after the last said brush engages another of the last said segments, and by this means, sparking is avoided at the contacts 30.

Instead of the block 589, a forked block 605 shown in Fig. 36 and having two pairs of ears 606 by means of which it is rigidly secured to the ring 585, may be pivotally secured to a bar 608 adapted to be affixed to the bars 126 and 127, and when the eccentric 587 is rotated, the ring 585 will reciprocate in two directions and the movement imparted to said ring will be similar to that imparted to the blocks 895 (Figs. 69 and 70) by means of the eccentrics 897 to cause the sign to describe a circle, as hereinbefore described, and by means of this construction, perfectly smooth oscillations will be imparted to the arms 124 and 125, although there will be no even speed portion to said oscillations, and the engagement of each block 180 will have to be extremely brief, as will be understood.

Instead of limiting the rotation of the display members by means of the wires 56, 242 and 318, or by means of engagement between the pin 54 and the contacts 60 and 240, or between the contacts 30 and the plate 44, for instance, over different periods of time, as aforesaid said rotation of each of said members may be automatically stopped by means of brushes 609, 610 and 611 shown in Fig. 37 and adapted to replace the brush $z$ (Fig. 5). When said member 203 rests in either of the positions indicated at 310 in Fig. 1 and hereinbefore described, the brushes 609 and 610 rest on one of the segments $y$, $q$ and $t$ while the brush 611 rests on another of said segments, and if the pin 54 is caused to touch the contact 60, for instance, current will pass from the wire L$p$ to the wire L$n$ through wires 612 and 613, brush 209, ring 212, wire $y'$, magnet $v$, wire 253, ring 213, brush 211, wire 614, brush 610, segment $y$ (at present), brush 609, wires 619 and 615, contact 60, pin 54, and wires 616, 617 and 618. When the member begins to rotate, the brush 611 will also be caused to engage said segment $y$, and current will now pass from said segment to the wire 617 also through said brush 611 and a wire 620, and the magnet $v$ will remain energized even if the pin 54 is now withdrawn from the contact 60. When the member 203 has reached the next position, the brush 610, in circuit with the brush 611, will be on a new segment (segment $q$), and the holding circuit, last described, will be interrupted. If the pin is still on the contact 60, the circuit involving said pin, aforesaid, will again be completed, the brushes 609 and 610 being now on the segment $q$, and another step will be taken by the member 203, but if said pin has been previously disengaged, the member will be locked, provided the pawl $d$ is permitted to engage the disk 204, as hereinbefore explained.

Or the commutator 206 may be done away with, and the rotation of the member 203 stopped without the deënergization of the magnets $v$. As is shown in Figs. 35, 38, and 39, I provide a disk 621 which is exactly like the disk $d'$ except that between said disk and the shaft $k$ is slidably mounted a bushing 622, one end of which is affixed to a disk 623, the other end being pivoted to a fork 624 pivoted to a projection 625 of one of the partitions 202, and said disk is connected by means of a sheet 626 which may be exactly like the sheet 205, except that it occupies only one-third of the circumference of said disk, with a disk 627 to which the spool 218 is affixed. The disk 621 is provided with inclined projections 632 (Fig. 38$^a$), and the disk 623, with similar projections 628, so placed that when the display member is rotated one third of one revolution, said projections will slide one on another, since rotation of the disk 623 is prevented by means of the fork 624, and the disk 623, which is normally forced toward the disk 621 by means of a spring 629, will move from said disk 621, carrying the bushing 622 with it. An armature-lever 630 which is similar to the lever $o''$, is provided with a projection 631 (Fig. 38$^a$) adapted to engage the outer edge of the disk 623 when said disk is forced from the disk 621, and a lamp 633 is affixed to an arm 634 affixed to one of the partitions 202.

Reference being had to Fig. 35, if the switch 601 is placed in dotted position, the remaining switches and the commutator 156 being in the position shown, and if the connected up contact 30, for instance, is engaged with the plate 44, current will pass from the wire L$p$, through wires 612 and 613, brush 209, ring 212, wire $y'$, magnet $v$, wire 253, ring 213, brush 211, wires 635 and 636, contact 30, plate 44, wire 637, switch 638, wire 639, brush 598, segments 595, 594, 593 and 157, brush 161, and wire 603, to wire L$n$. This energizes the magnet $v$, and brings the lever 630 down on the disk 621, which action completes a holding circuit through said magnet, current being now free to pass from the wire 253 to said segment 593 also through wire 640, core of the magnet $v$, lever 630, disk 621, wires 641, 642 and 599, and brush 597, and the magnet $v$ will remain energized after the segment 595 leaves the brush 598 by means of the rotation of the commutator 156. When the segment 594 nearest the brush 596 reaches said brush, if the contact 40 connected up is caused to touch the plate 45, a branch circuit will be completed, and current will be free to pass from the wire 253 to the segment 594 also through ring 213, brush 211, wires 635 and 643, contact 40, plate 45, wire 644, switch 645, wire 600 and brush 596, and the magnet $v$ will still hold the lever 630 in engagement with the disk 621, and will continue to do so after the brush 597 leaves said segment 593 and after it engages the next segment 593 in the series, as will be understood. Simultaneously with the energization of the magnet $v$, a branch circuit involving the lamp 633 is also completed, current being permitted to pass from the wire 612 to the wire 635 also through a switch 646, wires 647 and 648, lamp 633, and wire 649, when either the contact 30, or the contact 40, or both, are involved. When the lever 630 is actuated, current will pass between the wires 612 and 253 also through the path last described to the wire 635, and thence through the brush 211, and ring 213. If the wires leading to the contacts 30 and 40 are very thin, as aforesaid, said wires will not be able to carry the heavy lamp current, but it is evident that if the brushes 160 and 172, and the segments 162 shown in Fig. 6, are interposed in the wire 647, for instance, and said segments arranged so that more space between said segments 162 is provided than is the length of said segments 594 and 595, the lamp will be "dead" during the brief engagement of the contacts involved with their appropriate plates.

During operation, when the magnet $v$ is energized, the lever 630 falls into one of the perforations 210, and the display member is rotated as hereinbefore described, but when the whole of the sheet 626 has moved toward display, the lever 630 will be forced away from the disk 621 by means of the disk 623, and the rotation will cease though the energization of the magnet $v$ may not have ceased, because when said lever disengages the disk 621, its projection 631 will engage the disk 623 which is of metal and is always electrically connected with said disk 621, and the display member will consequently remain in operative position so long as new holes 130 registering with the contacts 30 and 40 are involved, it being evident that the slightest backward move during this time of said member will cause the disk 623 to move toward the disk 621, and permit the lever 630 to fall in a perforation 210.

Half-tone moving pictures in three shades, for instance, may be produced by means of this construction, if the shafts $k$ are caused to complete one revolution during the presentation of nine blocks 180, and the members actuated by means of the first involved block will rotate to their limit, while those actuated by means of the third block will have time to rotate only one third of that distance before the brush 597 disengages a segment 593 and interrupts the holding circuits through the magnets $v$ involved. But if the shafts $k$ and 182 are stopped before said disengagement occurs, the picture with its shades, so produced, will remain on the sign so long as desired, as will be understood.

If the pin 54 is caused to touch the contact 60, a new branch for said last described circuit including the magnet $v$ will be completed between the wires 635 and L$n$, by means of the contact 60, pin 54, and a wire 650. To hold the magnet $v$ after the pin 54 is disengaged, the rotation of the shaft 182 may be stopped when the commutator 156 is in the position shown, or a switch 910 (Fig. 35) may be placed in dotted position to connect the wire 599 with the wire 603, as is evident.

Instead of parting the disks 621 and 623 (Fig. 38) by means of the projections 628 and 632, the bushing 622 may be provided with a groove 651 having a sharp turn 652 as is shown in Figs. 40 and 40$^a$ and a pin 653 affixed to the disk 621 and operating in said groove is adapted to force the disk 623 away from the disk 621 when said pin enters said turn 652, rotation of the disk 623 being prevented by means of a pin 654 affixed to the bushing 622 and slidably mounted in the adjacent partition 202.

An alternative construction is shown in Figs. 41 and 42, in which the magnet $v$ together with the lever 630 are mounted on the disk 621 and adapted to move with said disk, the continuously rotating disk 215 being provided with the perforations 210, and a metal wedge 655 is so constructed and so affixed to the adjacent partition 202 that the projection 631 of the lever 630 will clear the hook 920 of said lever, but will climb said wedge and will cause disengagement between the disk 215 and the lever 630 when the display member has completed one third of one revolution as before.

In Figs. 43, 44 and 45, I have shown a construction by means of which a part of the display members may be caused to continuously rotate with the shafts $k$ while a part of said members are held from rotation to produce a picture, as aforesaid, with the exceptions that magnets associated with the display members of the construction shown in these figures and presently to be described, are energized to stop said rotation while the magnets $v$ are energized to cause such rotation as herein earlier described. The display members of this construction each comprise disks 656 and 657 connected together by means of a sheet 658 which may be exactly like the sheet 205 except that projections 659, 660 and 661 are provided, which projections are adapted to engage armature levers 677, 678 and 662, respectively, of electromagnets 663, 664 and 607, respectively, said magnets being affixed to a bar 666 reaching from one of the partitions 202 to another, said levers being each pivotally secured to a projection 667 of the bar 666, and normally held out of reach of the sheet 658, and the disk 657 is provided with lamps 668, 669 and 670 electrically connected with collector-rings 671, 672 and 673, respectively, also provided on said disk 657 and engaged by brushes 674, 675 and 676, respectively, affixed to the adjacent partition 202 to which is also affixed a brush 680 which engages a collector-ring 681 also provided on the disk 657, and sufficient friction is provided between the shaft $k$ and the disks 656 and 657 to cause the display member to normally rotate with said shaft.

If the various switches shown in Fig. 45 are in the position shown, and if the contact 30, for instance, is permitted to touch the plate 44 when the segments 157, 158, 115 and 164 of the commutator 156, (shown also in Fig. 6$^a$) engage the brushes 161, 169, 102 and 108, respectively, and the segment 163, and brushes 110 and 113, current will be free to pass from the wire L$p$, through wire 683, switch 685, wire 684, brush 108, segments 164, 114 and 115, brush 102, wires 686 and 687, magnet 663, wires 689, 688, 690 and 691, contact 30, plate 44, wire 692, switch 693, wire 694, brush 169, segments 158 and 157, brush 161, and wires 695 and 696, to the wire L$n$. If the pin 54 is placed in contact with the contact 60, a branch circuit is established, and current is free to pass from the wire 690 to the wire 696 also through said contact 60 and said pin 54. As the armature 677 is drawn toward the magnet 663, wires 688 and 698 become electrically connected with said armature, any suitable contacting means being provided therefor, branch circuits are completed, and current is free to pass from the wire 688 to the wire 696 through the armature 677, wires 699 and 700, and thence through switch 701, but also through wire 702, switch 703, wire 704, brush 113, segments 163, brush 110, and wire 711. Current will be free to pass from the wire 683 to the armature 677 also through wire 697, switch 705, wire 706, ring 681, brush 680, wires 707 and 708, lamp 668, wire 709, brush 674, ring 671, and wire 698. When in the course of rotation of the commutator 156, the segment 114 reaches the brush 105, the magnet 664 and lamp 669 are involved, and when the segment 116 is located under the brush 106, the magnet 607 and the lamp 670 will be energized, instead of the magnet 663 and lamp 668, as will be understood. The segments 115, 114 and 116 are also involved and if a dial-switch 710 is placed in dotted position, for instance, a branch circuit will be completed between the wires 683 and 686 by means of said switch and a wire 712.

During operation, the shafts $k$ and the display members are constantly rotating, but when a block 180 is presented while the commutator is in the position shown in Fig. 6ª, all those display members associated with the holes 130 contained by said block will stop rotating when their projections 659 strike the armatures 677 caused to intercept them, by means of the energization of the magnets 663 involved, and the holding circuits for said magnets, completed under closure of said armatures over the wires 688, will hold said members independent of said block 180. A differently perforated block may be presented when the segment 114 reaches the brush 105, and another, when the brush 106 is in touch with the segment 116, when the projections 660 and 661, respectively, pertaining to said new blocks, will come into play, and the display members, then involved, will display shades different from those first involved, and it is evident that a picture in shades, will be produced while the background is constantly moving, if said blocks are perforated accordingly. When, during the engagement of the fifth block, the segment 163 leaves the brushes 110 and 113, or if the switch 701 is placed in dotted position, the holding circuits, aforesaid, are interrupted and the display members involved are free to rotate again with the shafts $k$. During sketch work, the switch 710 may be manipulated simultaneously with the manipulation of the pin 54, whereby the desired shade will be obtained without the repetition of lines, and when the switch 710 is in the position shown, a different shade will be produced during sketch-work than if said switch is placed in dotted position. It will also be understood that if the contacts 30 are in circuit with the magnets 663 only, and the contacts 40 (Fig. 6ª) with the magnets 664, for instance, and if the arms 124 and 125 are caused to move together as hereinbefore described, two shades may be produced instantaneously, and if three arms are provided (Fig. 63) and so moved, the contacts of the third arm being in circuit with the magnets 607, and a block 180 being reserved for each arm, and perforated accordingly, pictures in three kinds of contrast will be produced on a constantly moving background.

If three arms are employed as just mentioned, and if thin wires are employed in said arms, the various positions of each display member may be attained by means of a single magnet, and another magnet employed to release said members, as is shown in Figs. 46 and 47. I provide a plunger electromagnet comprising a solenoid 713 adapted to draw within itself a plunger 714 affixed to an oscillatory arm 715 pivoted to a block 716 affixed to the bar 666, and normally held away from said solenoid which is also affixed to said bar, by means of a spring 727, the arm 715 being adapted to intercept any one of the projections 659, 660 and 661 as will now be described.

The switches shown in Fig. 47 being in the position therein shown, if the contact 30 is caused to engage the plate 44, current will pass from the wire $Lp$, through wire 717, switch 302, wires 719 and 720, solenoid 713, wires 721 and 722, contact 30, plate 44, wire 723, brush 169, segments 158 and 157, brush 161, wire 724, switch 725, and wire 726, to the wire $Ln$. This will generate a magnetic field in the solenoid, but the spring 727 is so adjusted with respect to the resistance of the wires shown at 187, (Fig. 8) that the suction, by means of said field, will be sufficient to move the arm 715 only far enough to engage the projection 659 when said projection attempts to pass said arm, and two thin wires will have to be employed to energize said solenoid sufficiently to move the arm in the path of the projection 660, and three such wires, to cause the plunger 714 to plunge into the solenoid 713 deep enough to cause the arm 715 to intercept the projection 661. When the arm 715 is caused to engage one of said projections, it will not be disengaged therewith if the circuit through the solenoid is interrupted, the friction between the shaft $k$ and the disks 656 and 657 being sufficient to hold said arm in engagement with the projection involved. The lamps 668, 669 and 670 are electrically connected with the projections 659, 660 and 661, respectively, which are of metal, and when the arm 715 rests against the projection 659, for instance, current passes from the wire $Lp$, through wires 717 and 728, arm 715, projection 659, wire 729, lamp 668, wires 730 and 731, brush 680, ring 681, wire 732, switch 733, and wire 734, to the wire $Ln$, and the lamp 668 will be lighted so long as the projection 659 engages the arm 715.

Affixed to the bar 666 is an electromagnet 735 (Fig. 46) adapted to draw the plunger 714 out of the solenoid 713, and when during the rotation of the commutator 156, the segment 115 reaches the brush 101 (Fig. 47), current will pass from the wire $Lp$, through wires 717, 728, and 736, brush 108, segments 164 and 115, brush 101, wires 737 and 738, magnet 735, wires 739 and 722, contact 30, plate 44, wire 723, brush 169, segments 158 and 157, brush 161, wire 724, switch 725, and wire 726, to the wire $Ln$, provided a block 180, presented to the plate 44, for instance, during the time said brush 101 rests on said segment 115, is provided with a hole 130 registering with said contact 30. The magnet 735 will be energized and will attract a block of iron 740 affixed to the arm 715, and said arm with it, thereby permitting the display member to rotate with the shaft $k$. If the pin 54 is caused to engage the contact 60, current is free to pass through the solenoid 713 by means of the path described, except that a branch circuit will be established between the wires 722 and 726, by means of the contact 60 and the pin 54, and since the various wires employed in this circuit need not be very thin, the arm 715 will be displaced until it rests in the path of the projection 661. But if the switch 302 has been placed in dotted position, for instance, the resistances 350 and 351 will be interposed in said circuit, and said resistances are so proportioned with respect to the spring 727, that the arm 715 will stop when in the path of the projection 659. When a sketch has been made by this means, any desired portion of said sketch may be erased by placing a switch 741 in dotted position and by tracing the respective portions of said sketch, a branch circuit being now completed, and current before passing through the magnets 735, being free to pass from the wire 728 to the wire 737 through wire 7″ and switch 741, independently of the position of the segment 115.

Instead of causing current to be transmitted from metal to metal directly as from the contact 30 to the plate 44, for instance, said current, in connection with the construction just described, may be transmitted from metal to metal through an inferior conductor the resistance of which is affected by rays of light. I refer to the selenium cell which is well known to those versed in the art, and is described in connection with electric signs in Letters Patent No. 1,072,152, granted to Ocampo. Each contact 30, for instance, is replaced by one terminal 907 of a selenium cell 909 shown in Fig. 75, the plate 44 being represented by the opposite terminals 908 of all of said cells, which are connected together. If powerful rays of light are directed against a cell connected with the wire 722, Fig. 47 for instance, the solenoid 713 will be caused to attract the plunger 714 to such a degree as to present the arm 715 to the projection 661, while the projection 659 will be involved if said cell is dimly illuminated, the illumination being produced by means of an ordinary moving picture machine, and if the display members are adapted to display colors, said colors may be produced by means of the shades contained on the film of said machine, and by means of the deep shadows of the picture on said film, the respective arms 715 will be placed in position to intercept the projection 659 to present a certain color to display, while the highlights will be the medium for causing the interception of the projections 661, and the display of another color. Furthermore the same result may be arrived at by means of the resistances $m'$ and 71 hereinbefore described and shown in Figs. 6 and 65 in connection with this construction, the wires 722 and 723 (Fig. 75) being then simply connected with the wires 262 and 263, respectively, shown in said first named figures.

Instead of oscillating the plates 84 and 85, said plates may be caused to reciprocate in a straight line, as is shown in Figs. 48 and 49. The plate 84 is affixed to a block 743 loosely mounted in grooves 744 provided in the sides 151 of the case 122, and having ears 745 which form the pivotal point for an arm 746 to which are affixed the plate 44 and a block 747 which is exactly like the block 605 except that an extension 748 is provided. When the eccentric 587 is rotated in the direction of the arrow 749, for instance, the arm 746, which is adapted to describe movements similar to those described by the forked block 605 (Fig. 36) hereinbefore described, will at first be moved to the right, carrying the block 743 with it, and thus cause the plates 84 and 44, which are engaging the tape 50, to follow said tape. At the same time, the arm 746 will begin to move upward and to disengage the plates 84 and 44 from the tape, after which said arm and the block 743 will move to the left while the tape continues to move to the right, until the eccentric 587 has again reached the position shown, the arm 746 having now described a circle, and the tape will be clamped between the plates 84 and 44.

The holding circuits for the magnets $v$, and for the magnets 607, 663 and 664, hereinbefore described, enable me to produce the results hereinbefore described without reciprocating the plates 44 and 84. If pins 750, loosely mounted in the sides 151, are pushed inward until they engage holes 752 provided in the arm 746, and if the eccentric 587 is loosened by means of a screw 753 so as to cause the shaft 150 to rotate without said eccentric, the tape may be caused to move while the plates 44 and 84 are stationary, the segments 595 (Fig. 35) being caused to engage the brush 598 when a block 180 is in position, provided the pins 184 are provided with inclined tips (Fig. 71) as hereinbefore described in connection with the switch 421 during the production of the storm, aforesaid. Or a slight hesitating movement may be imparted to the tape when each block 180 is in position, if the pins 750 are removed, and similar pins 754 caused to engage holes 755 provided in the block 743. The eccentric 587 is affixed to the shaft as before, and a pin 756, passed through the arm 746 and the block 747, is removed, and while the plate 84 will now be held from reciprocation by means of the pins 754, the plate 44 will be vertically reciprocated by means of the eccentric 587, when said eccentric during its rotation alternately lifts and lowers the plate 747, horizontal reciprocation of the arm 746 being prevented by the removal of the pin 756, which act causes the block 747 to move to the left independently of the arm 746 by means of a pin 757 passed through said arm and the extension 748 forming the pivotal point for said block. The tape is caused to pass over rollers 758, mounted between the sides 151, and a spring operated roller 759 normally produces a slack in said tape between said rollers 758, but when the arm 746 descends, the tape will be pressed between the plates 44 and 84, and said pressure will overcome the pull of the spring 751, so that although the tape is steadily traveling over the roller 133 which may be situated beyond the rollers 758 the portion held by said plates will be at rest until the slack, aforesaid, is reduced, or until the plate 44 is raised. Or the tape may be caused to stop momentarily while the plates 44 and 84 are both stationary, as just explained, by means of a star wheel 760 shown in Figs. 50 and 50ª, suitably affixed to the shaft 182 and replacing the pulley 181 and the gear 179, and a wheel 761 the pins 762 of which are adapted to engage slots 763 of the wheel 760 mounted on a suitable shaft 923 (Fig. 50ª) suitably geared to the shaft 150, and the construction of the wheels 760 and 761 is such that if the shaft 150 is rotated at an even speed, the tape will be caused to travel without jerks, the gearing, aforesaid, being so meshed that a block 180 will be in position when the wheels 160 and 161 are in the position shown, during which position the tape will be at rest, as will be understood.

In Figs. 51 to 55, I have shown a construction by means of which contact plates similar to the plates 44, 45, 84 and 85 are caused to describe circles. Octagon plates 764 and 765 are provided with hubs 766 and 767, respectively, rotatably mounted in the sides 151 and affixed to a shaft 778 which replaces the shaft 150 and one end of which is rotatably supported by a frame 769 affixed to one of the sides 151. Movably mounted between screws 770 screwed into the plates 764 and 765 are eight contact plates 771 having the contacts 30 and 40, and the hub 766 is provided with holes 772 through which the cables 188 having the wires shown at 187 and leading from the plates 771, are passed, and said cables are spliced at the outer side of the hub 766, from whence a single cable 773 leads and which is provided with bushings 774 rotatably mounted in a bracket 775 affixed to the adjacent side 151. Near each side of each of the plates 771 is a slot 776 in which bell cranks 777 pivotally secured to blocks 778 affixed to the plates 764 and 765, respectively, are adapted to operate, and bell cranks 779 (Fig. 54) similarly secured to said plates are movably connected with the bell cranks 777 by means of links 780, and are pivotally connected with rods 781 leading through holes 782 provided in the hub 767 and affixed each to a wheel 783 slidably mounted on the shaft 768, and caused to rotate with said shaft by means of a pin 784 affixed to said wheel and engaging a groove 785 provided on said shaft, and to the outer side of the frame 769, and the adjacent side 151, is affixed a threaded rod 786 (Fig. 51) on which are adapted to operate nuts 787 each of which engages a groove 788 of one of the wheels 783, and it is evident that if two of said nuts, each pertaining to one end of one of the plates 771, are turned, said plate will be shifted either in or against the direction of travel of said plate when the shaft 768 is rotated, and jam nuts 820, also provided on the rod 786, are adapted to prevent unintentional rotation of the nuts 787. Transverse shifting of the plates 771 may be accomplished by means of a turning of the screws 770, the conical heads of which engage the beveled edges of the plates 771, of the plate 764 in one direction and those of the plate 765 in the opposite direction, as is evident. The roller 133 is mounted at the right hand side (Fig. 52) of the plates 764 and 765, and somewhat above the lower periphery of said plates, an additional guide roller 789 being provided at the left hand side, and in the bearings 43 formerly occupied by the shaft 182 is journaled a shaft 790 to which are affixed disks 791 forming supports for plates 792 which, in this construction, replace the plates 44 and 45, and which are pivotally mounted in slides 793 placed in cavities 794 of the disks and normally forced, by means of springs 795, toward rings 796 surrounding the periphery of said disks, and the plates 792 are provided with shoulders 797 adapted to normally rest against the inner side of the rings 796 and to hold said plates in line with each other except at the top of said disks, where said plates are displaced by reason of contact with the plates 771. The extreme end of the shaft 790 is provided with a gear 798 which meshes with a gear 799 affixed to the shaft 768 which is also provided with a gear 800 that meshes with a gear 801 secured to the shaft 182 (Fig. 52), said gears being so proportioned that the shaft 182 will complete eight revolutions while the shafts 768 and 790 complete one, and the construction is such that during rotation of said shafts, at least one of each of the plates 792 and 771 will be in contact with each other, and a block 180 of the tape 50 will be between said plates, at all times.

The rotation of the shafts, aforesaid, is accomplished by means of a pulley 802 affixed on a shaft 803 rotatably mounted in the lower end of the frame 769 and provided with a bevel gear 804 which meshes with bevel gears 805 and 806 loosely mounted on the shaft 790, and between said gears 805 and 806 is a collar 809 which is slidably mounted on the shaft 790 but rotatably connected with it by means of a pin 807 which engages a groove 808 provided on said shaft, and between flanges 819 of said collar is loosely mounted a ring 810 pivotally secured to a fork 811 of an arm 812 pivotally secured to a rib 813 of the frame 769 and provided at its free end with a block of iron 814 forming the armature of electromagnets 815 and 816 affixed to the frame 769 and to the adjacent side 151, respectively. The gears 805 and 806, which rotate continuously when the pulley 802 is rotated, are provided with pins 817 adapted to engage slots 818 provided in the flanges 819, and if the magnet 815, for instance, is energized as will be presently described, the collar 809 will be forced against the gear 806 and the shaft 790 will be caused to rotate, and the shafts 768 and 182 with it. If the magnet 816 is actuated, instead, the collar 809 will engage the gear 805, and said shafts will rotate in the opposite direction from that just mentioned.

The cable 773, after leaving the bracket 775, preferably leads downward over a considerable distance before reaching the sign, and is provided near the end of its downward inclination with a bushng 824 (Figs. 51ᵃ and 51ᵇ) loosely mounted in a support 821 suitably affixed to any stationary object 924 and provided with pins 822 and 823 adapted to hold the bushing 824 from rotation by means of a pin 825 affixed to said bushing and adapted to engage contact springs 826 and 827 affixed to projections 828 of the support 821 and adapted to engage contact blocks 829 and 830, respectively, affixed to said support.

I provie disks 831, which are exactly like the disks 791 and which are provided with plates 832 which are exactly like the plates 792, and rollers 833 and 834 which are exactly like the rollers 789 and 133, respectively, are located equidistant from the last said rollers, with respect to the shaft 768; and a tape 835 exactly like the tape 50 is supported exactly like the last said tape, and adapted to pass between the plates 771 and 832. Bars of metal 836 and 837 adapted to be engaged by contact springs 838 and 839, respectively, affixed to projections 840 of one of the sides 151, are affixed to said side and near the tapes 50 and 835, respectively, and a brush 841 (Fig. 51) affixed to one of the sides 151 engages the adjacent disk 791 which is of metal and consequently electrically connected with the plates 792, the ring 796 and the slides 793 also being of metal, while a similar brush 842 engages one of the disks 831.

Reference being had to Fig. 55, if the bushing 824 is moved upward while the pin 825 rests against the pin 823, said pin 825 will touch the spring 827. If now the spring 839 is caused to touch the bar 837, current will be free to pass from the wire $Lp$, through wires 46 and 47, magnet 816, wire 83, bar 837, brush 839, wire 91, brush 827, pin 825, and wire 98, to the wire $Ln$. This will energize the magnet 816, and shift the collar 809 to the left. If the brush 839 is not permitted to touch the bar 837, but if the bushing 824 is raised to an extent as to cause the brush 827 to touch the block 830, a branch circuit will be completed, and current will now pass from the bar 837 to the brush 827 through wire 843 and block 830. If the bushing is so turned that the pin 825 rests against the pin 822, and if said bushing is now raised, said pin 825 will touch the brush 826, and if the brush 838 is caused to touch the bar 836 at this time, current will pass through the magnet 815, instead of the magnet 816, and the collar 809 will be shifted to the right. The same will result if instead of contact between the brush 838 and the bar 836, contact between the pin 825, brush 826 and block 829 is made, as is evident. The brush 842 is connected with a wire 5' which is also connected with the core of the magnet 815, while the core of the magnet 816 is connected with a wire 4' which is also connected with the brush 841, and if the wire 6' is connected with the brush 169 (Fig. 6ᵃ) of the commutator 156, for instance, current will pass from the disk 791 to said brush 169 through brush 841, wire 4', core of magnet 816, block 814, and wire 6', when the collar 809 is shifted to the right, while when said collar is shifted to the left, current will be free to pass from the disk 831 to said brush 169 through brush 842, wire 5', core of magnet 815, block 814, and wire 6', provided blocks 180 engaging the plates 792 and 832 contain holes 130, and circuits pertaining to said holes are prepared as hereinbefore described.

The operation of the just described form of transmitter is as follows:—

The pulley 802 is constantly rotating, and if the collar 809 is in the position shown, the various other rotatable parts, aforesaid, will also rotate, and when the plates 792 and 832 engage the plates 771, they will be displaced so as to fit on said plates 771 correctly and to engage blocks 180 of the tapes 50 and 835, and moving pictures, aforesaid, may now be produced by means of the plates 832, as is evident. The top end of the cable 773 will revolve, but since the opposite end of said cable must necessarily be stationary, said cable will be caused to twist, which twisting will cause it to shorten, which in turn will draw the bushing 824 upward and eventually cause the pin 825 and the spring 827 to meet, the twisting process having turned the bushing 824 so that the pin 825 will rest against the pin 823. At the end of each act of a moving picture, a block of the tape 835 may be provided with a slot 922 (Fig. 52ª) adapted to admit the spring 839, and if said slot is now reached before the spring 827 (Fig. 51ª) reaches the block 830, the magnet 816 will be energized as aforesaid, the collar 809 will be shifted toward the gear 805, and the rotation of the various parts of the construction reversed. At the same time, the circuit involving the plates 832 will be interrupted, and that involving the plates 792, completed, and display may now be produced by means involving the tape 50, as is evident. If the spring 827 reaches the block 830 before the end of an act, the rotation, aforesaid, will be reversed independently of said spring 839. It is evident that the wiring may be so constructed that the magnet 816 will be energized by means of contact between the spring 838 and the bar 836, in which instance display by means of the tape 50 will be begun at the beginning of an act. Instead of connecting the corresponding contacts 30 and 40 of all the plates 771 with each other, such contacts of every other of said plates may be so connected, each set of four contacts, so connected, being then connected with one of the wires 262 (Figs. 6 and 6ª), while each remaining set of four contacts are connected with a wire 67, as is shown in Fig. 57ª and the result will be the same as is produced by means of the alternating oscillations of the arms 124 and 125, provided blocks 180 involved are arranged suitably.

The rotating parts, aforesaid, of this construction will require no reversal if the construction shown in Fig. 56 is employed. An extension 845 is provided on the hub 766, in connection with this construction, said extension being hollow to accommodate the wires leading from the contacts 30 and 40, and collector disks 850, with each of which one of said wires is suitably connected, access of said wires to said disks being permitted through a slot 846 of said extension 845, are suitably affixed to said extension. Affixed to a projection 848 of the adjacent side 151 of the case 122 are supports 847 for brushes 849 each of which engages one of the disks 850, said brushes being adapted to be connected with the wires 262 and 67, shown in Figs. 6 and 6ª, for instance. In connection with this construction, the shoulders 797 are so placed with respect to the plates 792 as to cause the plates to normally assume the position shown in Fig. 57, and if said plates are caused to move in the direction of the arrow 844, no displacement of said plates will occur at the moment they meet the plates 771, because the shoulders 797 will assume their normal position when the plates 792 are in the position shown in said figure. In connection with this construction, both tapes 50 and 835 may be employed at one time, and shade effects produced by means of the tape 50, for instance, while colors are produced by means involving the tape 835, presently described.

If the holding circuits for the magnets $v$, aforesaid, are employed, it is evident that the distance between the shafts 768 and 790 may be widened, when the plates 792 and the slides 793 will be but slightly displaced during contact between said plates and the plates 771, and the operation will proceed more smoothly. Said distance may be widened even more, if an odd number of plates 771 is provided as is shown in Fig. 57ᵇ, in which instance a plate 771 will engage a plate 792 while no plate 832 is engaging a plate 771 as yet, and when shades are to be produced by the tape 50, and colors by the tape 835, as just mentioned, blocks 180 of the tape 50 (Fig. 12) are provided with holes 130 pertaining to display members 203 and holes 402 and 576, pertaining to magnets $a$ and $e$ (Fig. 6ª), while tape 835 will be similarly provided with such holes 130 by means of which the display members 486 are adapted to be actuated, and with holes 552 and 575 by the medium of which magnets $c$ and $i$, and the mechanism associated therewith, will be actuated, as has been hereinbefore described in connection with arms 124 and 125 (Figs. 7 and 8) by means of which arms in connection with certain blocks 180 of the tape 50 shades are produced, colors being produced by means involving certain other blocks. The object of providing a transmitter having rotating contact plates is to produce more rapid changes of pictures than are possible by means of reciprocating contact plates, such rapid changes being a feature of the utmost importance in display of this class, as has been hereinbefore repeatedly pointed out.

Instead of providing the teeth 351 on the roller 133, they may be affixed to the plates 771, Fig. 57ᵇ in which instance no adjustment will be required between the tape 50 and said plates.

Although I have shown and described a perforated tape 50, and contacts adapted to pass through said tape, I do not wish to limit myself to such simple manner of marking said tape. The tape may be composed of thin sheet metal, and the markings may be pictures painted on its face, it being evident that only those pins 184 engaging the unpainted portions of said tape will be able to transmit current. Pictures may be painted on both sides of the tape, which may be provided with a half twist which may be located between the plates 44 and 45, as is shown in Fig. 62, and instead of attaching wires to said plates in order to transmit current issuing from the contacts 30 and 40, respectively, as is shown in Fig. 6ª, a switch I may be placed in dotted position, when said current will pass from said contacts, through the tape 50, to a brush $r''$ affixed to a projection 851 of the case 122 (Figs. 7 and 8), thence through the switch I, and a wire 25, to the wire 27, that portion of the tape in the path of said brush being left unpainted. By means of this construction, the length of the tape may be reduced, and the oscillations of the arms 124 and 125 will be shortened, since each arm will engage each and every block 180 of the tape, while by means of the construction hereinbefore described, such arm engages only every other block, the intermediate block being reserved for the other arm.

Instead of painting the tape, as just described, said tape may be provided with dents 852 (Fig. 60), and the plates 84 and 85 may consist of sheets 853 with pins 854, representing the contacts 30 and 40, sunk into said sheets, and while the projecting side of said dents will be permitted to reach said pins, the even surface of the tape will be withheld from said pins by means of the face of said sheets. The plates 44 and 45, in connection with this construction, may be provided with bristles 855 by means of which the dents 852 will be forced against the pins 854 independent of each other, if the tape is formed of thin sheet-metal. If the pins 854 are sunk flush with the face of the sheets 853 as is shown in Fig. 59, and if the tape is provided with holes 130, the bristles 855 opposing the pins 854 registering with said holes will reach said pins, and if said bristles together with the plates 44 and 45 be of metal, current may be transmitted by means hereinbefore set forth, as will be evident.

Instead of transmitting current through the tape 50, or through the plates 44 and 45, said current, after reaching the contacts 30 and 40, or any of the various contacts contained by said plates, in fact, may be transmitted through the plates 84 and 85 directly, if the sheets 297 are lined with metal sheets 856 as is shown in Fig. 58. The plates 44 and 45, in this instance, are preferably provided with cavities 857 registering with the pins 184, and if a hole 130, for instance, is provided in block 180 engaging one of said plates, the head of the pin 184 registering with said hole will rest on the sheet 856 while the heads of the pins resting on the tape will be withheld from said sheet, and if said sheet is connected with one of the wires 262 and 67, aforesaid, current may be transmitted.

Instead of the dents 852, tongues 858, Figs. 61 and 61ª formed by cuts in the tape, may be caused to engage the pins 854, in which instance the bristles 855 will not be required.

Although I have shown and described various forms of apparatus, and various systems of control, it is evident that many other forms, and many other systems, may be employed without departing from the spirit of the invention.

Instead of having the upper portion of the tape shown in Fig. 62 twisted, the twist may be provided below, as is shown in Fig. 62ª, in which instance one side of said tape will be engaged by both plates 84 and 85 during a complete circuit of said tape, after which the opposite side will be similarly engaged, as will be understood.

Instead of causing the commutator 206 shown in Figs. 4 and 5 to hang, its various segments may be affixed to the outer side of the disk as is shown in Fig. 68, the brushes therefore being affixed to the nearest partition 202 just as is so affixed the brush 676 shown in Fig. 43, and said commutator and the lamps 11, 12 and 13 may be caused to rotate with shaft $k$, in which instance the commutator surface under each brush of the projection 207 may be provided with a collector ring to each of which may be connected one terminal of one of the lamps 11, 12 and 13, the brushes of the rings now, pertaining to the wires 65, 324 and 72 being connected with the brushes $p''$, $i''$ and $b''$ of Fig. 68, as will be understood. Or said lamps may be affixed directly to said disk 204, as are the lamps shown in Figs. 44 and 43, in which instance no collector-rings will be required.

The construction may be modified to accommodate belts 491 of any length, whereby any number of colors may be displayed, and belts 869 (Fig. 73) similar to said belts may be passed around the members 203, and around suitable guide rollers 904 which may be located between the members 203 and 486, it being evident that all of the segments of the commutator 206, and their respective brushes, may be replaced by projecting lines on said belts, and by levers similar to the levers engaging the various lines hereinbefore described in connection with the belts 491, and that the resistances 4, 5, $m'$ and 71 may be placed in circuit by means of contact between levers and spring contacts similar to the lever 497 and contact 502, for instance, such levers and contacts being suitably affixed to a bar 868 supported by the partitions 202.

It will be also understood that the form of the display members may be modified and that if a triangular form shown in Fig. 74 is provided, for instance, the three various display surfaces hereinbefore described will each appear suddenly, since during operation, one of said surfaces will be presented to view until another has almost appeared.

It will also be understood that if a portion only of the construction shown in Figs. 6 and 6ª is employed, various elements pertaining to said portion will not be required, and if automatic means alone are employed for the production of moving pictures, aforesaid, the switches 189, 90, 82 and 92 may be dispensed with.

I claim :—

1. The combination of a plurality of indicators, each consisting of a plurality of differently colored sections each of which may be selectively presented with means for producing contrast among said indicators, said contrast producing a colored half-tone picture.

2. The combination of a plurality of devices adapted to be actuated, with a pair of tapes adapted to move in opposite directions, and means including said tapes for actuating a series of selections from among said devices, one of said selections being differently grouped from that next in said series.

3. The combination of a display surface, with a tape provided on both of its sides with markings, and means including all of said markings for producing display on said surface.

4. The combination of a plurality of devices adapted to be actuated, with a tape both sides of which are provided with markings, and means including said markings for selectively actuating said devices.

5. The combination of a plurality of indicators, with a time limit relay comprising a magnet, a responsive device adapted to be moved by means including said magnet, a separate member adapted to be moved by and in connection with said device, and means including said indicators, said magnet, said device and said member for producing display.

6. The combination of a plurality of indicators each comprising a movable and a stationary display member, with means including said movable member of a part of said indicators for producing a picture, and means including said stationary member of a part of said indicators for producing a new picture.

7. The combination of a plurality of devices adapted to be actuated, with a pair of plates each having a plurality of terminals, means including a part of the terminals of one of said plates for selectively actuating said devices, and means including a part of the terminals of the other plate for sustaining said actuation.

8. In a display apparatus, a display surface composed of indicators each having a movable member, means for bringing a part of said members to a certain position, means for bringing said part from said position to another position, means for bringing said part from said last named position to a new position, and means for bringing said part from said new position to said second named position.

9. In a display apparatus, a display surface composed of indicators each comprising a movable member adapted to move to a certain position, a time limit relay adapted to cause said members to stop at said position, and transmitter means including said relay for producing display on said surface.

10. In an apparatus of the class described, a multitude of devices adapted to be actuated, a plate having contacts for said devices, a tape adapted to engage said contacts to cause actuation of said devices, means including said plate and said tape for actuating said devices selectively, means for moving said plate while so actuating, and means for adjusting said plate with respect to said tape while so moving.

11. In an apparatus of the class described, a multitude of devices, a plate having contacts, one for each of said devices, a tape adapted to engage said contacts to actuate said devices, means including said tape and said plate for actuating a series of selections from among said devices, means for adjusting said tape with respect to said plate during said series, and a signal for guiding said adjustment.

12. In an apparatus of the class described, a multitude of devices, a plate having contacts forming a block and associated with said devices, a tape traveling continuously and simultaneously engaging said contacts, means including said tape and said plate for actuating a series of selections from among said devices, and means for adjusting said plate with respect to said tape while so traveling.

13. The combination of a sign having a plurality of current receiving devices, display in various kinds of contrast adapted to be produced on said sign by means including said devices, a transmitter, and conductors connecting said devices with said transmitter to form circuits, with resistances adapted to be interposed in said circuits, the kind of contrast to be produced being determined by the presence or absence of said resistances in said circuits, and means including said transmitter for interposing resistances selectively in a part of said circuits to control the interposition of said first named resistances in said circuits.

14. The combination of a display surface formed by indicators, tape-means for producing a series of pictures on said surface, and stylus-means for producing sketch-work on said surface, with means for continuing to display said work during the display of said series.

15. The combination of a display surface, a terminal plate, and a tape, with pictures on said tape, means for moving said tape to permit engagement of said plate with said pictures in succession to produce pictures on said surface, means for producing an image of said pictures, and means for causing said image to remain stationary with respect to the movement of said tape.

16. The combination of a plurality of indicator devices adapted to be selectively actuated with a rotating contact plate provided with a plurality of wires a part of each of which is affixed to a support stationary with respect to said plate, said wires being associated with said devices, said rotation producing a twist in said wires, said twist obstructing said rotation, and means for removing said twist to permit further rotation of said plate to actuate continuously new selections from among said devices.

17. The combination of a plurality of devices adapted to be actuated, a plate having terminals, and a tape having blocks of markings arranged in series and adapted to register with said plate to permit engagement between said plate and said blocks in succession to actuate successive selections from among said devices, with means for adjusting the register between said tape and said plate, longitudinally of said tape, during said succession.

18. In combination, a plate having a plurality of terminals, a movable support for said plate, said plate being adjustably mounted in said support, a plurality of markings adapted to register with said terminals, and means for adjusting the register between said markings and said plate, said means comprising adjusting screws not so movable, said screws being located at a distance from said plate and so connected therewith by means of adjusting rods as not to be materially affected by movements imparted to said plate by means of said support.

19. In combination, a display board comprising movable display members each having two adjacent display surfaces of contrasting color, one of said surfaces being displayed when said member is in idle position, the other being displayed when said member is in actuated position, means for moving selectively a part of said members from said first named position to said second named position to produce display, and means for so selectively moving a part of said members to a position intermediate said first and second named positions to produce display different from said first named display.

20. In means for producing half tone pictures, a display sign comprising a plurality of movable display members each having two adjacent display surfaces of contrasting color, one of said surfaces being adapted to be displayed when said member is in idle position and be rendered invisible when said member is moved to a position to display the other surface, means for moving a part of said members so as to cause a small portion of said first named surface of said part to become invisible to produce one shade, and means for moving a group of said members so as to cause a larger portion of said first-named surface of said group to become invisible to produce another shade.

21. In combination, a sign having openings each occupied by a display member having a plurality of display surfaces each of the size of the opening, means for causing only one of said surfaces of a selectively obtained group of said members to be displayed, and means for causing two of said surfaces of each of said members of a similar group to be jointly displayed.

22. The combination of a display surface comprising a plurality of indicators each having a movable member, with means for producing a picture on said surface, a group-switch having one contact for each of said members and adapted to be closed so as to permit transmission of current through all of said contacts simultaneously for moving said members so as to cause them to take one step in one direction in order to produce changes in said picture, and means for neutralizing a selectively obtained group among said members so that when said group-switch is closed, all of said members except said group will take said step.

23. The method of producing half-tone pictures on changeable exhibitors which comprises displaying the indicator elements selected for a certain shade over a longer period than those selected for a different shade.

24. The method of producing half-tone pictures on electric signs which comprises admitting current over a longer period during the display of each picture to the contacts associated with the display elements segregated to form a certain shade than that over which said current is admitted to the contacts pertaining to the elements selected for a different shade.

25. In an electric sign, a display board, means for producing a picture on said board, means for causing said picture to move in a certain direction and means for causing said board to move in a direction opposite from said first-named direction to produce the illusion as though said picture had not been caused to so move.

26. In combination, a plurality of devices adapted to be selectively energized, a series of contact plates each having contacts adapted to be selected and being arranged to form a block, means for connecting said contacts with said devices in such manner that when a contact of one of said plates is selected, production of the same amount of energy will be caused in the device assigned to said contact as will be so caused in said device when the correspondingly located contact of another of said plates is selected, a tape adapted to be engaged block-wise with said plates, each block of said tape having markings adapted to select said contacts to permit said energization, and automatic means for engaging said plates one after another with constantly new blocks of said tape so as to so cause the energization of successive selections from among said devices.

27. In combination, a plurality of devices adapted to be selectively energized, a series of contact plates moving simultaneously in one direction and each having contacts arranged to form a block and capable of selection, a tape traveling in one direction and having markings adapted to select said contacts to selectively energize said devices, and means for engaging said plates with said tape during said movement and said travel so as to so cause selection of the contacts of one of said plates after selection of the contacts of another of said plates has been made, all during said movement and said travel, so as to cause energization of successive selections from among said devices.

28. In an electric sign, a plurality of lamps, an electromagnet for each of said lamps, a commutator for each of said magnets, said commutators each having a plurality of positions, resistances adapted to be interposed in the lamp circuits when said commutators are brought to certain position, and means for so energizing a part of said magnets as to cause their respective commutators to move to different position to energize their respective lamps to various degrees by means including a part of said resistances.

In testimony whereof I have signed my name to this specification in the presence of two subscribing witnesses, this twenty-seventh day of October, 1916.

WILLIAM RECKE.

Witnesses:
  Isidor Buchmeier,
  Eugene J. Leonard.